US010120705B2

(12) United States Patent
Han et al.

(10) Patent No.: US 10,120,705 B2
(45) Date of Patent: Nov. 6, 2018

(54) METHOD FOR IMPLEMENTING GPU VIRTUALIZATION AND RELATED APPARATUS, AND SYSTEM

(71) Applicant: Huawei Technologies Co., Ltd., Shenzhen (CN)

(72) Inventors: Weidong Han, Shanghai (CN); Yingdong Liu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 163 days.

(21) Appl. No.: 15/198,819

(22) Filed: Jun. 30, 2016

(65) Prior Publication Data

US 2016/0314008 A1 Oct. 27, 2016

Related U.S. Application Data

(63) Continuation of application No. PCT/CN2013/091252, filed on Dec. 31, 2013.

(51) Int. Cl.
G06F 9/455 (2018.01)
G06T 1/20 (2006.01)
G06F 9/4401 (2018.01)

(52) U.S. Cl.
CPC ........ *G06F 9/45537* (2013.01); *G06F 9/4411* (2013.01); *G06F 9/45558* (2013.01);
(Continued)

(58) Field of Classification Search
CPC ............... G06F 9/45537; G06F 9/4411; G06F 9/45558; G06F 2009/45579; G06F 2009/45595
See application file for complete search history.

(56) References Cited

U.S. PATENT DOCUMENTS

| 8,274,518 | B2 | 9/2012 | Blythe | |
|---|---|---|---|---|
| 2006/0146057 | A1* | 7/2006 | Blythe | ................ G06F 9/45537 345/506 |

(Continued)

FOREIGN PATENT DOCUMENTS

| CN | 101488174 A | 7/2009 |
|---|---|---|
| CN | 102202289 A | 9/2011 |

(Continued)

OTHER PUBLICATIONS

Gupta et al., "GViM: GPU—accelerated Virtual Machines," HPCVirt '09 Proceedings of the 3$^{rd}$ ACM Workshop on System-level Virtualization for High Performance Computing, Association for Computing Machinery, New York, New York (Mar. 31, 2009).

(Continued)

*Primary Examiner* — James J Lee
(74) *Attorney, Agent, or Firm* — Leydig, Voit & Mayer, Ltd.

(57) ABSTRACT

A method for implementing GPU virtualization. The method is applied to a physical host and the physical host includes: a hardware layer including a GPU, a Host running on the hardware layer, and N back-end GPU Domains and M front-end VMs that run on the Host, where there are service channels between the N back-end GPU Domains and the M front-end VMs. The method includes: transferring, by an $m^{th}$ front-end VM, a GPU command to an $n^{th}$ back-end GPU Domain based on the service channels; and processing, by the $n^{th}$ back-end GPU Domain, the GPU command by using a GPU, to obtain corresponding processing result data, where the type of the operating systems running on the $n^{th}$ back-end GPU Domain and the $m^{th}$ front-end VM is same. The invention helps to optimize performance of a GPU virtualization system.

30 Claims, 13 Drawing Sheets

(52) U.S. Cl.
CPC ...... G06T 1/20 (2013.01); *G06F 2009/45579* (2013.01); *G06F 2009/45595* (2013.01); *G06T 2200/28* (2013.01)

(56) References Cited

U.S. PATENT DOCUMENTS

| | | |
|---|---|---|
| 2011/0102443 A1 | 5/2011 | Dror et al. |
| 2013/0091500 A1* | 4/2013 | Earl ................. G06F 9/4555 718/1 |
| 2013/0229421 A1* | 9/2013 | Cheng ................. G06T 1/20 345/522 |
| 2014/0055466 A1* | 2/2014 | Petrov ................. G06F 9/45533 345/520 |
| 2015/0116310 A1* | 4/2015 | Baudouin ................. G06T 1/60 345/419 |

FOREIGN PATENT DOCUMENTS

| | | |
|---|---|---|
| CN | 102223377 A | 10/2011 |
| CN | 102521012 A | 6/2012 |
| CN | 102650950 A | 8/2012 |
| CN | 101667144 B | 2/2013 |
| CN | 103440612 A | 12/2013 |
| CN | 102650950 B | 4/2015 |

OTHER PUBLICATIONS

Lagar-Cavilla et al., "VMM-Independent Graphics Acceleration," VEE '07 Proceedings of the 3$^{rd}$ International Conference on Virtual Execution Environments, Association for computing Machinery, New York, New York, (Jun. 13, 2007).
CN 201380071416.6, Office Action, dated Apr. 3, 2018.

* cited by examiner

METHOD FOR IMPLEMENTING GPU VIRTUALIZATION AND RELATED APPARATUS, AND SYSTEM

CROSS-REFERENCE TO RELATED APPLICATION

This application is a continuation of International Application No. PCT/CN2013/091252, filed on Dec. 31, 2013, which are hereby incorporated by reference in its entirety.

TECHNICAL FIELD

The present invention relates to the field of computer technologies, and in particular, to a method for implementing GPU virtualization and a related apparatus, and a cluster system.

BACKGROUND

On the one hand, a graphics processing unit (Graphics Processing Unit, GPU) can provide a graphics processing capability to support various graphics applications (for example, engineering drawing, high-definition videos, 3D gaming); on the other hand, the GPU can provide a general purpose computing capability to accelerate various parallel computing applications (for example, high-performance computing).

With the development of virtualization and cloud computing, an increasing quantity of data centers and physical hosts (that is, physical servers) are virtualized, and an increasing quantity of services are migrated to a virtual machine; people expect to use a GPU on a virtual machine as on a physical host, to support various GPU applications (including a graphics application and a general purpose computing application). Moreover, in a scenario of large-scale virtualization, an increasing quantity of virtual machines (Virtual Machine, VM) are deployed on a single physical host. As a quantity of VMs increases, types of operating systems of the VMs become increasingly complex.

A current technology of GPU virtualization is implemented by means of redirection of a GPU command. That is, a command of invoking a GPU command library by a GPU application is intercepted in a VM, the intercepted command is then forwarded to a host operating system (that is, Host OS), a native GPU command library of a host (Host) end is invoked in the Host OS, and the command is processed by using a GPU. However, once an operating system of the VM is different from the Host OS, the GPU command library on the VM is different from the GPU command library on the Host OS, resulting in a problem of conversion of a GPU command library. A mainstream Host OS in the industry is Linux, and at present, in a scenario of a desktop cloud that requires GPU virtualization most urgently, an operating system of a virtual machine is mostly Windows. However, GPU command libraries in Linux and Windows are greatly different. For example, for 3D rendering, Linux supports an OpenGL command library while Windows mainly supports a Direct 3D command library. For video acceleration, Linux supports a VA API command library while Windows supports a DXVA command library. These command libraries are large, and have different implementation mechanisms. It is relatively difficult to convert between the libraries, and the conversion introduces problems of an extra overhead, a delay, or even stability, causing low performance of a GPU virtualization system.

SUMMARY

Embodiments of the present invention provide a method for implementing GPU virtualization, a method for managing a GPU Domain, a related apparatus, and a cluster system, to avoid conversion between different GPU command libraries, thereby ensuring performance of a GPU virtualization system.

The embodiments of the present invention provide the following technical solutions:

According to a first aspect, an embodiment of the present invention provides a method for implementing graphics processing unit GPU virtualization, where the method is applied to a physical host, where the physical host includes: a hardware layer including a GPU, a host Host running on the hardware layer, and N back-end GPU domains GPU Domains and M front-end virtual machines VMs that run on the Host, where there are corresponding front-end and back-end service channels between the N back-end GPU Domains and the M front-end VMs, N is a positive integer greater than or equal to 1, M is a positive integer greater than or equal to 1, M is greater than or equal to N, M is greater than or equal to N, and n is a positive integer is less than or equal to N, m is a positive integer is less than or equal to M, where the method includes:

transferring, by an $m^{th}$ front-end VM, a to-be-transferred GPU command to an $n^{th}$ back-end GPU Domain based on front-end and back-end service channels between the $n^{th}$ back-end GPU Domain of the N back-end GPU Domains and the $m^{th}$ front-end VM of the M front-end VMs, where a type of an operating system of the $n^{th}$ back-end GPU Domain is the same as a type of an operating system of the $m^{th}$ front-end VM; and processing, by the $n^{th}$ back-end GPU Domain, the transferred GPU command by using one or more GPUs, to obtain corresponding processing result data.

In a first possible implementation manner of the first aspect, the method further includes:

transferring, by the $n^{th}$ back-end GPU Domain, the corresponding processing result data to the $m^{th}$ front-end VM based on the front-end and back-end service channels between the $n^{th}$ back-end GPU Domain of the N back-end GPU Domains and the $m^{th}$ front-end VM of the M front-end VMs.

With reference to the first aspect or the first possible implementation manner of the first aspect, in a second possible implementation manner of the first aspect, the physical host further includes: a host operating system Host OS running on the Host, and the method further includes:

establishing, by the Host OS, the front-end and back-end service channels between the N back-end GPU Domains and the M front-end VMs, where the front-end and back-end service channels between the N back-end GPU Domains and the M front-end VMs include: the front-end and back-end service channels between the $n^{th}$ back-end GPU Domain of the N back-end GPU Domains and the $m^{th}$ front-end VM of the M front-end VMs.

With reference to the second possible implementation manner of the first aspect, in a third possible implementation manner of the first aspect, the establishing, by the Host OS, the front-end and back-end service channels between the N back-end GPU Domains and the M front-end VMs includes:

determining, when the $m^{th}$ front-end VM of the M front-end VMs is started, by the Host OS according to the type of the operating system of the started $m^{th}$ front-end VM, the $n^{th}$ back-end GPU Domain having an operating system of a corresponding type, where there is an association relationship between the $m^{th}$ front-end VM and the $n^{th}$ back-end GPU Domain; and based on the association relationship between the $m^{th}$ front-end VM and the $n^{th}$ back-end GPU Domain, transferring, by the Host OS, communication information of the corresponding $n^{th}$ back-end GPU Domain to the $m^{th}$ front-end VM, and transferring communication information of the corresponding $m^{th}$ front-end VM to the $n^{th}$ back-end GPU Domain, so that the front-end and back-end service channels are established between the $m^{th}$ front-end VM and the $n^{th}$ back-end GPU Domain.

With reference to the third possible implementation manner of the first aspect, in a fourth possible implementation manner of the first aspect, the method further includes:

creating, by the Host OS, the N back-end GPU Domains according to a configured GPU Domain creation policy, where the N back-end GPU Domains have operating systems of multiple types, and the GPU Domain creation policy includes one or more of the following: a quantity of GPU Domains, a quantity of GPUs that are pass-through to the GPU Domain, and types of operating systems of the GPU Domains; and the determining, when the $m^{th}$ front-end VM of the M front-end VMs is started, by the Host OS according to the type of the operating system of the started $m^{th}$ front-end VM, the $n^{th}$ back-end GPU Domain having an operating system of a corresponding type includes: selecting, when the $m^{th}$ front-end VM of the M front-end VMs is started, by the Host OS from the created N back-end GPU Domains according to the type of the operating system of the started $m^{th}$ front-end VM, the $n^{th}$ back-end GPU Domain having the operating system of the corresponding type.

With reference to the third possible implementation manner of the first aspect, in a fifth possible implementation manner of the first aspect, the determining, when the $m^{th}$ front-end VM of the M front-end VMs is started, by the Host OS according to the type of the operating system of the started $m^{th}$ front-end VM, the $n^{th}$ back-end GPU Domain having an operating system of a corresponding type includes: creating, when the $m^{th}$ front-end VM of the M front-end VMs is started, by the Host OS according to the type of the operating system of the started $m^{th}$ front-end VM, the $n^{th}$ back-end GPU Domain having the operating system of the corresponding type.

With reference to any one of the third to fifth possible implementation manners of the first aspect, in a sixth possible implementation manner of the first aspect, if the communication information is a shared memory device identifier, the establishing the front-end and back-end service channels between the $m^{th}$ front-end VM and the $n^{th}$ back-end GPU Domain includes:

binding event channels between the $m^{th}$ front-end VM and the $n^{th}$ back-end GPU Domain based on the shared memory device identifier of the $m^{th}$ front-end VM and the shared memory device identifier of the $n^{th}$ back-end GPU Domain.

With reference to the sixth possible implementation manner of the first aspect, in a seventh possible implementation manner of the first aspect, the transferring, by an $m^{th}$ front-end VM, a to-be-transferred GPU command to an $n^{th}$ back-end GPU Domain based on front-end and back-end service channels between the $n^{th}$ back-end GPU Domain of the N back-end GPU Domains and the $m^{th}$ front-end VM of the M front-end VMs includes:

writing, by the $m^{th}$ front-end VM, the to-be-transferred GPU command to a shared memory between the $m^{th}$ front-end VM and the $n^{th}$ back-end GPU Domain; and sending, by the $m^{th}$ front-end VM, an $m^{th}$ front-end event notification to the $n^{th}$ back-end GPU Domain through the bound event channels between the $m^{th}$ front-end VM and the $n^{th}$ back-end GPU Domain, where the $m^{th}$ front-end event notification is used to represent location information, of the to-be-transferred GPU command, in the shared memory; and the processing, by the $n^{th}$ back-end GPU Domain, the GPU command by using one or more GPUs, to obtain corresponding processing result data includes:

reading, by the $n^{th}$ back-end GPU Domain, the GPU command from a corresponding address space of the shared memory between the $m^{th}$ front-end VM and the $n^{th}$ back-end GPU Domain according to the received $m^{th}$ front-end event notification; and processing, by the $n^{th}$ back-end GPU Domain, the read GPU command by using one or more GPUs that are pass-through to the $n^{th}$ back-end GPU Domain, to obtain the corresponding processing result data.

With reference to the seventh possible implementation manner of the first aspect, in an eighth possible implementation manner of the first aspect, the method further includes:

sending, by the $n^{th}$ back-end GPU Domain, an $n^{th}$ back-end event notification to the $m^{th}$ front-end VM through the bound event channels between the $m^{th}$ front-end VM and the $n^{th}$ back-end GPU Domain, where the $n^{th}$ back-end event notification is used to represent that data reading is complete; and releasing, by the $m^{th}$ front-end VM according to the received $n^{th}$ back-end event notification, a memory space that has been occupied by data read by the $n^{th}$ back-end GPU Domain.

With reference to the sixth or seventh possible implementation manner of the first aspect, in a ninth possible implementation manner of the first aspect, the transferring, by the $n^{th}$ back-end GPU Domain, the corresponding processing result data to the $m^{th}$ front-end VM based on the front-end and back-end service channels between the $n^{th}$ back-end GPU Domain of the N back-end GPU Domains and the $m^{th}$ front-end VM of the M front-end VMs includes:

writing, by the $n^{th}$ back-end GPU Domain, the to-be-transferred processing result data to the shared memory between the $m^{th}$ front-end VM and the $n^{th}$ back-end GPU Domain;

sending, by the $n^{th}$ back-end GPU Domain, an $n^{th}$ back-end event notification to the $m^{th}$ front-end VM through the bound event channels between the $m^{th}$ front-end VM and the $n^{th}$ back-end GPU Domain, where the $n^{th}$ back-end event notification is used to represent location information, of the to-be-transferred processing result data, in the shared memory; and reading, by the $m^{th}$ front-end VM, the processing result data from the corresponding address space of the shared memory between the $m^{th}$ front-end VM and the $n^{th}$ back-end GPU Domain according to the received back-end event notification.

With reference to the ninth possible implementation manner of the first aspect, in a tenth possible implementation manner of the first aspect, the method further includes:

sending, by the $m^{th}$ front-end VM, the $m^{th}$ front-end event notification to the $n^{th}$ back-end GPU Domain through the bound event channels between the $m^{th}$ front-end VM and the $n^{th}$ back-end GPU Domain, where the $m^{th}$ front-end event notification is used to represent that data reading is complete; and releasing, by the $n^{th}$ back-end GPU Domain according to the received $m^{th}$ front-end event notification, a memory space that has been occupied by data read by the $m^{th}$ front-end VM.

With reference to the seventh or ninth possible implementation manner of the first aspect, in an eleventh possible implementation manner of the first aspect, the shared memory between the $m^{th}$ front-end VM and the $n^{th}$ back-end GPU Domain includes: a front-end-to-back-end transmission shared memory and a back-end-to-front-end transmission shared memory, where the writing, by the $m^{th}$ front-end VM, the to-be-transferred GPU command to a shared memory between the $m^{th}$ front-end VM and the $n^{th}$ back-end GPU Domain includes: writing, by the $m^{th}$ front-end VM, the to-be-transferred GPU command to the front-end-to-back-end transmission shared memory, where the $m^{th}$ front-end VM has read and write permissions for the front-end-to-back-end transmission shared memory, and the $n^{th}$ back-end GPU Domain has a read-only permission for the front-end-to-back-end transmission shared memory; and correspondingly, the reading, by the $n^{th}$ back-end GPU Domain, the GPU command from a corresponding address space of the shared memory according to the received $m^{th}$ front-end event notification includes: reading, by the $n^{th}$ back-end GPU Domain, the GPU command from a corresponding address space of the front-end-to-back-end transmission shared memory according to the received $m^{th}$ front-end event notification, where the $m^{th}$ front-end event notification is used to represent location information, of the to-be-transferred GPU command, in the front-end-to-back-end transmission shared memory;

or, the writing, by the $n^{th}$ back-end GPU Domain, the to-be-transferred processing result data to the shared memory between the $m^{th}$ front-end VM and the $n^{th}$ back-end GPU Domain includes: writing, by the $n^{th}$ back-end GPU Domain, the to-be-transferred processing result data to the back-end-to-front-end transmission shared memory, where the $n^{th}$ back-end GPU Domain has read and write permissions for the back-end-to-front-end transmission shared memory, and the $m^{th}$ front-end VM has a read-only permission for the back-end-to-front-end transmission shared memory; and correspondingly, the reading, by the $m^{th}$ front-end VM the processing result data from the corresponding address space of the shared memory between the $m^{th}$ front-end VM and the $n^{th}$ back-end GPU Domain according to the received back-end event notification includes: reading, by the $m^{th}$ front-end VM, the processing result data from a corresponding address space of the back-end-to-front-end transmission shared memory according to the received back-end event notification, where the $n^{th}$ back-end event notification is used to represent location information, of the to-be-transferred processing result data, in the back-end-to-front-end transmission shared memory.

With reference to any one of the third to fifth possible implementation manners of the first aspect, in a twelfth possible implementation manner of the first aspect, if the communication information is network address information, the establishing the front-end and back-end service channels between the $m^{th}$ front-end VM and the $n^{th}$ back-end GPU Domain includes:

establishing a network connection between the $m^{th}$ front-end VM and the $n^{th}$ back-end GPU Domain based on the network address information of the $m^{th}$ front-end VM and the network address information of the $n^{th}$ back-end GPU Domain.

With reference to the twelfth possible implementation manner of the first aspect, in a thirteenth possible implementation manner of the first aspect, the transferring, by an $m^{th}$ front-end VM, a to-be-transferred GPU command to an $n^{th}$ back-end GPU Domain based on front-end and back-end service channels between the $n^{th}$ back-end GPU Domain of the N back-end GPU Domains and the $m^{th}$ front-end VM of the M front-end VMs includes:

sending, by the $m^{th}$ front-end VM, the to-be-transferred GPU command to the $n^{th}$ back-end GPU Domain over the network connection between the $m^{th}$ front-end VM and the $n^{th}$ back-end GPU Domain.

With reference to the twelfth or thirteenth possible implementation manner of the first aspect, in a fourteenth possible implementation manner of the first aspect, the transferring, by the $n^{th}$ back-end GPU Domain, the corresponding processing result data to the $m^{th}$ front-end VM based on the front-end and back-end service channels between the $n^{th}$ back-end GPU Domain of the N back-end GPU Domains and the $m^{th}$ front-end VM of the M front-end VMs includes:

sending, by the $n^{th}$ back-end GPU Domain, the to-be-transferred processing result data to the $m^{th}$ front-end VM over the network connection between the $m^{th}$ front-end VM and the $n^{th}$ back-end GPU Domain.

With reference to the first aspect or the first possible implementation manner of the first aspect, in a fifteenth possible implementation manner of the first aspect, the method further includes: determining, according to an estimated compression time, an estimated decompression time, an estimated compressed-data transmission time, and an estimated non-compression direct-transmission time that are of the GPU command, to compress the GPU command;

the transferring, by an $m^{th}$ front-end VM, a to-be-transferred GPU command to an $n^{th}$ back-end GPU Domain includes: compressing, by the $m^{th}$ front-end VM, the to-be-transferred GPU command, and transferring the compressed GPU command to the $n^{th}$ back-end GPU Domain;

the method further includes: determining, by the $n^{th}$ back-end GPU Domain, that the transferred GPU command has been compressed; and the processing, by the $n^{th}$ back-end GPU Domain, the GPU command by using one or more GPUs, to obtain corresponding processing result data includes: decompressing, by the $n^{th}$ back-end GPU Domain, the compressed GPU command, and processing the decompressed GPU command by using one or more GPUs that are pass-through to the $n^{th}$ back-end GPU Domain, to obtain the corresponding processing result data.

With reference to the fifteenth possible implementation manner of the first aspect, in a sixteenth possible implementation manner of the first aspect, the method further includes:

determining, according to an estimated compression time, an estimated decompression time, an estimated compressed-data transmission time, and an estimated non-compression direct-transmission time that are of the processing result data, to compress the processing result data; and the transferring, by the $n^{th}$ back-end GPU Domain, the processing result data to the $m^{th}$ front-end VM includes: compressing, by the $n^{th}$ back-end GPU Domain, the processing result data, and transferring the compressed processing result data to the $m^{th}$ front-end VM.

With reference to the sixteenth possible implementation manner of the first aspect, in a seventeenth possible implementation manner of the first aspect, the determining, according to an estimated compression time, an estimated decompression time, an estimated compressed-data transmission time, and an estimated non-compression direct-transmission time that are of the GPU command or the processing result data, to compress the GPU command or the processing result data includes:

when a sum of the estimated compression time, the estimated decompression time, and the estimated compressed-data transmission time that are of the GPU command is less than or equal to the estimated non-compression direct-transmission time of the GPU command, determining to compress the GPU command; or, when a sum of the estimated compression time, the estimated decompression time, and the estimated compressed-data transmission time that are of the GPU command is less than or equal to a sum of the estimated non-compression direct-transmission time of the GPU command and an adjustment value, determining to compress the GPU command; or, when a sum of the estimated compression time, the estimated decompression time, and the estimated compressed-data transmission time that are of the processing result data is less than or equal to the estimated non-compression direct-transmission time of the processing result data, determining to compress the processing result data; or, when a sum of the estimated compression time, the estimated decompression time, and the estimated compressed-data transmission time that are of the processing result data is less than or equal to a sum of the estimated non-compression direct-transmission time of the processing result data and an adjustment value, determining to compress the processing result data.

According to a second aspect, an embodiment of the present invention provides a method for managing a GPU Domain, including:

determining, when an $m^{th}$ front-end VM is started, according to a type of an operating system of the started $m^{th}$ front-end VM, an $n^{th}$ back-end GPU Domain having an operating system of a corresponding type, where there is an association relationship between the $m^{th}$ front-end VM and the $n^{th}$ back-end GPU Domain; and based on the association relationship between the $m^{th}$ front-end VM and the $n^{th}$ back-end GPU Domain, transferring communication information of the corresponding $n^{th}$ back-end GPU Domain to the $m^{th}$ front-end VM, and transferring communication information of the corresponding $m^{th}$ front-end VM to the $n^{th}$ back-end GPU Domain, so that front-end and back-end service channels are established between the $m^{th}$ front-end VM and the $n^{th}$ back-end GPU Domain.

In a first possible implementation manner of the second aspect, the method further includes:

creating N back-end GPU Domains according to a configured GPU Domain creation policy, where the N back-end GPU Domains have operating systems of multiple types, and the GPU Domain creation policy includes one or more of the following: a quantity of GPU Domains, a quantity of GPUs that are pass-through to the GPU Domain, and types of operating systems of the GPU Domains; and the determining, when an $m^{th}$ front-end VM is started, according to a type of an operating system of the started $m^{th}$ front-end VM, an $n^{th}$ back-end GPU Domain having an operating system of a corresponding type includes: when the $m^{th}$ front-end VM of the M front-end VMs is started, selecting, from the N back-end GPU Domains according to the type of the operating system of the started $m^{th}$ front-end VM, the $n^{th}$ back-end GPU Domain having the operating system of the corresponding type.

In a second possible implementation manner of the second aspect, the determining, when an $m^{th}$ front-end VM is started, according to a type of an operating system of the started $m^{th}$ front-end VM, an $n^{th}$ back-end GPU Domain having an operating system of a corresponding type includes:

creating, when the $m^{th}$ front-end VM of the M front-end VMs is started, according to the type of the operating system of the started $m^{th}$ front-end VM, the $n^{th}$ back-end GPU Domain having the operating system of the corresponding type.

With reference to the second aspect or the first or second possible implementation manner of the second aspect, in a third possible implementation manner of the second aspect, if the communication information is a shared memory device identifier, the establishing the front-end and back-end service channels between the $m^{th}$ front-end VM and the $n^{th}$ back-end GPU Domain includes:

binding event channels between the $m^{th}$ front-end VM and the $n^{th}$ back-end GPU Domain based on the communication information of the $m^{th}$ front-end VM and the communication information of the $n^{th}$ back-end GPU Domain.

With reference to the second aspect or the first or second possible implementation manner of the second aspect, in a fourth possible implementation manner of the second aspect, if the communication information is network address information, the establishing the front-end and back-end service channels between the $m^{th}$ front-end VM and the $n^{th}$ back-end GPU Domain includes:

establishing a network connection between the $m^{th}$ front-end VM and the $n^{th}$ back-end GPU Domain based on the network address information of the $m^{th}$ front-end VM and the network address information of the $n^{th}$ back-end GPU Domain.

According to a third aspect, an embodiment of the present invention provides a physical host, where the physical host includes: a hardware layer including a GPU, a host Host running on the hardware layer, and N back-end GPU Domains and M front-end virtual machines VMs that run on the Host, where there are corresponding front-end and back-end service channels between the N back-end GPU Domains and the M front-end VMs, N is a positive integer greater than or equal to 1, M is a positive integer greater than or equal to 1, M is greater than or equal to N, n is a positive integer is less than or equal to N, and m is a positive integer is less than or equal to M, where the $m^{th}$ front-end VM is configured to transfer a to-be-transferred GPU command to an $n^{th}$ back-end GPU Domain based on front-end and back-end service channels between the $n^{th}$ back-end GPU Domain of the N back-end GPU Domains and the $m^{th}$ front-end VM of the M front-end VMs, where a type of an operating system of the $n^{th}$ back-end GPU Domain is the same as a type of an operating system of the $m^{th}$ front-end VM; and the $n^{th}$ back-end GPU Domain is configured to process the transferred GPU command by using one or more GPUs, to obtain corresponding processing result data.

In a first possible implementation manner of the third aspect, the $n^{th}$ back-end GPU Domain is further configured to transfer the corresponding processing result data to the $m^{th}$ front-end VM based on the front-end and back-end service channels between the $n^{th}$ back-end GPU Domain of the N back-end GPU Domains and the $m^{th}$ front-end VM of the M front-end VMs.

With reference to the third aspect or the first possible implementation manner of the third aspect, in a second possible implementation manner of the third aspect, the physical host further includes: a host operating system Host OS running on the Host, and the Host OS is configured to establish the front-end and back-end service channels between the N back-end GPU Domains and the M front-end VMs, where the front-end and back-end service channels between the N back-end GPU Domains and the M front-end VMs include: the front-end and back-end service channels between the $n^{th}$ back-end GPU Domain of the N back-end GPU Domains and the $m^{th}$ front-end VM of the M front-end VMs.

With reference to the second possible implementation manner of the third aspect, in a third possible implementation manner of the third aspect, the Host OS is specifically configured to:

when the $m^{th}$ front-end VM of the M front-end VMs is started, determine, according to the type of the operating system of the started $m^{th}$ front-end VM, the $n^{th}$ back-end GPU Domain having an operating system of a corresponding type, where there is an association relationship between the $m^{th}$ front-end VM and the $n^{th}$ back-end GPU Domain;

based on the association relationship between the $m^{th}$ front-end VM and the $n^{th}$ back-end GPU Domain, transfer communication information of the corresponding $n^{th}$ back-end GPU Domain to the $m^{th}$ front-end VM, and transfer communication information of the corresponding $m^{th}$ front-end VM to the $n^{th}$ back-end GPU Domain, so that the front-end and back-end service channels are established between the $m^{th}$ front-end VM and the $n^{th}$ back-end GPU Domain.

With reference to the third possible implementation manner of the third aspect, in a fourth possible implementation manner of the third aspect, the Host OS is specifically configured to:

create the N back-end GPU Domains according to a configured GPU Domain creation policy, where the N back-end GPU Domains have operating systems of multiple types, and the GPU Domain creation policy includes one or more of the following: a quantity of GPU Domains, a quantity of GPUs that are pass-through to the GPU Domain, and types of operating systems of the GPU Domains;

when the $m^{th}$ front-end VM of the M front-end VMs is started, select, from the N back-end GPU Domains according to the type of the operating system of the started $m^{th}$ front-end VM, the $n^{th}$ back-end GPU Domain having the operating system of the corresponding type, where there is the association relationship between the $m^{th}$ front-end VM and the $n^{th}$ back-end GPU Domain; and based on the association relationship between the $m^{th}$ front-end VM and the $n^{th}$ back-end GPU Domain, transfer the communication information of the corresponding $n^{th}$ back-end GPU Domain to the $m^{th}$ front-end VM, and transfer the communication information of the corresponding $m^{th}$ front-end VM to the $n^{th}$ back-end GPU Domain, so that the front-end and back-end service channels are established between the $m^{th}$ front-end VM and the $n^{th}$ back-end GPU Domain.

With reference to the third possible implementation manner of the third aspect, in a fifth possible implementation manner of the third aspect, the Host OS is specifically configured to:

when the $m^{th}$ front-end VM of the M front-end VMs is started, create, by the Host OS according to the type of the operating system of the started $m^{th}$ front-end VM, the $n^{th}$ back-end GPU Domain having the operating system of the corresponding type, where there is the association relationship between the $m^{th}$ front-end VM and the $n^{th}$ back-end GPU Domain; and based on the association relationship between the $m^{th}$ front-end VM and the $n^{th}$ back-end GPU Domain, transfer the communication information of the corresponding $n^{th}$ back-end GPU Domain to the $m^{th}$ front-end VM, and transfer the communication information of the corresponding $m^{th}$ front-end VM to the $n^{th}$ back-end GPU Domain, so that the front-end and back-end service channels are established between the $m^{th}$ front-end VM and the $n^{th}$ back-end GPU Domain.

With reference to any one of the third to fifth possible implementation manners of the third aspect, in a sixth possible implementation manner of the third aspect, if the communication information is a shared memory device identifier, in the aspect of establishing the front-end and back-end service channels between the $m^{th}$ front-end VM and the $n^{th}$ back-end GPU Domain, the $m^{th}$ front-end VM is specifically configured to initiate binding of event channels between the $m^{th}$ front-end VM and the $n^{th}$ back-end GPU Domain based on the shared memory device identifier of the $m^{th}$ front-end VM and the shared memory device identifier of the $n^{th}$ back-end GPU Domain;

or, the $n^{th}$ back-end GPU Domain is specifically configured to initiate binding of event channels between the $m^{th}$ front-end VM and the $n^{th}$ back-end GPU Domain based on the shared memory device identifier of the $m^{th}$ front-end VM and the shared memory device identifier of the $n^{th}$ back-end GPU Domain.

With reference to the sixth possible implementation manner of the third aspect, in a seventh possible implementation manner of the third aspect, in the aspect of transferring the to-be-transferred GPU command based on the front-end and back-end service channels between the $n^{th}$ back-end GPU Domain of the N back-end GPU Domains and the $m^{th}$ front-end VM of the M front-end VMs to the $n^{th}$ back-end GPU Domain, the $m^{th}$ front-end VM is specifically configured to write the to-be-transferred GPU command to a shared memory between the $m^{th}$ front-end VM and the $n^{th}$ back-end GPU Domain; and send an $m^{th}$ front-end event notification to the $n^{th}$ back-end GPU Domain through the bound event channels between the $m^{th}$ front-end VM and the $n^{th}$ back-end GPU Domain, where the $m^{th}$ front-end event notification is used to represent location information, of the to-be-transferred GPU command, in the shared memory; and in the aspect of processing the transferred GPU command by using the one or more GPUs, to obtain the corresponding processing result data, the $n^{th}$ back-end GPU Domain is specifically configured to read the GPU command from a corresponding address space of the shared memory between the $m^{th}$ front-end VM and the $n^{th}$ back-end GPU Domain according to the received $m^{th}$ front-end event notification; and process the read GPU command by using one or more GPUs that are pass-through to the $n^{th}$ back-end GPU Domain, to obtain the corresponding processing result data.

With reference to the seventh possible implementation manner of the third aspect, in an eighth possible implementation manner of the third aspect, the $n^{th}$ back-end GPU Domain is further configured to send an $n^{th}$ back-end event notification to the $m^{th}$ front-end VM through the bound event channels between the $m^{th}$ front-end VM and the $n^{th}$ back-end GPU Domain, where the $n^{th}$ back-end event notification is used to represent that data reading is complete; and the $m^{th}$ front-end VM is further configured to release, according to the received $n^{th}$ back-end event notification, a memory space that has been occupied by data read by the $n^{th}$ back-end GPU Domain.

With reference to the sixth or seventh possible implementation manner of the third aspect, in a ninth possible implementation manner of the third aspect, in the aspect of transferring the corresponding processing result data to the $m^{th}$ front-end VM based on the front-end and back-end service channels between the $n^{th}$ back-end GPU Domain of the N back-end GPU Domains and the $m^{th}$ front-end VM of the M front-end VMs, the $n^{th}$ back-end GPU Domain is specifically configured to write the to-be-transferred processing result data to a shared memory between the $m^{th}$ front-end VM and the $n^{th}$ back-end GPU Domain; and send an $n^{th}$ back-end event notification to the $m^{th}$ front-end VM through the bound event channels between the $m^{th}$ front-end VM and the $n^{th}$ back-end GPU Domain, where the $n^{th}$ back-end event notification is used to represent location information, of the to-be-transferred processing result data, in the shared memory between the $m^{th}$ front-end VM and the $n^{th}$ back-end GPU Domain; and the $m^{th}$ front-end VM is further configured to read the processing result data from a corresponding address space of the shared memory between the $m^{th}$ front-end VM and the $n^{th}$ back-end GPU Domain according to the received $n^{th}$ back-end event notification.

With reference to the ninth possible implementation manner of the third aspect, in a tenth possible implementation manner of the third aspect, the $m^{th}$ front-end VM is further configured to send the $m^{th}$ front-end event notification to the $n^{th}$ back-end GPU Domain through the bound event channels between the $m^{th}$ front-end VM and the $n^{th}$ back-end GPU Domain, where the $m^{th}$ front-end event notification is used to represent that data reading is complete; and the $n^{th}$ back-end GPU Domain is further configured to release, according to the received $m^{th}$ front-end event notification, a memory space that has been occupied by data read by the $m^{th}$ front-end VM.

With reference to the seventh or ninth possible implementation manner of the third aspect, in an eleventh possible implementation manner of the third aspect, the shared memory between the $m^{th}$ front-end VM and the $n^{th}$ back-end GPU Domain includes a front-end-to-back-end transmission shared memory and a back-end-to-front-end transmission shared memory, where in the aspect of writing, by the $m^{th}$ front-end VM, the to-be-transferred GPU command to the shared memory between the $m^{th}$ front-end VM and the $n^{th}$ back-end GPU Domain, the $m^{th}$ front-end VM is specifically configured to write the to-be-transferred GPU command to the front-end-to-back-end transmission shared memory, where the $m^{th}$ front-end VM has read and write permissions for the front-end-to-back-end transmission shared memory, and the $n^{th}$ back-end GPU Domain has a read-only permission for the front-end-to-back-end transmission shared memory; and correspondingly, in the aspect of reading the GPU command from the corresponding address space of the shared memory between the $m^{th}$ front-end VM and the $n^{th}$ back-end GPU Domain according to the received $m^{th}$ front-end event notification, the $n^{th}$ back-end GPU Domain is specifically configured to read the GPU command from a corresponding address space of the front-end-to-back-end transmission shared memory according to the received $m^{th}$ front-end event notification, where the $m^{th}$ front-end event notification is used to represent location information, of the to-be-transferred GPU command, in the front-end-to-back-end transmission shared memory;

or, in the aspect of writing the to-be-transferred processing result data to the shared memory between the $m^{th}$ front-end VM and the $n^{th}$ back-end GPU Domain, the $n^{th}$ back-end GPU Domain is specifically configured to write the to-be-transferred processing result data to the back-end-to-front-end transmission shared memory, where the $n^{th}$ back-end GPU Domain has read and write permissions for the back-end-to-front-end transmission shared memory, and the $m^{th}$ front-end VM has a read-only permission for the back-end-to-front-end transmission shared memory; and correspondingly, in the aspect of reading the processing result data from the corresponding address space of the shared memory between the $m^{th}$ front-end VM and the $n^{th}$ back-end GPU Domain according to the received $n^{th}$ back-end event notification, the $m^{th}$ front-end VM is specifically configured to read the processing result data from a corresponding address space of the back-end-to-front-end transmission shared memory according to the received $n^{th}$ back-end event notification, where the $n^{th}$ back-end event notification is used to represent location information, of the to-be-transferred processing result data, in the back-end-to-front-end transmission shared memory.

With reference to any one of the fourth to sixth possible implementation manners of the third aspect, in a twelfth possible implementation manner of the third aspect, if the communication information is network address information, in the aspect of establishing the front-end and back-end service channels between the $m^{th}$ front-end VM and the $n^{th}$ back-end GPU Domain, the $m^{th}$ front-end VM is specifically configured to establish a network connection between the $m^{th}$ front-end VM and the $n^{th}$ back-end GPU Domain based on the network address information of the $m^{th}$ front-end VM and the network address information of the $n^{th}$ back-end GPU Domain; and or, the $n^{th}$ back-end GPU Domain is specifically configured to establish a network connection between the $m^{th}$ front-end VM and the $n^{th}$ back-end GPU Domain based on the network address information of the $m^{th}$ front-end VM and the network address information of the $n^{th}$ back-end GPU Domain.

With reference to the twelfth possible implementation manner of the third aspect, in a thirteenth possible implementation manner of the third aspect, in the aspect of transferring the to-be-transferred GPU command to the $n^{th}$ back-end GPU Domain based on the front-end and back-end service channels between the $n^{th}$ back-end GPU Domain of the N back-end GPU Domains and the $m^{th}$ front-end VM of the M front-end VMs, the $m^{th}$ front-end VM is specifically configured to send the to-be-transferred GPU command to the $n^{th}$ back-end GPU Domain over the network connection between the $m^{th}$ front-end VM and the $n^{th}$ back-end GPU Domain.

With reference to the twelfth or thirteenth possible implementation manner of the third aspect, in a fourteenth possible implementation manner of the third aspect, in the aspect of transferring the corresponding processing result data to the $m^{th}$ front-end VM based on the front-end and back-end service channels between the $n^{th}$ back-end GPU Domain of the N back-end GPU Domains and the $m^{th}$ front-end VM of the M front-end VMs, the $n^{th}$ back-end GPU Domain is specifically configured to send the to-be-transferred processing result data to the $m^{th}$ front-end VM over the network connection between the $m^{th}$ front-end VM and the $n^{th}$ back-end GPU Domain.

With reference to the third aspect or the first possible implementation manner of the third aspect, in a fifteenth possible implementation manner of the third aspect, the $m^{th}$ front-end VM is further configured to determine, according to an estimated compression time, an estimated decompression time, an estimated compressed-data transmission time, and an estimated non-compression direct-transmission time that are of the GPU command, to compress the GPU command;

in the aspect of transferring the to-be-transferred GPU command to the $n^{th}$ back-end GPU Domain, the $m^{th}$ front-end VM is specifically configured to compress the to-be-transferred GPU command, and transfer the compressed GPU command to the $n^{th}$ back-end GPU Domain;

the $n^{th}$ back-end GPU Domain is further configured to determine that the transferred GPU command has been compressed; and in the aspect of processing the GPU command by using the one or more GPUs, to obtain the corresponding processing result data, the $n^{th}$ back-end GPU Domain is specifically configured to decompress the compressed GPU command, and process the decompressed GPU command by using one or more GPUs that are pass-through to the $n^{th}$ back-end GPU Domain, to obtain the corresponding processing result data.

With reference to the fifteenth possible implementation manner of the third aspect, in a sixteenth possible implementation manner of the third aspect, the $n^{th}$ back-end GPU Domain is further configured to determine, according to an estimated compression time, an estimated decompression time, an estimated compressed-data transmission time, and an estimated non-compression direct-transmission time that are of the processing result data, to compress the processing result data; and in the aspect of transferring the processing result data to the $m^{th}$ front-end VM, the $n^{th}$ back-end GPU Domain is specifically configured to compress the processing result data, and transfer the compressed processing result data to the $m^{th}$ front-end VM.

With reference to the fifteenth or sixteenth possible implementation manner of the third aspect, in a seventeenth possible implementation manner of the third aspect, in the aspect of determining, according to the estimated compression time, the estimated decompression time, the estimated compressed-data transmission time, and the estimated non-compression direct-transmission time that are of the GPU command, to compress the GPU command, the $m^{th}$ front-end VM is specifically configured to: when a sum of the estimated compression time, the estimated decompression time, and the estimated compressed-data transmission time that are of the GPU command is less than or equal to the estimated non-compression direct-transmission time of the GPU command, determine to compress the GPU command; or, when a sum of the estimated compression time, the estimated decompression time, and the estimated compressed-data transmission time that are of the GPU command is less than or equal to a sum of the estimated non-compression direct-transmission time of the GPU command and an adjustment value, determine to compress the GPU command;

or, in the aspect of determining, according to the estimated compression time, the estimated decompression time, the estimated compressed-data transmission time, and the estimated non-compression direct-transmission time that are of the processing result data, to compress the processing result data, the $n^{th}$ back-end GPU Domain is specifically configured to: when a sum of the estimated compression time, the estimated decompression time, and the estimated compressed-data transmission time that are of the processing result data is less than or equal to the estimated non-compression direct-transmission time of the processing result data, determine to compress the processing result data; or, when a sum of the estimated compression time, the estimated decompression time, and the estimated compressed-data transmission time that are of the processing result data is less than or equal to a sum of the estimated non-compression direct-transmission time of the processing result data and an adjustment value, determine to compress the processing result data.

According to a fourth aspect, an embodiment of the present invention provides an apparatus for managing a GPU Domain, including:

a GPU Domain management module, configured to determine, when an $m^{th}$ front-end VM is started, according to a type of an operating system of the started $m^{th}$ front-end VM, an $n^{th}$ back-end GPU Domain having an operating system of a corresponding type, where there is an association relationship between the $m^{th}$ front-end VM and the $n^{th}$ back-end GPU Domain; and an inter-virtual machine communication IVC management module, configured to: based on the association relationship between the $m^{th}$ front-end VM and the $n^{th}$ back-end GPU Domain, transfer communication information of the corresponding $n^{th}$ back-end GPU Domain to the $m^{th}$ front-end VM, and transfer communication information of the corresponding $m^{th}$ front-end VM to the $n^{th}$ back-end GPU Domain, so that front-end and back-end service channels are established between the $m^{th}$ front-end VM and the $n^{th}$ back-end GPU Domain.

In a first possible implementation manner of the fourth aspect, the GPU Domain management module is specifically configured to create N back-end GPU Domains according to a configured GPU Domain creation policy, where the N back-end GPU Domains have operating systems of multiple types, and the GPU Domain creation policy includes one or more of the following: a quantity of GPU Domains, a quantity of GPUs that are pass-through to the GPU Domain, and types of operating systems of the GPU Domains; and when the $m^{th}$ front-end VM of the M front-end VMs is started, select, from the created N back-end GPU Domains according to the type of the operating system of the started $m^{th}$ front-end VM, the $n^{th}$ back-end GPU Domain having the operating system of the corresponding type, where there is the association relationship between the $m^{th}$ front-end VM and the $n^{th}$ back-end GPU Domain.

In a second possible implementation manner of the fourth aspect, the GPU Domain management module is specifically configured to: when the $m^{th}$ front-end VM of the M front-end VMs is started, create, according to the type of the operating system of the started $m^{th}$ front-end VM, the $n^{th}$ back-end GPU Domain having the operating system of the corresponding type, where there is the association relationship between the $m^{th}$ front-end VM and the $n^{th}$ back-end GPU Domain.

With reference to the fourth aspect or the first or second possible implementation manner of the first aspect, in a third possible implementation manner of the fourth aspect, the communication information is a shared memory device identifier, and the inter-virtual machine communication IVC management module is specifically configured to: based on the association relationship between the $m^{th}$ front-end VM and the n$^{th}$ back-end GPU Domain, transfer the shared memory device identifier of the corresponding n$^{th}$ back-end GPU Domain to the m$^{th}$ front-end VM, and transfer the shared memory device identifier of the corresponding m$^{th}$ front-end VM to the n$^{th}$ back-end GPU Domain, so that event channels between the m$^{th}$ front-end VM and the n$^{th}$ back-end GPU Domain are bound based on the shared memory device identifier of the n$^{th}$ back-end GPU Domain and the shared memory device identifier of the m$^{th}$ front-end VM.

With reference to the fourth aspect or the first or second possible implementation manner of the fourth aspect, in a fourth possible implementation manner of the fourth aspect, the communication information is network address information, and the inter-virtual machine communication IVC management module is specifically configured to: based on the association relationship between the m$^{th}$ front-end VM and the n$^{th}$ back-end GPU Domain, transfer the network address information of the corresponding n$^{th}$ back-end GPU Domain to the m$^{th}$ front-end VM, and transfer the network address information of the corresponding m$^{th}$ front-end VM to the n$^{th}$ back-end GPU Domain, so that a network connection is established between the m$^{th}$ front-end VM and the n$^{th}$ back-end GPU Domain based on the network address information of the n$^{th}$ back-end GPU Domain and the network address information of the m$^{th}$ front-end VM.

According to a fifth aspect, an embodiment of the present invention provides a cluster system, including the foregoing physical host.

In a first possible implementation manner of the fifth aspect, the cluster system further includes a client device having a communicative connection with a front-end virtual machine on the physical host, where the client device is configured to display data transferred from the corresponding front-end virtual machine.

According to a sixth aspect, an embodiment of the present invention provides a method for implementing graphics processing unit GPU virtualization, where the method includes: transferring a GPU command to be transferred by an m$^{th}$ front-end VM, to an n$^{th}$ back-end GPU Domain based on front-end and back-end service channels between the n$^{th}$ back-end GPU Domain of N back-end graphics processing unit Domains GPUs in a physical host and the m$^{th}$ front-end VM of M front-end virtual machines VMs in the physical host, where a type of an operating system of the n$^{th}$ back-end GPU Domain is the same as a type of an operating system of the m$^{th}$ front-end VM, N is a positive integer greater than or equal to 1, M is a positive integer greater than or equal to 1, M is greater than or equal to N, n is a positive integer is less than or equal to N, and m is a positive integer is less than or equal to M; and processing, by using one or more GPUs in the physical host, the GPU command obtained by the n$^{th}$ back-end GPU Domain, to obtain corresponding processing result data.

In a first possible implementation manner of the sixth aspect, the method further includes:

transferring the corresponding processing result data from the n$^{th}$ back-end GPU Domain to the m$^{th}$ front-end VM based on the front-end and back-end service channels between the n$^{th}$ back-end GPU Domain of the N back-end GPU Domains and the m$^{th}$ front-end VM of the M front-end VMs.

With reference to the sixth aspect or the first possible implementation manner of the sixth aspect, in a second possible implementation manner of the sixth aspect, the front-end and back-end service channels between the n$^{th}$ back-end GPU Domain of the N back-end GPU Domains and the m$^{th}$ front-end VM of the M front-end VMs are established by using a following method:

determining, when the m$^{th}$ front-end VM of the M front-end VMs is started, according to the type of the operating system of the started m$^{th}$ front-end VM, the n$^{th}$ back-end GPU Domain having an operating system of a corresponding type, where there is an association relationship between the m$^{th}$ front-end VM and the n$^{th}$ back-end GPU Domain; and based on the association relationship between the m$^{th}$ front-end VM and the n$^{th}$ back-end GPU Domain, transferring communication information of the corresponding n$^{th}$ back-end GPU Domain to the m$^{th}$ front-end VM, and transferring communication information of the corresponding m$^{th}$ front-end VM to the n$^{th}$ back-end GPU Domain, so that the front-end and back-end service channels are established between the m$^{th}$ front-end VM and the n$^{th}$ back-end GPU Domain.

With reference to the first possible implementation manner of the sixth aspect, in a third possible implementation manner of the sixth aspect, the method further includes:

creating the N back-end GPU Domains according to a configured GPU Domain creation policy, where the N back-end GPU Domains have operating systems of multiple types, and the GPU Domain creation policy includes one or more of the following: a quantity of GPU Domains, a quantity of GPUs that are pass-through to the GPU Domain, and types of operating systems of the GPU Domains; and the determining, when the m$^{th}$ front-end VM of the M front-end VMs is started, according to the type of the operating system of the started m$^{th}$ front-end VM, the n$^{th}$ back-end GPU Domain having an operating system of a corresponding type includes: selecting, when the m$^{th}$ front-end VM of the M front-end VMs is started, from the created N back-end GPU Domains according to the type of the operating system of the started m$^{th}$ front-end VM, the n$^{th}$ back-end GPU Domain having the operating system of the corresponding type.

With reference to the second possible implementation manner of the sixth aspect, in a fourth possible implementation manner of the sixth aspect, the determining, when the m$^{th}$ front-end VM of the M front-end VMs is started, according to the type of the operating system of the started m$^{th}$ front-end VM, the n$^{th}$ back-end GPU Domain having an operating system of a corresponding type includes: creating, when the m$^{th}$ front-end VM of the M front-end VMs is started, according to the type of the operating system of the started m$^{th}$ front-end VM, the n$^{th}$ back-end GPU Domain having the operating system of the corresponding type.

With reference to any one of the second to fourth possible implementation manners of the sixth aspect, in a fifth possible implementation manner of the sixth aspect, if the communication information is a shared memory device identifier, the establishing the front-end and back-end service channels between the m$^{th}$ front-end VM and the n$^{th}$ back-end GPU Domain includes:

binding event channels between the m$^{th}$ front-end VM and the n$^{th}$ back-end GPU Domain based on the shared memory device identifier of the m$^{th}$ front-end VM and the shared memory device identifier of the n$^{th}$ back-end GPU Domain.

With reference to the fifth possible implementation manner of the sixth aspect, in a sixth possible implementation manner of the sixth aspect, the transferring a GPU command to be transferred by an m$^{th}$ front-end VM, to an n$^{th}$ back-end GPU Domain based on front-end and back-end service channels between the $n^{th}$ back-end GPU Domain of N back-end GPU Domains and the $m^{th}$ front-end VM of M front-end VMs includes:

writing, to a shared memory between the $m^{th}$ front-end VM and the $n^{th}$ back-end GPU Domain, the GPU command to be transferred by the $m^{th}$ front-end VM; and sending an $m^{th}$ front-end event notification of the $m^{th}$ front-end VM to the $n^{th}$ back-end GPU Domain through the bound event channels between the $m^{th}$ front-end VM and the $n^{th}$ back-end GPU Domain, where the $m^{th}$ front-end event notification is used to represent location information, of the to-be-transferred GPU command, in the shared memory; and the processing, by using one or more GPUs in the physical host, the GPU command obtained by the $n^{th}$ back-end GPU Domain, to obtain corresponding processing result data includes:

reading the GPU command from a corresponding address space of the shared memory between the $m^{th}$ front-end VM and the $n^{th}$ back-end GPU Domain according to the $m^{th}$ front-end event notification received by the $n^{th}$ back-end GPU Domain; and processing the read GPU command by using one or more GPUs in the physical host that are pass-through to the $n^{th}$ back-end GPU Domain, to obtain the corresponding processing result data.

With reference to the sixth possible implementation manner of the sixth aspect, in a seventh possible implementation manner of the sixth aspect, the method further includes:

sending an $n^{th}$ back-end event notification of the $n^{th}$ back-end GPU Domain to the $m^{th}$ front-end VM through the bound event channels between the $m^{th}$ front-end VM and the $n^{th}$ back-end GPU Domain, where the $n^{th}$ back-end event notification is used to represent that data reading is complete; and releasing, according to the $n^{th}$ back-end event notification received by the $m^{th}$ front-end VM, a memory space that has been occupied by data read by the $n^{th}$ back-end GPU Domain.

With reference to the fifth or sixth possible implementation manner of the sixth aspect, in an eighth possible implementation manner of the sixth aspect, the transferring the corresponding processing result data from the $n^{th}$ back-end GPU Domain to the $m^{th}$ front-end VM based on the front-end and back-end service channels between the $n^{th}$ back-end GPU Domain of the N back-end GPU Domains and the $m^{th}$ front-end VM of the M front-end VMs, includes:

writing, to a shared memory between the $m^{th}$ front-end VM and the $n^{th}$ back-end GPU Domain, the processing result data to be transferred by the $n^{th}$ back-end GPU Domain;

sending an $n^{th}$ back-end event notification of the $n^{th}$ back-end GPU Domain to the $m^{th}$ front-end VM through the bound event channels between the $m^{th}$ front-end VM and the $n^{th}$ back-end GPU Domain, where the $n^{th}$ back-end event notification is used to represent location information, of the to-be-transferred processing result data, in the shared memory; and read the processing result data from the corresponding address space of the shared memory between the $m^{th}$ front-end VM and the $n^{th}$ back-end GPU Domain according to the $n^{th}$ back-end event notification received by the $m^{th}$ front-end VM.

With reference to the eighth possible implementation manner of the sixth aspect, in a ninth possible implementation manner of the sixth aspect, the method further includes:

sending the $m^{th}$ front-end event notification of the $m^{th}$ front-end VM to the $n^{th}$ back-end GPU Domain through the bound event channels between the $m^{th}$ front-end VM and the $n^{th}$ back-end GPU Domain, where the $m^{th}$ front-end event notification is used to represent that data reading is complete; and releasing, according to the $m^{th}$ front-end event notification received by the $n^{th}$ back-end GPU Domain, a memory space that has been occupied by data read by the $m^{th}$ front-end VM.

With reference to the sixth or eighth possible implementation manner of the sixth aspect, in a tenth possible implementation manner of the sixth aspect, the shared memory between the $m^{th}$ front-end VM and the $n^{th}$ back-end GPU Domain includes: a front-end-to-back-end transmission shared memory and a back-end-to-front-end transmission shared memory, where the writing, to a shared memory between the $m^{th}$ front-end VM and the $n^{th}$ back-end GPU Domain, the GPU command to be transferred by the $m^{th}$ front-end VM includes: writing, to the front-end-to-back-end transmission shared memory, the GPU command to be transferred by the $m^{th}$ front-end VM, where the $m^{th}$ front-end VM has read and write permissions for the front-end-to-back-end transmission shared memory, and the $n^{th}$ back-end GPU Domain has a read-only permission for the front-end-to-back-end transmission shared memory; and correspondingly, the reading the GPU command from a corresponding address space of the shared memory according to the $m^{th}$ front-end event notification received by the $n^{th}$ back-end GPU Domain includes: reading the GPU command from a corresponding address space of the front-end-to-back-end transmission shared memory according to the $m^{th}$ front-end event notification received by the $n^{th}$ back-end GPU Domain, where the $m^{th}$ front-end event notification is used to represent location information, of the to-be-transferred GPU command, in the front-end-to-back-end transmission shared memory;

or, the writing, to a shared memory between the $m^{th}$ front-end VM and the $n^{th}$ back-end GPU Domain, the processing result data to be transferred by the $n^{th}$ back-end GPU Domain includes: writing, to the back-end-to-front-end transmission shared memory, the processing result data to be transferred by the $n^{th}$ back-end GPU Domain, where the $n^{th}$ back-end GPU Domain has read and write permissions for the back-end-to-front-end transmission shared memory, and the $m^{th}$ front-end VM has a read-only permission for the back-end-to-front-end transmission shared memory; and correspondingly, the reading the processing result data from the corresponding address space of the shared memory between the $m^{th}$ front-end VM and the $n^{th}$ back-end GPU Domain according to the $n^{th}$ back-end event notification received by the $m^{th}$ front-end VM includes: reading the processing result data from a corresponding address space of the back-end-to-front-end transmission shared memory according to the $n^{th}$ back-end event notification received by the $m^{th}$ front-end VM, where the $n^{th}$ back-end event notification is used to represent location information, of the to-be-transferred processing result data, in the back-end-to-front-end transmission shared memory.

With reference to any one of the second to fourth possible implementation manners of the sixth aspect, in an eleventh possible implementation manner of the sixth aspect, if the communication information is network address information, the establishing the front-end and back-end service channels between the $m^{th}$ front-end VM and the $n^{th}$ back-end GPU Domain includes:

establishing a network connection between the $m^{th}$ front-end VM and the $n^{th}$ back-end GPU Domain based on the network address information of the $m^{th}$ front-end VM and the network address information of the $n^{th}$ back-end GPU Domain.

With reference to the eleventh possible implementation manner of the sixth aspect, in a twelfth possible implementation manner of the sixth aspect, the transferring a GPU command to be transferred by an $m^{th}$ front-end VM, to an $n^{th}$ back-end GPU Domain based on front-end and back-end service channels between the $n^{th}$ back-end GPU Domain of N back-end GPU Domains and the $m^{th}$ front-end VM of M front-end VMs includes:

sending the GPU command to be transferred by the $m^{th}$ front-end VM, to the $n^{th}$ back-end GPU Domain over the network connection between the $m^{th}$ front-end VM and the $n^{th}$ back-end GPU Domain.

With reference to the eleventh or twelfth possible implementation manner of the sixth aspect, in a thirteenth possible implementation manner of the sixth aspect, the transferring the corresponding processing result data from the $n^{th}$ back-end GPU Domain to the $m^{th}$ front-end VM based on the front-end and back-end service channels between the $n^{th}$ back-end GPU Domain of the N back-end GPU Domains and the $m^{th}$ front-end VM of the M front-end VMs includes:

sending the processing result data to be transferred by the $n^{th}$ back-end GPU Domain, to the $m^{th}$ front-end VM over the network connection between the $m^{th}$ front-end VM and the $n^{th}$ back-end GPU Domain.

With reference to the sixth aspect or the first possible implementation manner of the sixth aspect, in a fourteenth possible implementation manner of the sixth aspect, the method further includes: determining, according to an estimated compression time, an estimated decompression time, an estimated compressed-data transmission time, and an estimated non-compression direct-transmission time that are of the GPU command, to compress the GPU command;

the transferring a GPU command to be transferred by an $m^{th}$ front-end VM, to an $n^{th}$ back-end GPU Domain includes: compressing the GPU command to be transferred by the $m^{th}$ front-end VM, and transferring the compressed GPU command to the $n^{th}$ back-end GPU Domain;

the method further includes: determining that the GPU command transferred to the $n^{th}$ back-end GPU Domain has been compressed; and the processing, by using one or more GPUs in the physical host, the GPU command transferred to the $n^{th}$ back-end GPU Domain, to obtain the corresponding processing result data includes: decompressing the compressed GPU command transferred to the $n^{th}$ back-end GPU Domain, and processing the decompressed GPU command by using one or more GPUs in the physical host that are pass-through to the $n^{th}$ back-end GPU Domain, to obtain the corresponding processing result data.

With reference to the fourteenth possible implementation manner of the sixth aspect, in a fifteenth possible implementation manner of the sixth aspect, the method further includes:

determining, according to an estimated compression time, an estimated decompression time, an estimated compressed-data transmission time, and an estimated non-compression direct-transmission time that are of the processing result data, to compress the processing result data; and the transferring the processing result data to be transferred by the $n^{th}$ back-end GPU Domain, to the $m^{th}$ front-end VM includes: compressing the processing result data to be transferred by the $n^{th}$ back-end GPU Domain, and transferring the compressed processing result data to the $m^{th}$ front-end VM.

According to a seventh aspect, an embodiment of the present invention provides a physical host, where the physical host includes: a graphics processing unit GPU, a memory, and a central processing unit CPU connected to the memory, where the central processing unit is configured to: by invoking an operation instruction stored in the memory, transfer a GPU command to be transferred by an $m^{th}$ front-end VM, to an $n^{th}$ back-end GPU Domain based on front-end and back-end service channels between the $n^{th}$ back-end GPU Domain of N back-end GPU Domains and the $m^{th}$ front-end VM of M front-end VMs; and process, by using one or more of the graphics processing units, the GPU command obtained by the $n^{th}$ back-end GPU Domain, to obtain corresponding processing result data, where a type of an operating system of the $n^{th}$ back-end GPU Domain of the N back-end GPU Domains is the same as a type of an operating system of the $m^{th}$ front-end VM of the M front-end VMs, N is a positive integer greater than or equal to 1, M is a positive integer greater than or equal to 1, M is greater than or equal to N, n is a positive integer is less than or equal to N, and m is a positive integer is less than or equal to M.

In a first possible implementation manner of the seventh aspect, the central processing unit is further configured to transfer the corresponding processing result data from the $n^{th}$ back-end GPU Domain to the $m^{th}$ front-end VM based on the front-end and back-end service channels between the $n^{th}$ back-end GPU Domain of the N back-end GPU Domains and the $m^{th}$ front-end VM of the M front-end VMs.

With reference to the seventh aspect or the first possible implementation manner of the seventh aspect, in a second possible implementation manner of the seventh aspect, the central processing unit is further configured to: when the $m^{th}$ front-end VM of the M front-end VMs is started, determine, according to the type of the operating system of the started $m^{th}$ front-end VM, the $n^{th}$ back-end GPU Domain having an operating system of a corresponding type, where there is an association relationship between the $m^{th}$ front-end VM and the $n^{th}$ back-end GPU Domain; and based on the association relationship between the $m^{th}$ front-end VM and the $n^{th}$ back-end GPU Domain, transfer communication information of the corresponding $n^{th}$ back-end GPU Domain to the $m^{th}$ front-end VM, and transfer communication information of the corresponding $m^{th}$ front-end VM to the $n^{th}$ back-end GPU Domain, so that the front-end and back-end service channels are established between the $m^{th}$ front-end VM and the $n^{th}$ back-end GPU Domain.

As can be seen above, the physical host in the embodiments of the present invention includes: a hardware layer including a GPU, a host Host running on the hardware layer, and N back-end GPU Domains and M front-end virtual machines VMs that run on the Host, where there are corresponding front-end and back-end service channels between the N back-end GPU Domains and the M front-end VMs, where the $m^{th}$ front-end VM is configured to transfer a to-be-transferred GPU command to an $n^{th}$ back-end GPU Domain based on front-end and back-end service channels between the $n^{th}$ back-end GPU Domain of the N back-end GPU Domains and the $m^{th}$ front-end VM of the M front-end VMs; and the $n^{th}$ back-end GPU Domain is configured to process the GPU command by using one or more GPUs, to obtain corresponding processing result data. It can be seen that in the embodiments of the present invention, the N dedicated back-end GPU Domains are introduced to provide a GPU virtualization capability and service to the M front-end VMs. On the premise that the N back-end GPU Domains provide the GPU virtualization capability and service to the M front-end VMs, types of operating systems of the N back-end GPU Domains may be flexibly configured according to types of operating systems of the M front-end VMs. For example, one back-end GPU Domain may correspondingly serve one or more front-end VMs of a same type of OS, or back-end GPU Domains of different types of OSs may serve front-end VMs of different types of OSs. Because there are front-end and back-end service channels between the $n^{th}$ back-end GPU Domain of the N back-end GPU Domains and the $m^{th}$ front-end VM of the M front-end VMs, and a type of an operating system of the $n^{th}$ back-end GPU Domain is the same as a type of an operating system of the $m^{th}$ front-end VM, a GPU command transferred from the $m^{th}$ front-end VM may be directly executed on the $n^{th}$ back-end GPU Domain having an operating system of a same type, thereby avoiding a problem of conversion between different GPU command libraries, thereby further avoiding problems of an extra overhead, a delay, and stability that are caused by the conversion between the GPU command libraries, so that performance of a GPU virtualization system is ensured.

In addition, because the N dedicated back-end GPU Domains are introduced to provide the GPU virtualization capability and service to the M front-end VMs, a case in which performance of a GPU virtualization system is affected because a Host OS easily becomes a bottleneck for performance of GPU virtualization in a process that the Host OS is responsible for GPU virtualization in the prior art is also avoided, thereby also ensuring the performance of the GPU virtualization system.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 2-b is a schematic flowchart of another method for implementing GPU virtualization according to an embodiment of the present invention;

DESCRIPTION OF EMBODIMENTS

Figure 1:
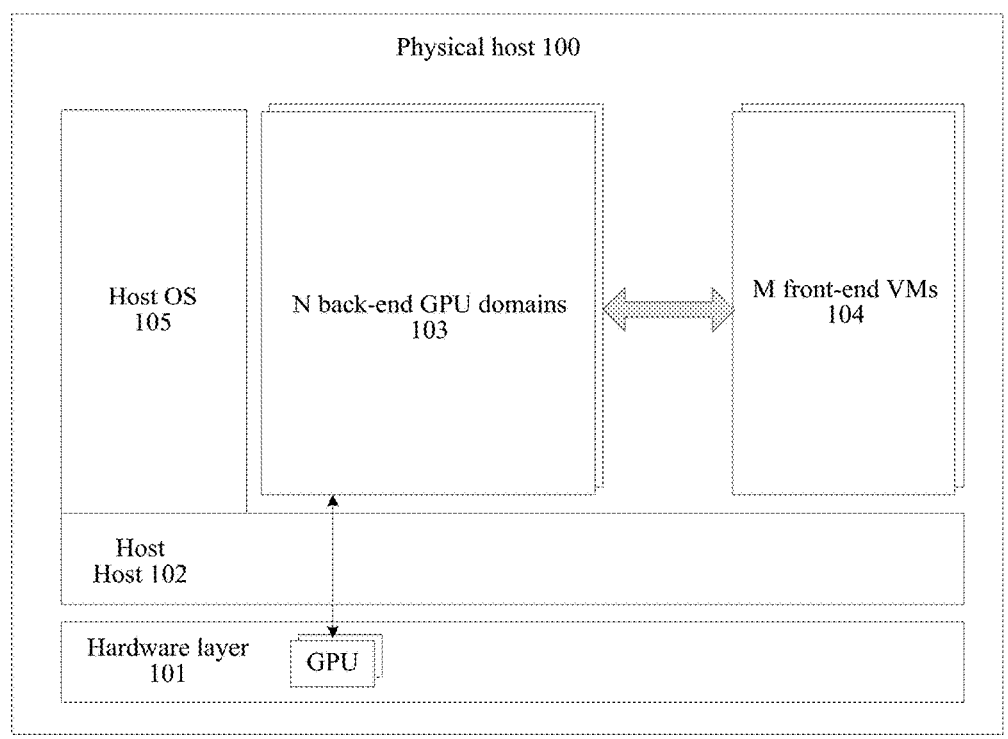
FIG. 1 is a schematic structural diagram of a physical host according to an embodiment of the present invention.

To make a person skilled in the art understand the technical solutions in the present invention better, the following clearly and completely describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

To help to understand the embodiments of the present invention, several elements introduced in the description of the embodiments of the present invention are described herein first.

Virtual Machine VM:

One or more virtual computers may be simulated on one physical computer by using virtual machine software, and these virtual machines work as real computers. An operating system and an application program may be installed in a virtual machine, and the virtual machine may further access a network resource. For the application program that runs in the virtual machine, the virtual machine works as a real computer.

Hardware Layer:

A hardware layer is a hardware platform where a virtualization environment is run. The hardware layer may include multiple types of hardware. For example, a hardware layer of a computing node may include a processor (for example, a CPU and a GPU) and a memory, and may further include a high-speed/low-speed input/output (I/O, Input/Output) device such as a network interface card and a memory.

Host (Host):

As a management layer, a host is used to complete management and allocation of a hardware resource, present a virtual hardware platform for a virtual machine, and implement scheduling and isolation of a virtual machine. The host may be a virtual machine monitor (VMM). In addition, sometimes a VMM and one privileged virtual machine cooperate and form a host. The virtual hardware platform provides various hardware resources to virtual machines that run on the virtual hardware platform. For example, the virtual hardware platform provides a virtual processor, a virtual memory, a virtual disk, a virtual network interface card, and the like. The virtual machine runs on the virtual hardware platform prepared by the Host for the virtual machine, and one or more virtual machines run on the Host.

Host Operating System (Host OS):

For example, the Host OS is referred to as Dom0 on a Xen Hypervisor platform. A driver program for a real physical device such as a network interface card or a SCSI disk may be installed in Dom0, and the real physical device such as the network interface card or the SCSI disk can be detected and directly accessed. However, a native official driver of a GPU cannot be installed in Dom0.

For ease of description and to simplify the accompanying drawings, the Chinese and English expressions introduced hereinafter are listed herein:

VM: Virtual Machine, virtual machine

VMM: Virtual Machine Monitor, virtual machine monitor

GPU: Graphics Processing Unit, graphics processing unit

GPGPU: General-Purpose GPU, general-purpose graphics processing unit

Faked GPU Library: Simulated GPU command library, also named simulated GPU interface library GPU Domain Manager: GPU domain manager, also named GPU domain management device Virtual GPU Service: Virtual GPU service GPU library: GPU command library, also named GPU interface library Desktop Protocol: Desktop protocol Shmem Device: Shared memory device IVC Manager: Inter-virtual machine communication manager, also named inter-virtual machine communication management device GPU Service Dispatcher: GPU service dispatcher Virtual GPU Driver: Virtual GPU driver Embodiment 1

Referring to FIG. 1, FIG. 1 is a schematic structural diagram of a physical host 100 according to an embodiment of the present invention. As shown in FIG. 1, the physical host 100 in this embodiment of the present invention includes: a hardware layer 101 including a GPU, a host Host 102 running on the hardware layer, and N back-end graphics processing unit domains (that is, back-end GPU Domains) (represented by 103 in the figure) and M front-end virtual machines VMs (represented by 104 in the figure) that run on the Host 102, where there are corresponding front-end and back-end service channels between the N back-end GPU Domains and the M front-end VMs, where there are front-end and back-end service channels between an $n^{th}$ back-end GPU Domain of the N back-end GPU Domains and an $m^{th}$ front-end VM of the M front-end VMs, N is a positive integer greater than or equal to 1, M is a positive integer greater than or equal to 1, M is greater than or equal to N, n is a positive integer is less than or equal to N, and m is a positive integer is less than or equal to M.

The $m^{th}$ front-end VM is configured to transfer a to-be-transferred GPU command to the $n^{th}$ back-end GPU Domain based on the front-end and back-end service channels between the $n^{th}$ back-end GPU Domain of the N back-end GPU Domains and the $m^{th}$ front-end VM of the M front-end VMs.

The $n^{th}$ back-end GPU Domain is configured to process the GPU command by using one or more GPUs, to obtain corresponding processing result data, where a type of an operating system of the $n^{th}$ back-end GPU Domain is the same as a type of an operating system of the $m^{th}$ front-end VM. The processing result data herein may be a return value of the GPU command, or may be to-be-returned data (for example, to-be-returned image data or to-be-returned computing result data); the processing result data includes, but is not limited thereto. It should be noted that one or more GPUs in the physical host may be used to process the GPU command.

One or more physical GPUs included in the hardware layer 11 are pass-through to the N back-end GPU Domains. The N back-end GPU Domains may directly access a physical GPU, thereby ensuring that performance of a GPU on a back-end GPU Domain approaches performance of a physical GPU. One or more physical GPUs may be pass-through to each back-end GPU Domain. For example, by means of an input/output memory management unit (that is, IOMMU) technology, one or more physical GPUs included in the hardware layer may be pass-through to the N back-end GPU Domains. After a physical GPU is pass-through to a back-end GPU Domain, not only it is ensured that performance of a GPU on the back-end GPU Domain approaches performance of a physical GPU, but also a native official driver of a GPU can be directly installed in the back-end GPU Domain, so that a problem that some native official drivers cannot be installed in some host operating systems Host OSs when GPU virtualization is implemented based on a host operating system (that is, Host OS) in the prior art is resolved.

In this embodiment of the present invention, if the GPU command does not have a return value, the GPU command is complete. If the GPU command has a return value or has to-be-returned data (for example, to-be-returned image data or to-be-returned computing result data), correspondingly, the $n^{th}$ back-end GPU Domain is further configured to transfer the corresponding processing result data to the $m^{th}$ front-end VM based on the front-end and back-end service channels between the $n^{th}$ back-end GPU Domain of the N back-end GPU Domains and the $m^{th}$ front-end VM of the M front-end VMs.

Moreover, the physical host in this embodiment of the present invention further includes: a host operating system Host OS 105 running on the host, and the Host OS 105 is configured to establish the front-end and back-end service channels between the N back-end GPU Domains 103 and the M front-end VMs 104. The front-end and back-end service channels between the N back-end GPU Domains 103 and the M front-end VMs 104 may be established in the following manner: when the $m^{th}$ front-end VM of the M front-end VMs is started, the $n^{th}$ back-end GPU Domain having an operating system of a corresponding type is determined according to the type of the operating system of the started $m^{th}$ front-end VM, where there is an association relationship between the $m^{th}$ front-end VM and the $n^{th}$ back-end GPU Domain; and based on the association relationship between the $m^{th}$ front-end VM and the $n^{th}$ back-end GPU Domain, communication information of the corresponding $n^{th}$ back-end GPU Domain is transferred to the $m^{th}$ front-end VM, and communication information of the corresponding $m^{th}$ front-end VM is transferred to the $n^{th}$ back-end GPU Domain, so that the front-end and back-end service channels are established between the $m^{th}$ front-end VM and the $n^{th}$ back-end GPU Domain.

In a specific implementation manner, the Host OS 105 is specifically configured to:

create the N back-end GPU Domains according to a configured GPU Domain creation policy, where the N back-end GPU Domains have operating systems of multiple types, the GPU Domain creation policy includes one or more of the following: a quantity of GPU Domains, a quantity of GPUs that are pass-through to the GPU Domain, and types of operating systems of the GPU Domains, and the operating systems of multiple types herein include, but are not limited to, Windows and Linux;

when the $m^{th}$ front-end VM of the M front-end VMs is started, select, from the N back-end GPU Domains according to the type of the operating system of the started $m^{th}$ front-end VM, the $n^{th}$ back-end GPU Domain having the operating system of the corresponding type, where there is the association relationship between the $m^{th}$ front-end VM and the $n^{th}$ back-end GPU Domain; and based on the association relationship between the $m^{th}$ front-end VM and the $n^{th}$ back-end GPU Domain, transfer the communication information of the corresponding $n^{th}$ back-end GPU Domain to the $m^{th}$ front-end VM, and transfer the communication information of the corresponding $m^{th}$ front-end VM to the $n^{th}$ back-end GPU Domain, so that the front-end and back-end service channels are established between the $m^{th}$ front-end VM and the $n^{th}$ back-end GPU Domain.

In another specific implementation manner, the Host OS 105 is specifically configured to:

when the $m^{th}$ front-end VM of the M front-end VMs is started, create, according to the type of the operating system of the started $m^{th}$ front-end VM, the $n^{th}$ back-end GPU Domain having the operating system of the corresponding type, where there is the association relationship between the $m^{th}$ front-end VM and the $n^{th}$ back-end GPU Domain; and based on the association relationship between the $m^{th}$ front-end VM and the $n^{th}$ back-end GPU Domain, transfer the communication information of the corresponding $n^{th}$ back-end GPU Domain to the $m^{th}$ front-end VM, and transfer the communication information of the corresponding $m^{th}$ front-end VM to the $n^{th}$ back-end GPU Domain, so that the front-end and back-end service channels are established between the $m^{th}$ front-end VM and the $n^{th}$ back-end GPU Domain.

It should be noted that in the physical host in this embodiment of the present invention, the Host OS 105 is further configured to manage or record association relationships between the M front-end VMs and the N back-end GPU Domains, where the association relationships between the M front-end VMs and the N back-end GPU Domains include the association relationship between the $m^{th}$ front-end VM and the $n^{th}$ back-end GPU Domain. Moreover, when the $m^{th}$ front-end VM exits, the Host OS 105 is further configured to delete the association relationship between the $m^{th}$ front-end VM and the $n^{th}$ back-end GPU Domain.

As can be seen above, in the physical host provided in this embodiment of the present invention, there are front-end and back-end service channels between an $n^{th}$ back-end GPU Domain of the N back-end GPU Domains and an $m^{th}$ front-end VM of the M front-end VMs, the $m^{th}$ front-end VM transfers a to-be-transferred GPU command to the $n^{th}$ back-end GPU Domain based on the front-end and back-end service channels between the $n^{th}$ back-end GPU Domain and the $m^{th}$ front-end VM, and the $n^{th}$ back-end GPU Domain processes the GPU command by using one or more GPUs in the physical host, to obtain corresponding processing result data. It can be seen that in this embodiment of the present invention, the N dedicated back-end GPU Domains are introduced to provide a GPU virtualization capability and service to the M front-end VMs. On the premise that the N back-end GPU Domains provide the GPU virtualization capability and service to the M front-end VMs, types of operating systems of the N back-end GPU Domains may be flexibly configured according to types of operating systems of the M front-end VMs. For example, one back-end GPU Domain may correspondingly serve one or more front-end VMs of a same type of OS, or back-end GPU Domains of different types of OSs may serve front-end VMs of different types of OSs. Because there are front-end and back-end service channels between the $n^{th}$ back-end GPU Domain of the N back-end GPU Domains and the $m^{th}$ front-end VM of the M front-end VMs, and a type of an operating system of the $n^{th}$ back-end GPU Domain is the same as a type of an operating system of the $m^{th}$ front-end VM, a GPU command transferred from the $m^{th}$ front-end VM may be directly executed on the $n^{th}$ back-end GPU Domain having an operating system of a same type, thereby avoiding a problem of conversion between different GPU command libraries, thereby further avoiding problems of an extra overhead, a delay, and stability that are caused by the conversion between the GPU command libraries, so that performance of a GPU virtualization system is ensured.

(1) Efficient and rapid transmission of a GPU command and data between a front-end virtual machine and a back-end GPU Domain is an aspect affecting performance and an effect in a current method for implementing GPU virtualization based on redirection of a GPU command, which is taken into consideration. In this embodiment of the present invention, in an implementation manner, in a GPU virtualization architecture based on a GPU Domain, a GPU command and processing result data are transmitted by using a shared memory between a front-end virtual machine and a back-end GPU Domain, to achieve efficient transmission of a GPU command and data.

Correspondingly, the foregoing communication information is a shared memory device identifier, and in the aspect of establishing the front-end and back-end service channels between the $m^{th}$ front-end VM and the $n^{th}$ back-end GPU Domain, the $m^{th}$ front-end VM is specifically configured to initiate binding of event channels between the $m^{th}$ front-end VM and the $n^{th}$ back-end GPU Domain based on the shared memory device identifier of the $m^{th}$ front-end VM and the shared memory device identifier of the $n^{th}$ back-end GPU Domain; or, the $n^{th}$ back-end GPU Domain is specifically configured to initiate binding of event channels between the $m^{th}$ front-end VM and the $n^{th}$ back-end GPU Domain based on the shared memory device identifier of the $m^{th}$ front-end VM and the shared memory device identifier of the $n^{th}$ back-end GPU Domain.

Correspondingly, in the aspect of transferring a to-be-transferred GPU command to an $n^{th}$ back-end GPU Domain based on front-end and back-end service channels between the $n^{th}$ back-end GPU Domain of N back-end GPU Domains and the $m^{th}$ front-end VM of M front-end VMs, the $m^{th}$ front-end VM is specifically configured to write the to-be-transferred GPU command to a shared memory between the $m^{th}$ front-end VM and the $n^{th}$ back-end GPU Domain; and send an $m^{th}$ front-end event notification to the $n^{th}$ back-end GPU Domain through the bound event channels between the $m^{th}$ front-end VM and the $n^{th}$ back-end GPU Domain, where the $m^{th}$ front-end event notification is used to represent location information, of the to-be-transferred GPU command, in the shared memory. The location information herein includes, but is not limited to, an offset address, a length, and the like of the GPU command in the shared memory.

Correspondingly, in the aspect of processing the GPU command by using one or more GPUs in the physical host, to obtain corresponding processing result data, the $n^{th}$ back-end GPU Domain is specifically configured to read the GPU command from a corresponding address space of the shared memory between the $m^{th}$ front-end VM and the $n^{th}$ back-end GPU Domain according to the received $m^{th}$ front-end event notification; and process the read GPU command by using one or more GPUs that are pass-through to the $n^{th}$ back-end GPU Domain, to obtain the corresponding processing result data. Therefore, by means of the shared memory technology in this embodiment of the present invention, interaction of the GPU command between the $m^{th}$ front-end VM and the $n^{th}$ back-end GPU Domain can be implemented.

To release in time a resource of the shared memory between the $n^{th}$ back-end GPU Domain and the $m^{th}$ front-end VM, the $n^{th}$ back-end GPU Domain is further configured to send an $n^{th}$ back-end event notification to the $m^{th}$ front-end VM through the event channels, where the $n^{th}$ back-end event notification is used to represent that data reading is complete; and correspondingly, the $m^{th}$ front-end VM is further configured to release, according to the received $n^{th}$ back-end event notification, a memory space that has been occupied by data read by the $n^{th}$ back-end GPU Domain.

Correspondingly, if the GPU command has a return value or has to-be-returned data (for example, to-be-returned image data or to-be-returned computing result data), in the aspect of transferring the corresponding processing result data to the $m^{th}$ front-end VM based on the front-end and back-end service channels between the $n^{th}$ back-end GPU Domain of the N back-end GPU Domains and the $m^{th}$ front-end VM of the M front-end VMs, the $n^{th}$ back-end GPU Domain is specifically configured to write the to-be-transferred processing result data to the shared memory between the $m^{th}$ front-end VM and the $n^{th}$ back-end GPU Domain; and send an $n^{th}$ back-end event notification to the $m^{th}$ front-end VM through the bound event channels between the $m^{th}$ front-end VM and the $n^{th}$ back-end GPU Domain, where the $n^{th}$ back-end event notification is used to represent location information, of the to-be-transferred processing result data, in the shared memory between the $m^{th}$ front-end VM and the $n^{th}$ back-end GPU Domain. The location information herein includes, but is not limited to, an offset address, a length, and the like of the processing result data in the shared memory.

Correspondingly, the $m^{th}$ front-end VM is further configured to read the processing result data from the corresponding address space of the shared memory between the $m^{th}$ front-end VM and the $n^{th}$ back-end GPU Domain according to the received $n^{th}$ back-end event notification. Therefore, by means of the shared memory technology in this embodiment of the present invention, interaction of the processing result data between the $m^{th}$ front-end VM and the $n^{th}$ back-end GPU Domain can be implemented.

To release in time a resource of the shared memory between the $n^{th}$ back-end GPU Domain and the $m^{th}$ front-end VM, the $m^{th}$ front-end VM is further configured to send the $m^{th}$ front-end event notification to the $n^{th}$ back-end GPU Domain through the event channels, where the $m^{th}$ front-end event notification is used to represent that data reading is complete; and correspondingly, the $n^{th}$ back-end GPU Domain is further configured to release, according to the received $m^{th}$ front-end event notification, a memory space that has been occupied by data read by the $m^{th}$ front-end VM.

In an exemplary implementation manner, the shared memory between the $m^{th}$ front-end VM and the $n^{th}$ back-end GPU Domain includes a front-end-to-back-end transmission shared memory and a back-end-to-front-end transmission shared memory, where in the aspect of writing, by the $m^{th}$ front-end VM, the to-be-transferred GPU command to the shared memory between the $m^{th}$ front-end VM and the $n^{th}$ back-end GPU Domain, the $m^{th}$ front-end VM is specifically configured to write the to-be-transferred GPU command to the front-end-to-back-end transmission shared memory, where the $m^{th}$ front-end VM has read and write permissions for the front-end-to-back-end transmission shared memory, and the $n^{th}$ back-end GPU Domain has a read-only permission for the front-end-to-back-end transmission shared memory; and correspondingly, in the aspect of reading the GPU command from the corresponding address space of the shared memory between the $m^{th}$ front-end VM and the $n^{th}$ back-end GPU Domain according to the received $m^{th}$ front-end event notification, the $n^{th}$ back-end GPU Domain is specifically configured to read the GPU command from a corresponding address space of the front-end-to-back-end transmission shared memory according to the received $m^{th}$ front-end event notification, where the $m^{th}$ front-end event notification is used to represent location information, of the to-be-transferred GPU command, in the front-end-to-back-end transmission shared memory;

or, in the aspect of writing the to-be-transferred processing result data to the shared memory between the $m^{th}$ front-end VM and the $n^{th}$ back-end GPU Domain, the $n^{th}$ back-end GPU Domain is specifically configured to write the to-be-transferred processing result data to the back-end-to-front-end transmission shared memory, where the $n^{th}$ back-end GPU Domain has read and write permissions for the back-end-to-front-end transmission shared memory, and the $m^{th}$ front-end VM has a read-only permission for the back-end-to-front-end transmission shared memory; and correspondingly, in the aspect of reading the processing result data from the corresponding address space of the shared memory between the $m^{th}$ front-end VM and the $n^{th}$ back-end GPU Domain according to the received $n^{th}$ back-end event notification, the $m^{th}$ front-end VM is specifically configured to read the processing result data from a corresponding address space of the back-end-to-front-end transmission shared memory according to the received $n^{th}$ back-end event notification, where the $n^{th}$ back-end event notification is used to represent location information, of the to-be-transferred processing result data, in the back-end-to-front-end transmission shared memory.

As can be seen above, in this embodiment of the present invention, the shared memory between the $m^{th}$ front-end VM and the $n^{th}$ back-end GPU Domain is divided into two parts: One part is used for the $m^{th}$ front-end VM to transmit data to the $n^{th}$ back-end GPU Domain, where the $m^{th}$ front-end VM has read and write permissions for this part of memory and the $n^{th}$ back-end GPU Domain has only a read permission for this part of memory. The other part is used for the $n^{th}$ back-end GPU Domain to transmit data to the $m^{th}$ front-end VM, where the $n^{th}$ back-end GPU Domain has read and write permissions for this part of memory and the $m^{th}$ front-end VM has only a read permission for this part of memory. When needing to transmit data to the $n^{th}$ back-end GPU Domain, the $m^{th}$ front-end VM may directly write the data to the part of the shared memory for which the $m^{th}$ front-end VM has a write permission, without worrying that the $n^{th}$ back-end GPU Domain may write data to the same part of the memory. Similarly, when needing to transmit data, the $n^{th}$ back-end GPU Domain may also directly write the data to the part of the shared memory for which the $n^{th}$ back-end GPU Domain has a write permission, without worrying about a conflict with the $m^{th}$ front-end VM. In this way, bidirectional and parallel transmission between the $m^{th}$ front-end VM and the $n^{th}$ back-end GPU Domain can be implemented, thereby improving transmission efficiency.

(2) Efficient and rapid transmission of a GPU command and data between a front-end virtual machine and a back-end GPU Domain is an aspect affecting performance and an effect in a current method of GPU virtualization based on redirection of a GPU command, which is taken into consideration. In this embodiment of the present invention, in another implementation manner, a GPU command and processing result data are transmitted over a network connection between an $m^{th}$ front-end VM and an $n^{th}$ back-end GPU Domain, to achieve efficient transmission of a GPU command and data.

Correspondingly, the foregoing communication information is network address information, and in the aspect of establishing the front-end and back-end service channels between the $m^{th}$ front-end VM and the $n^{th}$ back-end GPU Domain, the $m^{th}$ front-end VM is specifically configured to establish a network connection between the $m^{th}$ front-end VM and the $n^{th}$ back-end GPU Domain based on the network address information of the $m^{th}$ front-end VM and the network address information of the $n^{th}$ back-end GPU Domain; or, the $n^{th}$ back-end GPU Domain is specifically configured to establish a network connection between the $m^{th}$ front-end VM and the $n^{th}$ back-end GPU Domain based on the network address information of the $m^{th}$ front-end VM and the network address information of the $n^{th}$ back-end GPU Domain. The network address information herein includes, but is not limited to, an IP address and a port number. The network connection herein includes, but is not limited to, a TCP connection. It should be noted that a difference between the two implementation manners herein is that different initiators initiate establishment of a network connection between the $m^{th}$ front-end VM and the $n^{th}$ back-end GPU Domain.

Correspondingly, in the aspect of transferring a to-be-transferred GPU command to an $n^{th}$ back-end GPU Domain based on front-end and back-end service channels between the $n^{th}$ back-end GPU Domain of the N back-end GPU Domains and the $m^{th}$ front-end VM of the M front-end VMs, the $m^{th}$ front-end VM is specifically configured to send the to-be-transferred GPU command to the $n^{th}$ back-end GPU Domain over the network connection between the $m^{th}$ front-end VM and the $n^{th}$ back-end GPU Domain.

If the GPU command has a return value or has to-be-returned data (for example, to-be-returned image data or to-be-returned computing result data), in the aspect of transferring the corresponding processing result data to the $m^{th}$ front-end VM based on the front-end and back-end service channels between the $n^{th}$ back-end GPU Domain of the N back-end GPU Domains and the $m^{th}$ front-end VM of the M front-end VMs, the $n^{th}$ back-end GPU Domain is specifically configured to send the to-be-transferred processing result data to the $m^{th}$ front-end VM over the network connection between the $m^{th}$ front-end VM and the $n^{th}$ back-end GPU Domain.

(3) Efficient and rapid transmission of a GPU command and data between a front-end virtual machine and a back-end GPU Domain is an aspect affecting performance and an effect in a current method of GPU virtualization based on redirection of a GPU command, which is taken into consideration. In view of that transmission of a large quantity of GPU commands and a large amount of data may cause a very high pressure on transmission bandwidth of a system, in this embodiment of the present invention, a compression technology is applied to GPU virtualization, and a transmission volume is reduced and bandwidth is reduced by compressing a GPU command and data. In this embodiment of the present invention, a flexible compression policy is used to control whether to compress a GPU command and data. For example, the compression policy is to compress a GPU command and data in a case in which a transmission delay is not increased or an increased delay is acceptable.

Correspondingly, in the physical host in this embodiment of the present invention, the $m^{th}$ front-end VM is further configured to determine, according to an estimated compression time, an estimated decompression time, an estimated compressed-data transmission time, and an estimated non-compression direct-transmission time that are of the GPU command, to compress the GPU command;

correspondingly, in the aspect of transferring the to-be-transferred GPU command to the $n^{th}$ back-end GPU Domain, the $m^{th}$ front-end VM is specifically configured to compress the to-be-transferred GPU command, and transfer the compressed GPU command to the $n^{th}$ back-end GPU Domain;

correspondingly, the $n^{th}$ back-end GPU Domain is further configured to determine that the transferred GPU command has been compressed; and correspondingly, in the aspect of processing the GPU command by using one or more GPUs in the physical host, to obtain corresponding processing result data, the $n^{th}$ back-end GPU Domain is specifically configured to decompress the compressed GPU command, and process the decompressed GPU command by using one or more GPUs that are pass-through to the $n^{th}$ back-end GPU Domain, to obtain the corresponding processing result data.

If the GPU command has a return value or has to-be-returned data (for example, to-be-returned image data or to-be-returned computing result data), correspondingly, the $n^{th}$ back-end GPU Domain is further configured to determine, according to an estimated compression time, an estimated decompression time, an estimated compressed-data transmission time, and an estimated non-compression direct-transmission time that are of the processing result data, to compress the processing result data; and correspondingly, in the aspect of transferring the processing result data to the $m^{th}$ front-end VM, the $n^{th}$ back-end GPU Domain is specifically configured to compress the processing result data, and transfer the compressed processing result data to the $m^{th}$ front-end VM.

In an implementation manner, in the aspect of determining, according to an estimated compression time, an estimated decompression time, an estimated compressed-data transmission time, and an estimated non-compression direct-transmission time that are of the GPU command, to compress the GPU command, the $m^{th}$ front-end VM is specifically configured to: when a sum of the estimated compression time, the estimated decompression time, and the estimated compressed-data transmission time that are of the GPU command is less than or equal to the estimated non-compression direct-transmission time of the GPU command, determine to compress the GPU command; or, when a sum of the estimated compression time, the estimated decompression time, and the estimated compressed-data transmission time that are of the GPU command is less than or equal to a sum of the estimated non-compression direct-transmission time of the GPU command and an adjustment value, determine to compress the GPU command;

or, in an implementation manner, in the aspect of determining, according to the estimated compression time, the estimated decompression time, the estimated compressed-data transmission time, and the estimated non-compression direct-transmission time that are of the processing result data, to compress the processing result data, the $n^{th}$ back-end GPU Domain is specifically configured to: when a sum of the estimated compression time, the estimated decompression time, and the estimated compressed-data transmission time that are of the processing result data is less than or equal to the estimated non-compression direct-transmission time of the processing result data, determine to compress the processing result data; or, when a sum of the estimated compression time, the estimated decompression time, and the estimated compressed-data transmission time that are of the processing result data is less than or equal to a sum of the estimated non-compression direct-transmission time of the processing result data and an adjustment value, determine to compress the processing result data.

In the physical host in this embodiment of the present invention, operating systems of N back-end GPU Domains may be flexibility configured according to operating systems of M front-end virtualization, and the operating systems of the N back-end GPU Domains may be different operating systems such as Windows and Linux. For example, a back-end GPU Domain of a Windows operating system provides a GPU virtualization service to a front-end virtual machine of the Windows operating system, and a back-end GPU Domain of a Linux operating system provides a GPU virtualization service to a front-end virtual machine of the Linux operating system, so that a GPU command transferred from the front-end virtual machine of Windows may be directly executed on the back-end GPU Domain of Windows, and the GPU command does not need to be converted, thereby resolving a problem of an overhead, a delay, or stability that is caused by the conversion of the GPU command when GPU virtualization is implemented based on a Host OS in the prior art.

In addition, in the prior art, a host operating system (that is, Host OS) is a global privileged system, and is responsible for managing virtual machines and providing an I/O service to all the virtual machines. Because a large amount of data needs to be transmitted and processed in a GPU virtualization service, when the GPU virtualization service is implemented by using the Host OS, a pressure on the Host OS is greatly increased, and the Host OS easily becomes a bottleneck, which affects performance of an entire virtualization system and causes a limited density of virtual machines in a GPU virtualization scenario. In this embodiment of the present invention, a GPU virtualization service is implemented on a dedicated back-end GPU Domain, so that it can be avoided that a Host OS processes a large quantity of GPU tasks and massive data transmission and therefore becomes a bottleneck in the prior art; moreover, better isolation may further be provided, so that a problem of GPU virtualization does not lead to problems of the Host OS and the entire virtualization system, and a problem of a limited density of GPU virtualization is also avoided, thereby improving a density and expandability of GPU virtualization.

In conclusion, in the physical host provided in this embodiment of the present invention, there are front-end and back-end service channels between an $n^{th}$ back-end GPU Domain of the N back-end GPU Domains and an $m^{th}$ front-end VM of the M front-end VMs, the $m^{th}$ front-end VM transfers a to-be-transferred GPU command to the $n^{th}$ back-end GPU Domain based on the front-end and back-end service channels between the $n^{th}$ back-end GPU Domain and the $m^{th}$ front-end VM, and the $n^{th}$ back-end GPU Domain processes the GPU command by using one or more GPUs in the physical host, to obtain corresponding processing result data. It can be seen that in this embodiment of the present invention, the N dedicated back-end GPU Domains are introduced to provide a GPU virtualization capability and service to the M front-end VMs. On the premise that the N back-end GPU Domains provide the GPU virtualization capability and service to the M front-end VMs, types of operating systems of the N back-end GPU Domains may be flexibly configured according to types of operating systems of the M front-end VMs. For example, one back-end GPU Domain may correspondingly serve one or more front-end VMs of a same type of OS, or back-end GPU Domains of different types of OSs may serve front-end VMs of different types of OSs. Because there are front-end and back-end service channels between the $n^{th}$ back-end GPU Domain of the N back-end GPU Domains and the $m^{th}$ front-end VM of the M front-end VMs, and a type of an operating system of the $n^{th}$ back-end GPU Domain is the same as a type of an operating system of the $m^{th}$ front-end VM, a GPU command transferred from the $m^{th}$ front-end VM may be directly executed on the $n^{th}$ back-end GPU Domain having an operating system of a same type, thereby avoiding a problem of conversion between different GPU command libraries, thereby further avoiding problems of an extra overhead, a delay, and stability that are caused by the conversion between the GPU command libraries, so that performance of a GPU virtualization system is ensured.

Moreover, in this embodiment of the present invention, because the N dedicated back-end GPU Domains are introduced to provide the GPU virtualization capability and service to the M front-end VMs, a case in which performance of a GPU virtualization system is affected and a density of virtual machines in a GPU virtualization scenario is limited because a host operating system Host OS easily becomes a bottleneck for performance of GPU virtualization in a process that the Host OS is responsible for GPU virtualization in the prior art is also avoided, thereby also ensuring the performance of the GPU virtualization system, and improving a density and expandability of GPU virtualization.

Moreover, in this embodiment of the present invention, the shared memory or the network connection between the $n^{th}$ back-end GPU Domain and the $m^{th}$ front-end VM is used, transmission delays of a GPU command and data are reduced, thereby improving transmission efficiency and improving an effect of GPU virtualization.

Moreover, in this embodiment of the present invention, effective compression of a GPU command and data is achieved through control by using a compression policy, so that an amount of transmitted data is obviously reduced, thereby improving transmission efficiency and improving an effect of GPU virtualization.

Embodiment 2

Figure 2A:
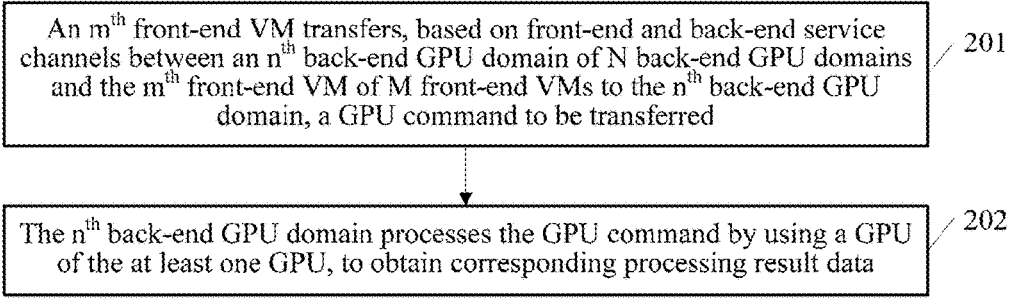
FIG. 2-a is a schematic flowchart of a method for implementing GPU virtualization according to an embodiment of the present invention.

Referring to FIG. 2-*a* and FIG. 2-*b*, FIG. 2-*a* and FIG. 2-*b* are schematic flowcharts of a method for implementing GPU virtualization according to an embodiment of the present invention. The method may be applied to a physical host shown in FIG. 1. The physical host includes: a hardware layer including at least one GPU, a host Host running on the hardware layer, and N back-end GPU domains GPU Domains and M front-end virtual machines VMs that run on the Host, where there are corresponding front-end and back-end service channels between the N back-end GPU Domains and the M front-end VMs, there are front-end and back-end service channels between an $n^{th}$ back-end GPU Domain of the N back-end GPU Domains and an $m^{th}$ front-end VM of the M front-end VMs, N is a positive integer greater than or equal to 1, M is a positive integer greater than or equal to 1, M is greater than or equal to N, n is a positive integer is less than or equal to N, and m is a positive integer is less than or equal to M. As shown in FIG. 2a, the method may include the following steps:

S201: The $m^{th}$ front-end VM transfers a to-be-transferred GPU command to the $n^{th}$ back-end GPU Domain based on the front-end and back-end service channels between the $n^{th}$ back-end GPU Domain of the N back-end GPU Domains and the $m^{th}$ front-end VM of the M front-end VMs.

S202: The $n^{th}$ back-end GPU Domain processes the GPU command by using one or more GPUs in the physical host, to obtain corresponding processing result data, where a type of an operating system of the $n^{th}$ back-end GPU Domain is the same as a type of an operating system of the $m^{th}$ front-end VM.

Figure 2B:
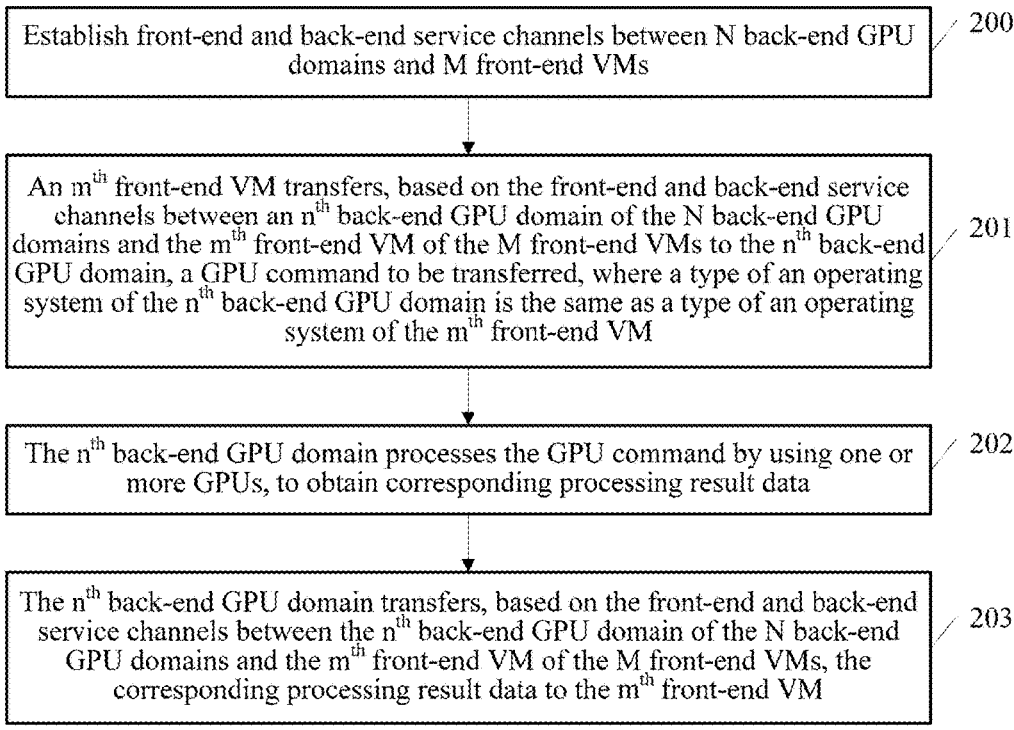

As shown in FIG. 2b, if the GPU command has a return value or has to-be-returned data (for example, to-be-returned image data or to-be-returned computing result data), the method further includes:

S203: The $n^{th}$ back-end GPU Domain transfers the corresponding processing result data to the $m^{th}$ front-end VM based on the front-end and back-end service channels between the $n^{th}$ back-end GPU Domain of the N back-end GPU Domains and the $m^{th}$ front-end VM of the M front-end VMs.

The physical host in this embodiment of the present invention further includes: a host operating system Host OS running on the Host, and as shown in FIG. 2b, the method further includes:

S200: The Host OS establishes the front-end and back-end service channels between the N back-end GPU Domains and the M front-end VMs. The front-end and back-end service channels between the N back-end GPU Domains and the M front-end VMs may be established in the following manner: when the $m^{th}$ front-end VM of the M front-end VMs is started, the Host OS determines, according to the type of the operating system of the started $m^{th}$ front-end VM, the $n^{th}$ back-end GPU Domain having an operating system of a corresponding type, where there is an association relationship between the $m^{th}$ front-end VM and the $n^{th}$ back-end GPU Domain; and based on the association relationship between the $m^{th}$ front-end VM and the $n^{th}$ back-end GPU Domain, the Host OS transfers communication information of the corresponding $n^{th}$ back-end GPU Domain to the $m^{th}$ front-end VM, and transfers communication information of the corresponding $m^{th}$ front-end VM to the $n^{th}$ back-end GPU Domain, so that the front-end and back-end service channels are established between the $m^{th}$ front-end VM and the $n^{th}$ back-end GPU Domain. It should be noted that the Host OS manages or records association relationships between the N back-end GPU Domains and the M front-end VMs, where the association relationships include the association relationship between the $m^{th}$ front-end VM and the $n^{th}$ back-end GPU Domain. When the $m^{th}$ front-end VM exits, the Host OS deletes the association relationship between the $m^{th}$ front-end VM and the $n^{th}$ back-end GPU Domain.

If the communication information of the $m^{th}$ front-end VM and the communication information of the $n^{th}$ back-end GPU Domain that are transferred by the Host OS are shared memory device identifiers, correspondingly, in an implementation manner, a manner of establishing the front-end and back-end service channels between the $m^{th}$ front-end VM and the $n^{th}$ back-end GPU Domain is:

binding event channels between the $m^{th}$ front-end VM and the $n^{th}$ back-end GPU Domain based on the shared memory device identifier of the $m^{th}$ front-end VM and the shared memory device identifier of the $n^{th}$ back-end GPU Domain.

If the communication information of the $m^{th}$ front-end VM and the communication information of the $n^{th}$ back-end GPU Domain that are transferred by the Host OS are network address information, for example, an IP address and a port number, correspondingly, in an implementation manner, a manner of establishing the front-end and back-end service channels between the $m^{th}$ front-end VM and the $n^{th}$ back-end GPU Domain is:

establishing a network connection between the $m^{th}$ front-end VM and the $n^{th}$ back-end GPU Domain based on the network address information of the $m^{th}$ front-end VM and the network address information of the $n^{th}$ back-end GPU Domain.

As can be seen above, in the method provided in this embodiment of the present invention, there are front-end and back-end service channels between an $n^{th}$ back-end GPU Domain of the N back-end GPU Domains and an $m^{th}$ front-end VM of the M front-end VMs, the $m^{th}$ front-end VM transfers a to-be-transferred GPU command to the $n^{th}$ back-end GPU Domain based on the front-end and back-end service channels between the $n^{th}$ back-end GPU Domain and the $m^{th}$ front-end VM, and the $n^{th}$ back-end GPU Domain processes the GPU command by using one or more GPUs in a physical host, to obtain corresponding processing result data. It can be seen that in this embodiment of the present invention, the N dedicated back-end GPU Domains are introduced to provide a GPU virtualization capability and service to the M front-end VMs. On the premise that the N back-end GPU Domains provide the GPU virtualization capability and service to the M front-end VMs, types of operating systems of the N back-end GPU Domains may be flexibly configured according to types of operating systems of the M front-end VMs. For example, one back-end GPU Domain may correspondingly serve one or more front-end VMs of a same type of OS, or back-end GPU Domains of different types of OSs may serve front-end VMs of different types of OSs. Because there are front-end and back-end service channels between the $n^{th}$ back-end GPU Domain of the N back-end GPU Domains and the $m^{th}$ front-end VM of the M front-end VMs, and a type of an operating system of the $n^{th}$ back-end GPU Domain is the same as a type of an operating system of the $m^{th}$ front-end VM, a GPU command transferred from the $m^{th}$ front-end VM may be directly executed on the $n^{th}$ back-end GPU Domain having an operating system of a same type, thereby avoiding a problem of conversion between different GPU command libraries, thereby further avoiding problems of an extra overhead, a delay, and stability that are caused by the conversion between the GPU command libraries, so that performance of a GPU virtualization system is ensured.

Moreover, in this embodiment of the present invention, because the N dedicated back-end GPU Domains are introduced to provide the GPU virtualization capability and service to the M front-end VMs, a case in which performance of a GPU virtualization system is affected and a density of virtual machines in a GPU virtualization scenario is limited because a host operating system Host OS easily becomes a bottleneck for performance of GPU virtualization in a process that the Host OS is responsible for GPU virtualization in the prior art is also avoided, thereby also ensuring the performance of the GPU virtualization system, and improving a density and expandability of GPU virtualization.

Embodiment 3

Figure 3:
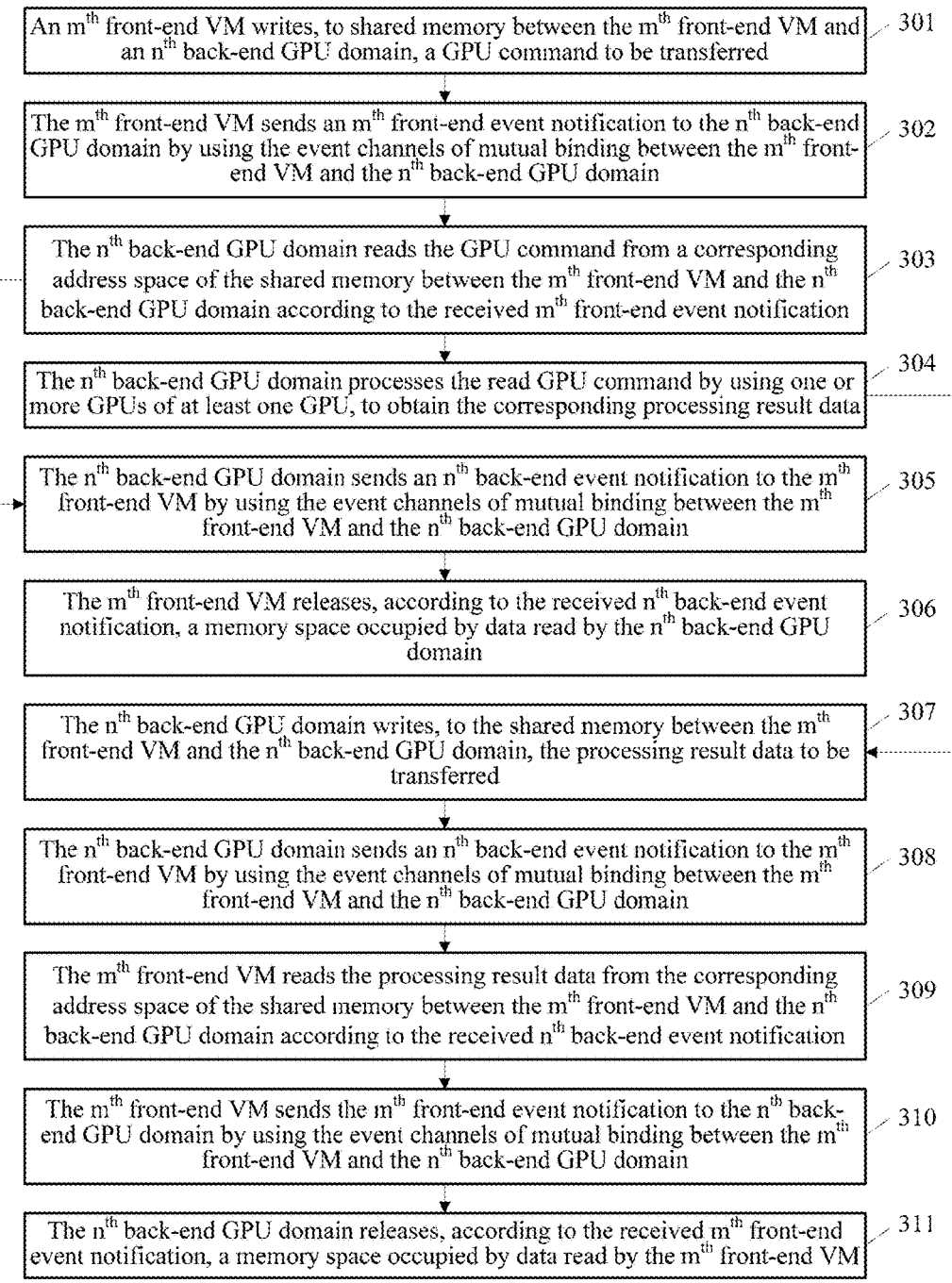
FIG. 3 is a schematic flowchart of still another method for implementing GPU virtualization according to an embodiment of the present invention.

Referring to FIG. 3, FIG. 3 is a schematic flowchart of still another method for implementing GPU virtualization according to an embodiment of the present invention. In this embodiment, in the physical host with the GPU virtualization architecture based on a GPU Domain shown in FIG. 1, a GPU command and processing result data are transmitted by using a shared memory between a front-end virtual machine and a back-end GPU Domain serving the front-end virtual machine, and in this embodiment, an $m^{th}$ front-end VM and an $n^{th}$ back-end GPU Domain serving the $m^{th}$ front-end VM are used as an example for description. Front-end and back-end service channels between the $n^{th}$ back-end GPU Domain and the $m^{th}$ front-end VM are corresponding bound event channels between the $m^{th}$ front-end VM and the $n^{th}$ back-end GPU Domain, where a type of an operating system of the $n^{th}$ back-end GPU Domain is the same as a type of an operating system of the $m^{th}$ front-end VM. The method may include the following steps:

S301: The $m^{th}$ front-end VM writes a to-be-transferred GPU command to a shared memory between the $m^{th}$ front-end VM and the $n^{th}$ back-end GPU Domain.

S302: The $m^{th}$ front-end VM sends an $m^{th}$ front-end event notification to the $n^{th}$ back-end GPU Domain through the bound event channels between the $m^{th}$ front-end VM and the $n^{th}$ back-end GPU Domain, where the $m^{th}$ front-end event notification is used to represent location information, of the to-be-transferred GPU command, in the shared memory.

S303: The $n^{th}$ back-end GPU Domain reads the GPU command from a corresponding address space of the shared memory between the $m^{th}$ front-end VM and the $n^{th}$ back-end GPU Domain according to the received $m^{th}$ front-end event notification.

S304: The $n^{th}$ back-end GPU Domain processes the read GPU command by using one or more GPUs that are pass-through to the $n^{th}$ back-end GPU Domain, to obtain corresponding processing result data.

To help to release in time a resource of the shared memory between the $m^{th}$ front-end VM and the $n^{th}$ back-end GPU Domain, the method further includes:

S305: After the $n^{th}$ back-end GPU Domain reads the GPU command, the $n^{th}$ back-end GPU Domain sends an $n^{th}$ back-end event notification to the $m^{th}$ front-end VM through the bound event channels between the $m^{th}$ front-end VM and the $n^{th}$ back-end GPU Domain, where the $n^{th}$ back-end event notification is used to represent that data reading is complete.

S306: The $m^{th}$ front-end VM releases, according to the received $n^{th}$ back-end event notification, a memory space that has been occupied by data read by the $n^{th}$ back-end GPU Domain.

It should be noted that, if front-end service channels correspond one-to-multiple to back-end service channels between the $n^{th}$ back-end GPU Domain of the N back-end GPU Domains and L front-end VMs of the M front-end VMs (that is, 1:L front-end and back-end service channels), the L front-end VMs have an operating system of a type same as that of an operating system of the $n^{th}$ back-end GPU Domain, the L front-end VMs include the $m^{th}$ front-end VM, and L is a positive integer greater than 1 and less than or equal to M.

There are corresponding event channels between the $n^{th}$ back-end GPU Domain and each front-end VM of the L front-end VMs.

If the GPU command has a return value or has to-be-returned data (for example, to-be-returned image data or to-be-returned computing result data), the method in this embodiment of the present invention further includes:

S307: The $n^{th}$ back-end GPU Domain writes the to-be-transferred processing result data to the shared memory between the $m^{th}$ front-end VM and the $n^{th}$ back-end GPU Domain.

S308: The $n^{th}$ back-end GPU Domain sends an $n^{th}$ back-end event notification to the $m^{th}$ front-end VM through the bound event channels between the $m^{th}$ front-end VM and the $n^{th}$ back-end GPU Domain, where the $n^{th}$ back-end event notification is used to represent location information, of the to-be-transferred processing result data, in the shared memory.

S309: The $m^{th}$ front-end VM reads the processing result data from the corresponding address space of the shared memory between the $m^{th}$ front-end VM and the $n^{th}$ back-end GPU Domain according to the received $n^{th}$ back-end event notification.

To help to release in time a resource of the shared memory between the $m^{th}$ front-end VM and the $n^{th}$ back-end GPU Domain, the method further includes:

S310: The $m^{th}$ front-end VM sends the $m^{th}$ front-end event notification to the $n^{th}$ back-end GPU Domain through the bound event channels between the $m^{th}$ front-end VM and the $n^{th}$ back-end GPU Domain, where the $m^{th}$ front-end event notification is used to represent that data reading is complete.

S311: The $n^{th}$ back-end GPU Domain releases, according to the received $m^{th}$ front-end event notification, a memory space that has been occupied by data read by the $m^{th}$ front-end VM.

In an exemplary implementation manner, the shared memory between the $m^{th}$ front-end VM and the $n^{th}$ back-end GPU Domain includes: a front-end-to-back-end transmission shared memory and a back-end-to-front-end transmission shared memory, where S301 is specifically: writing, by the $m^{th}$ front-end VM, the to-be-transferred GPU command to the front-end-to-back-end transmission shared memory, where the $m^{th}$ front-end VM has read and write permissions for the front-end-to-back-end transmission shared memory, and the $n^{th}$ back-end GPU Domain has a read-only permission for the front-end-to-back-end transmission shared memory; and correspondingly, S303 is specifically: reading, by the $n^{th}$ back-end GPU Domain, the GPU command from a corresponding address space of the front-end-to-back-end transmission shared memory according to the received $m^{th}$ front-end event notification, where the $m^{th}$ front-end event notification is used to represent location information, of the to-be-transferred GPU command, in the front-end-to-back-end transmission shared memory;

or,

S307 is specifically: writing, by the $n^{th}$ back-end GPU Domain, the to-be-transferred processing result data to the back-end-to-front-end transmission shared memory, where the $n^{th}$ back-end GPU Domain has read and write permissions for the back-end-to-front-end transmission shared memory, and the $m^{th}$ front-end VM has a read-only permission for the back-end-to-front-end transmission shared memory; and correspondingly, S309 is specifically: reading, by the $m^{th}$ front-end VM, the processing result data from a corresponding address space of the back-end-to-front-end transmission shared memory according to the received $n^{th}$ back-end event notification, where the $n^{th}$ back-end event notification is used to represent location information, of the to-be-transferred processing result data, in the back-end-to-front-end transmission shared memory.

As can be seen above, in the method provided in this embodiment of the present invention, there are a shared memory and bound event channels between an $n^{th}$ back-end GPU Domain and an $m^{th}$ front-end VM, the $m^{th}$ front-end VM transfers a to-be-transferred GPU command to the $n^{th}$ back-end GPU Domain by using the shared memory between the $m^{th}$ front-end VM and the $n^{th}$ back-end GPU Domain and through the bound event channels between the $m^{th}$ front-end VM and the $n^{th}$ back-end GPU Domain, and the $n^{th}$ back-end GPU Domain processes the GPU command by using one or more GPUs in a physical host, to obtain corresponding processing result data. Because there are a shared memory and bound event channels between the $n^{th}$ back-end GPU Domain and the $m^{th}$ front-end VM, and a type of an operating system of the $n^{th}$ back-end GPU Domain is the same as a type of an operating system of the $m^{th}$ front-end VM, a GPU command transferred from the $m^{th}$ front-end VM may be directly executed on the $n^{th}$ back-end GPU Domain having an operating system of a same type, thereby avoiding a problem of conversion between different GPU command libraries, thereby further avoiding problems of an extra overhead, a delay, and stability that are caused by the conversion between the GPU command libraries, so that performance of a GPU virtualization system is ensured.

Moreover, in a GPU virtualization architecture based on a GPU Domain, a GPU command and processing result data are transmitted by using a shared memory between an $m^{th}$ front-end virtual machine and an $n^{th}$ back-end GPU Domain, to achieve efficient transmission of a GPU command and data, thereby improving transmission efficiency and improving an effect of GPU virtualization.

Moreover, in this embodiment of the present invention, the shared memory between the $m^{th}$ front-end VM and the $n^{th}$ back-end GPU Domain is divided into two parts: One part is used for the $m^{th}$ front-end VM to transmit data to the $n^{th}$ back-end GPU Domain, where the $m^{th}$ front-end VM has read and write permissions for this part of memory and the $n^{th}$ back-end GPU Domain has only a read permission for this part of memory. The other part is used for the $n^{th}$ back-end GPU Domain to transmit data to the $m^{th}$ front-end VM, where the $n^{th}$ back-end GPU Domain has read and write permissions for this part of memory and the $m^{th}$ front-end VM has only a read permission for this part of memory. When needing to transmit data to the $n^{th}$ back-end GPU Domain, the $m^{th}$ front-end VM may directly write the data to the part of the shared memory for which the $m^{th}$ front-end VM has a write permission, without worrying that the $n^{th}$ back-end GPU Domain may write data to the same part of the memory. Similarly, when needing to transmit data, the $n^{th}$ back-end GPU Domain may also directly write the data to the part of the shared memory for which the $n^{th}$ back-end GPU Domain has a write permission, without worrying about a conflict with the $m^{th}$ front-end VM. In this way, bidirectional and parallel transmission between the $m^{th}$ front-end VM and the $n^{th}$ back-end GPU Domain can be implemented, thereby improving transmission efficiency.

Embodiment 4

Figure 4:
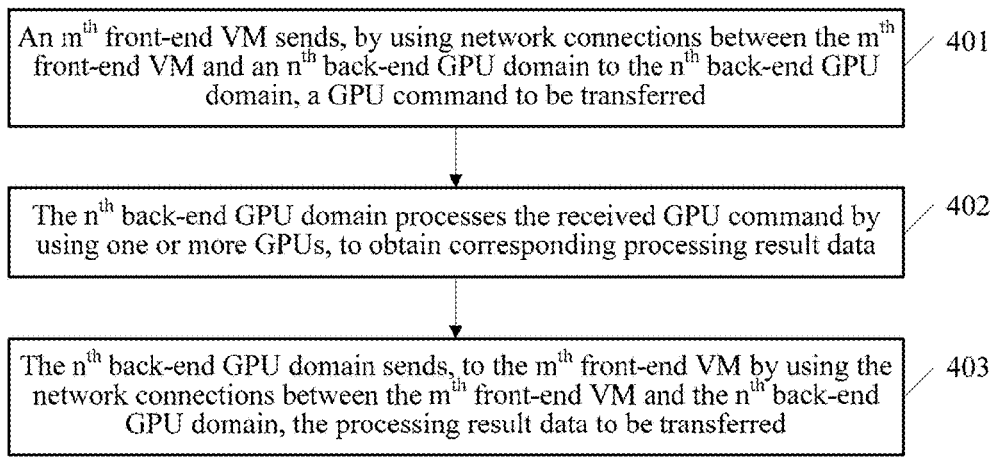
FIG. 4 is a schematic flowchart of yet another method for implementing GPU virtualization according to an embodiment of the present invention.

Referring to FIG. 4, FIG. 4 is a schematic flowchart of yet another method for implementing GPU virtualization according to an embodiment of the present invention. In this embodiment, in the physical host with the GPU virtualization architecture based on a GPU Domain shown in FIG. 1, a GPU command and processing result data are transmitted over a network connection between a front-end virtual machine and a back-end GPU Domain serving the front-end virtual machine, and in this embodiment, an $m^{th}$ front-end VM and an $n^{th}$ back-end GPU Domain serving the $m^{th}$ front-end VM are used as an example for description. Front-end and back-end service channels between the $n^{th}$ back-end GPU Domain and the $m^{th}$ front-end VM are a corresponding network connection between the $m^{th}$ front-end VM and the $n^{th}$ back-end GPU Domain, where a type of an operating system of the $n^{th}$ back-end GPU Domain is the same as a type of an operating system of the $m^{th}$ front-end VM. The method may include the following steps:

S401: The $m^{th}$ front-end VM sends a to-be-transferred GPU command to the $n^{th}$ back-end GPU Domain over the network connection between the $m^{th}$ front-end VM and the $n^{th}$ back-end GPU Domain.

S402: The $n^{th}$ back-end GPU Domain processes the received GPU command by using one or more GPUs of at least one GPU, to obtain corresponding processing result data.

If the GPU command has a return value or has to-be-returned data (for example, to-be-returned image data or to-be-returned computing result data), the method in this embodiment of the present invention further includes:

S403: The $n^{th}$ back-end GPU Domain sends the to-be-transferred processing result data to the $m^{th}$ front-end VM over the network connection between the $m^{th}$ front-end VM and the $n^{th}$ back-end GPU Domain.

As can be seen above, in the method provided in this embodiment of the present invention, there is a network connection between an $n^{th}$ back-end GPU Domain and an $m^{th}$ front-end VM, the $m^{th}$ front-end VM transfers a to-be-transferred GPU command to the $n^{th}$ back-end GPU Domain over the network connection between the $m^{th}$ front-end VM and the $n^{th}$ back-end GPU Domain, and the $n^{th}$ back-end GPU Domain processes the GPU command by using one or more GPUs of at least one GPU, to obtain corresponding processing result data. Because there is a network connection between the $n^{th}$ back-end GPU Domain and the $m^{th}$ front-end VM, and a type of an operating system of the $n^{th}$ back-end GPU Domain is the same as a type of an operating system of the $m^{th}$ front-end VM, a GPU command transferred from the $m^{th}$ front-end VM may be directly executed on the $n^{th}$ back-end GPU Domain having an operating system of a same type, thereby avoiding a problem of conversion between different GPU command libraries, thereby further avoiding problems of an extra overhead, a delay, and stability that are caused by the conversion between the GPU command libraries, so that performance of a GPU virtualization system is ensured.

Moreover, in a GPU virtualization architecture based on a GPU Domain, a GPU command and processing result data are transmitted over a network connection between an $m^{th}$ front-end VM and an $n^{th}$ back-end GPU Domain, to achieve efficient transmission of a GPU command and data, thereby improving transmission efficiency and improving an effect of GPU virtualization.

Embodiment 5

Figure 5:
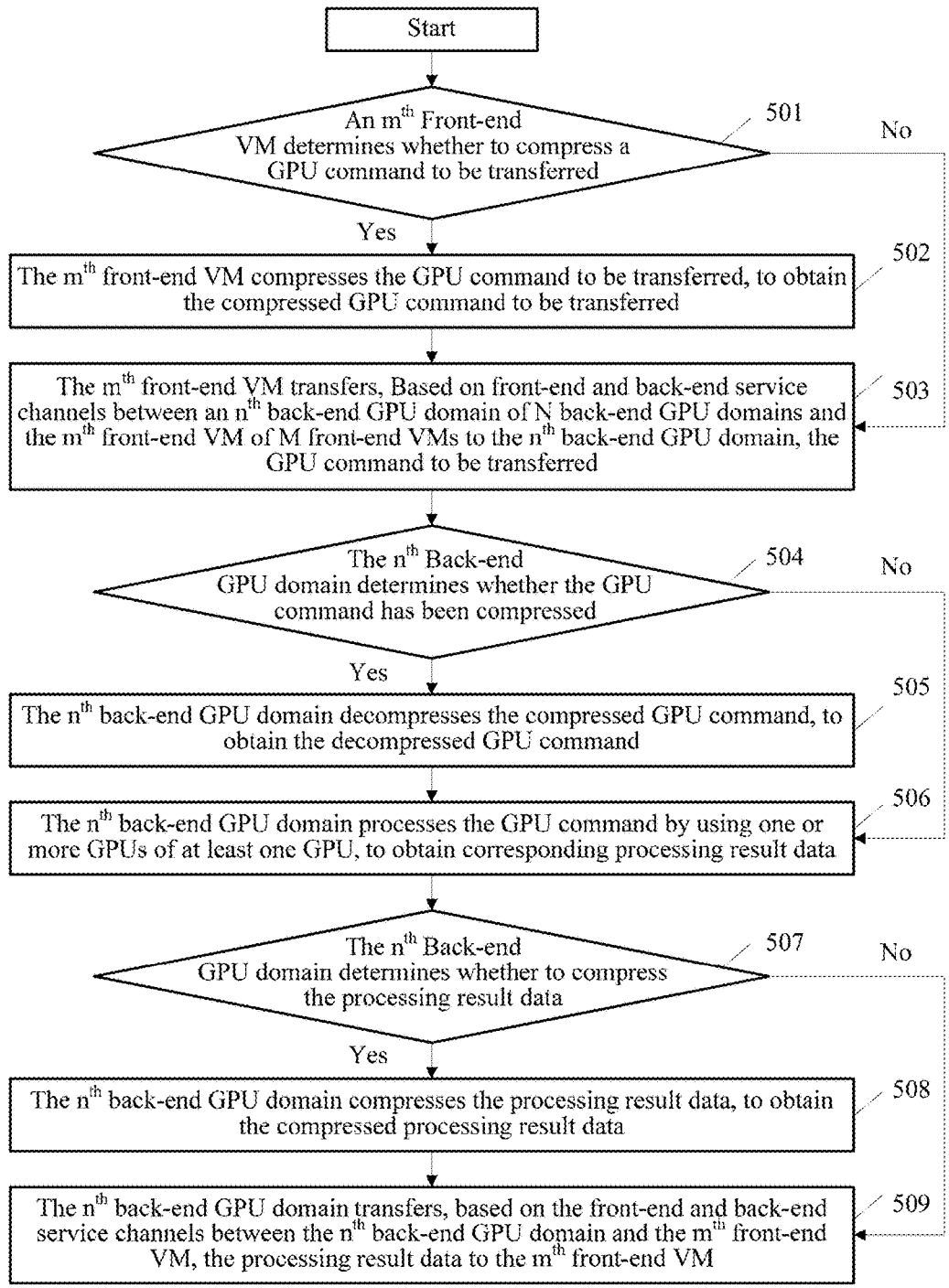
FIG. 5 is a schematic flowchart of still yet another method for implementing GPU virtualization according to an embodiment of the present invention.

Referring to FIG. 5, FIG. 5 is a schematic flowchart of still yet another method for implementing GPU virtualization according to an embodiment of the present invention. In this embodiment, the physical host with the GPU virtualization architecture based on a GPU Domain shown in FIG. 1 includes: a hardware layer including at least one GPU, a host Host running on the hardware layer, and N back-end GPU domains GPU Domains and M front-end virtual machines VMs that run on the Host, where there are corresponding front-end and back-end service channels between the N back-end GPU Domains and the M front-end VMs, there are front-end and back-end service channels between an $n^{th}$ back-end GPU Domain of the N back-end GPU Domains and an $m^{th}$ front-end VM of the M front-end VMs, N is a positive integer greater than or equal to 1, M is a positive integer greater than or equal to 1, M is greater than or equal to N, n is a positive integer is less than or equal to N, and m is a positive integer is less than or equal to M. In this embodiment, the $m^{th}$ front-end VM and the $n^{th}$ back-end GPU Domain serving the $m^{th}$ front-end VM are used as an example for description, where a type of an operating system of the $n^{th}$ back-end GPU Domain is the same as a type of an operating system of the $m^{th}$ front-end VM. As shown in FIG. 5, the method may include the following steps:

S501: The $m^{th}$ front-end VM determines whether to compress a to-be-transferred GPU command; and if it is determined to compress the GPU command, executes step S502; or if it is determined not to compress the GPU command, executes step S503.

In an implementation manner, the $m^{th}$ front-end VM determines, according to an estimated compression time, an estimated decompression time, an estimated compressed-data transmission time, and an estimated non-compression direct-transmission time that are of the to-be-transferred GPU command, whether to compress the GPU command;

specifically, when a sum of the estimated compression time, the estimated decompression time, and the estimated compressed-data transmission time that are of the GPU command is less than or equal to the estimated non-compression direct-transmission time of the GPU command, determines to compress the GPU command; or when a sum of the estimated compression time, the estimated decompression time, and the estimated compressed-data transmission time that are of the GPU command is greater than the estimated non-compression direct-transmission time of the GPU command, determines not to compress the GPU command;

or, when a sum of the estimated compression time, the estimated decompression time, and the estimated compressed-data transmission time that are of the GPU command is less than or equal to a sum of the estimated non-compression direct-transmission time of the GPU command and an adjustment value, determines to compress the GPU command; or when a sum of the estimated compression time, the estimated decompression time, and the estimated compressed-data transmission time that are of the GPU command is greater than a sum of the estimated non-compression direct-transmission time of the GPU command and an adjustment value, determines not to compress the GPU command.

S502: The $m^{th}$ front-end VM compresses the to-be-transferred GPU command, to obtain the compressed to-be-transferred GPU command.

S503: The $m^{th}$ front-end VM transfers the to-be-transferred GPU command to the $n^{th}$ back-end GPU Domain based on the front-end and back-end service channels between the $n^{th}$ back-end GPU Domain of the N back-end GPU Domains and the $m^{th}$ front-end VM of the M front-end VMs.

It should be noted that, in this embodiment, the front-end and back-end service channels between the $n^{th}$ back-end GPU Domain and the $m^{th}$ front-end VM may be corresponding bound event channels between the $m^{th}$ front-end VM and the $n^{th}$ back-end GPU Domain, or, the front-end and back-end service channels between the $n^{th}$ back-end GPU Domain and the $m^{th}$ front-end VM may be a corresponding network connection between the $m^{th}$ front-end VM and the $n^{th}$ back-end GPU Domain; however, this embodiment is not limited thereto.

S504: After receiving the GPU command transferred by the $m^{th}$ front-end VM, the $n^{th}$ back-end GPU Domain determines whether the GPU command has been compressed; and if it is determined that the transferred GPU command has been compressed, executes step S505; or if it is determined that the transferred GPU command has not been compressed, executes step S506.

S505: The $n^{th}$ back-end GPU Domain decompresses the compressed GPU command, to obtain the decompressed GPU command.

S506: The $n^{th}$ back-end GPU Domain processes the GPU command by using one or more GPUs that are pass-through to the $n^{th}$ back-end GPU Domain, to obtain corresponding processing result data.

If the GPU command has a return value or has to-be-returned data (for example, to-be-returned image data or to-be-returned computing result data), the method in this embodiment of the present invention further includes:

S507: The $n^{th}$ back-end GPU Domain determines whether to compress the processing result data; and if it is determined to compress the processing result data, executes step S508; or if it is determined not to compress the processing result data, executes step S509.

In an implementation manner, the $n^{th}$ back-end GPU Domain determines, according to an estimated compression time, an estimated decompression time, an estimated compressed-data transmission time, and an estimated non-compression direct-transmission time that are of the processing result data, whether to compress the processing result data;

specifically, when a sum of the estimated compression time, the estimated decompression time, and the estimated compressed-data transmission time that are of the processing result data is less than or equal to the estimated non-compression direct-transmission time of the processing result data, determines to compress the processing result data; or when a sum of the estimated compression time, the estimated decompression time, and the estimated compressed-data transmission time that are of the processing result data is greater than the estimated non-compression direct-transmission time of the processing result data, determines not to compress the processing result data;

or, when a sum of the estimated compression time, the estimated decompression time, and the estimated compressed-data transmission time that are of the processing result data is less than or equal to a sum of the estimated non-compression direct-transmission time of the processing result data and an adjustment value, determines to compress the processing result data; or when a sum of the estimated compression time, the estimated decompression time, and the estimated compressed-data transmission time that are of the processing result data is greater than a sum of the estimated non-compression direct-transmission time of the processing result data and an adjustment value, determines not to compress the processing result data.

S508: The $n^{th}$ back-end GPU Domain compresses the processing result data, to obtain the compressed processing result data.

S509: The $n^{th}$ back-end GPU Domain transfers the processing result data to the $m^{th}$ front-end VM based on the front-end and back-end service channels between the $n^{th}$ back-end GPU Domain and the $m^{th}$ front-end VM.

It should be noted that, the front-end and back-end service channels between the $n^{th}$ back-end GPU Domain and the $m^{th}$ front-end VM in this embodiment may be the corresponding bound event channels between the $m^{th}$ front-end VM and the $n^{th}$ back-end GPU Domain, or, the front-end and back-end service channels between the $n^{th}$ back-end GPU Domain and the $m^{th}$ front-end VM may be the corresponding network connection between the $m^{th}$ front-end VM and the $n^{th}$ back-end GPU Domain; however, this embodiment is not limited thereto.

As can be seen above, in the method provided in this embodiment of the present invention, there are front-end and back-end service channels between an $n^{th}$ back-end GPU Domain and an $m^{th}$ front-end VM, the $m^{th}$ front-end VM transfers a to-be-transferred GPU command to the $n^{th}$ back-end GPU Domain based on the front-end and back-end service channels between the $n^{th}$ back-end GPU Domain and the $m^{th}$ front-end VM, and the $n^{th}$ back-end GPU Domain processes the GPU command by using one or more GPUs in a physical host, to obtain corresponding processing result data. Because there are front-end and back-end service channels between the $n^{th}$ back-end GPU Domain and the $m^{th}$ front-end VM, and a type of an operating system of the $n^{th}$ back-end GPU Domain is the same as a type of an operating system of the $m^{th}$ front-end VM, a GPU command transferred from the $m^{th}$ front-end VM may be directly executed on the $n^{th}$ back-end GPU Domain having an operating system of a same type, thereby avoiding a problem of conversion between different GPU command libraries, thereby further avoiding problems of an extra overhead, a delay, and stability that are caused by the conversion between the GPU command libraries, so that performance of a GPU virtualization system is ensured.

Moreover, in view of that transmission of a large quantity of GPU commands and a large amount of data may cause a very high pressure on transmission bandwidth of a system, in this embodiment of the present invention, a compression technology is applied to GPU virtualization, and a transmission volume is reduced and bandwidth is reduced by compressing a GPU command and data, thereby improving transmission efficiency and improving an effect of GPU virtualization.

Embodiment 6

Figure 6:
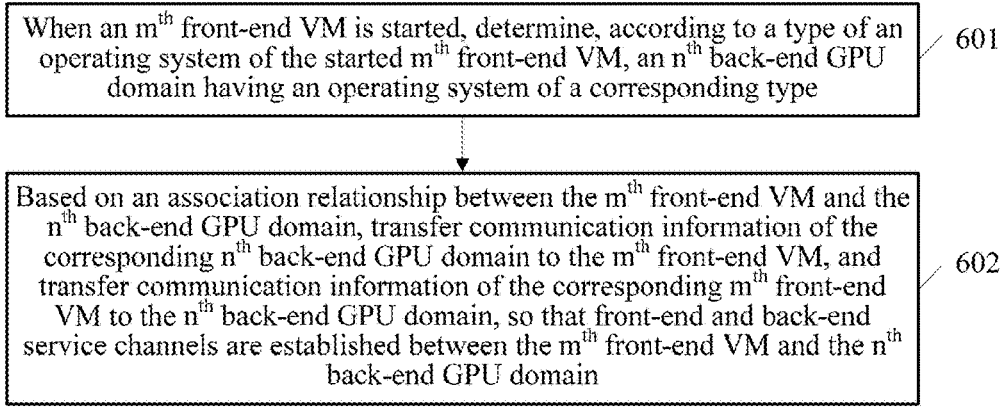
FIG. 6 is a schematic flowchart of a method for managing a GPU Domain according to an embodiment of the present invention.

Referring to FIG. 6, FIG. 6 is a schematic flowchart of a method for managing a GPU Domain according to an embodiment of the present invention. The method is executed by a physical host, which may be specifically a Host OS deployed on the physical host shown in FIG. 1, and in this embodiment, an $m^{th}$ front-end VM and an $n^{th}$ back-end GPU Domain serving the $m^{th}$ front-end VM are used as an example for description. As shown in FIG. 6, the method in this embodiment of the present invention may include the following steps:

S601: When the $m^{th}$ front-end VM is started, determine, according to a type of an operating system of the started $m^{th}$ front-end VM, the $n^{th}$ back-end GPU Domain having an operating system of a corresponding type, where there is an association relationship between the $m^{th}$ front-end VM and the $n^{th}$ back-end GPU Domain.

For example, if the operating system of the started $m^{th}$ front-end VM is a Windows system, and the $n^{th}$ back-end GPU Domain with the Windows system is determined; if the operating system of the started $m^{th}$ front-end VM is a Linux system, and the $n^{th}$ back-end GPU Domain with the Linux system is determined.

S602: Based on the association relationship between the $m^{th}$ front-end VM and the $n^{th}$ back-end GPU Domain, transfer communication information of the corresponding $n^{th}$ back-end GPU Domain to the $m^{th}$ front-end VM, and transfer communication information of the corresponding $m^{th}$ front-end VM to the $n^{th}$ back-end GPU Domain, so that front-end and back-end service channels are established between the $m^{th}$ front-end VM and the $n^{th}$ back-end GPU Domain.

If the communication information of the $m^{th}$ front-end VM and the communication information of the $n^{th}$ back-end GPU Domain that are transferred by the Host OS are shared memory device identifiers, the establishing the front-end and back-end service channels between the $m^{th}$ front-end VM and the $n^{th}$ back-end GPU Domain includes: binding event channels between the $m^{th}$ front-end VM and the $n^{th}$ back-end GPU Domain based on the communication information of the $m^{th}$ front-end VM and the communication information of the $n^{th}$ back-end GPU Domain.

If the communication information of the $m^{th}$ front-end VM and the communication information of the $n^{th}$ back-end GPU Domain that are transferred by the Host OS are network address information, for example, an IP address and a port number, the establishing the front-end and back-end service channels between the $m^{th}$ front-end VM and the $n^{th}$ back-end GPU Domain includes: establishing a network connection (for example, a TCP connection) between the $m^{th}$ front-end VM and the $n^{th}$ back-end GPU Domain based on the network address information of the $m^{th}$ front-end VM and the network address information of the $n^{th}$ back-end GPU Domain.

It should be noted that the method in this embodiment of the present invention further includes: managing or recording association relationships between M front-end VMs and N back-end GPU Domains, where the association relationships between the M front-end VMs and the N back-end GPU Domains include the association relationship between the $m^{th}$ front-end VM and the $n^{th}$ back-end GPU Domain. Moreover, when the $m^{th}$ front-end VM exits, the association relationship between the $m^{th}$ front-end VM and the $n^{th}$ back-end GPU Domain is deleted.

As can be seen above, by means of the method for managing a GPU Domain in this embodiment of the present invention, after an $m^{th}$ front-end VM on a physical host is started, an $n^{th}$ back-end GPU Domain serving the $m^{th}$ front-end VM is determined according to a type of an operating system of the started $m^{th}$ front-end VM. In this way, an association relationship between the $m^{th}$ front-end VM and the $n^{th}$ back-end GPU Domain is naturally formed. Based on the association relationship between the $m^{th}$ front-end VM and the $n^{th}$ back-end GPU Domain, communication information of the corresponding $n^{th}$ back-end GPU Domain is transferred to the $m^{th}$ front-end VM, and communication information of the corresponding $m^{th}$ front-end VM is transferred to the $n^{th}$ back-end GPU Domain, so that front-end and back-end service channels are established between the $m^{th}$ front-end VM and the $n^{th}$ back-end GPU Domain. Further, because there are front-end and back-end service channels between the $n^{th}$ back-end GPU Domain and the $m^{th}$ front-end VM, and a type of an operating system of the $n^{th}$ back-end GPU Domain is the same as the type of the operating system of the $m^{th}$ front-end VM, a GPU command transferred from the $m^{th}$ front-end VM may be directly executed on the $n^{th}$ back-end GPU Domain having an operating system of a same type, thereby avoiding a problem of conversion between different GPU command libraries, thereby further avoiding problems of an extra overhead, a delay, and stability that are caused by the conversion between the GPU command libraries, so that performance of a GPU virtualization system is ensured.

Embodiment 7

Figure 7:
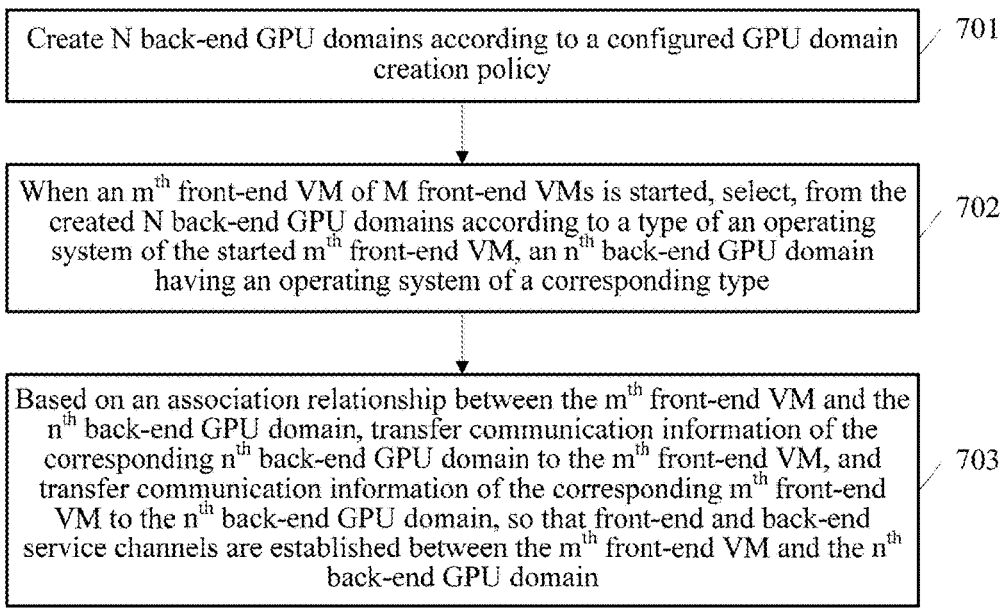
FIG. 7 is a schematic flowchart of another method for managing a GPU Domain according to an embodiment of the present invention.

Referring to FIG. 7, FIG. 7 is a schematic flowchart of another method for managing a GPU Domain according to an embodiment of the present invention. The method is executed by a physical host, which may be specifically a Host OS deployed on the physical host shown in FIG. 1, and in this embodiment, an $m^{th}$ front-end VM and an $n^{th}$ back-end GPU Domain serving the $m^{th}$ front-end VM are used as an example for description. As shown in FIG. 7, the method in this embodiment of the present invention may include the following steps:

S701: Create N back-end GPU Domains according to a configured GPU Domain creation policy, where the N back-end GPU Domains have operating systems of multiple types, and the GPU Domain creation policy includes one or more of the following: a quantity of GPU Domains, a quantity of GPUs that are pass-through to the GPU Domain, and types of operating systems of the GPU Domains.

Different operating systems may be configured for the back-end GPU Domains, and one or more GPUs are pass-through to each back-end GPU Domain. Each back-end GPU Domain provides a GPU virtualization service to a front-end virtual machine of a corresponding operating system.

S702: When the $m^{th}$ front-end VM of the M front-end VMs is started, select, from the created N back-end GPU Domains according to a type of an operating system of the started $m^{th}$ front-end VM, an $n^{th}$ back-end GPU Domain having an operating system of a corresponding type, where there is an association relationship between the $m^{th}$ front-end VM and the $n^{th}$ back-end GPU Domain.

S703: Based on the association relationship between the $m^{th}$ front-end VM and the $n^{th}$ back-end GPU Domain, transfer communication information of the corresponding $n^{th}$ back-end GPU Domain to the $m^{th}$ front-end VM, and transfer communication information of the corresponding $m^{th}$ front-end VM to the $n^{th}$ back-end GPU Domain, so that front-end and back-end service channels are established between the $m^{th}$ front-end VM and the $n^{th}$ back-end GPU Domain.

As can be seen above, by means of the method for managing a GPU Domain in this embodiment of the present invention, after an $m^{th}$ front-end VM on a physical host is started, an $n^{th}$ back-end GPU Domain having an operating system of a corresponding type is selected from N created back-end GPU Domains according to a type of an operating system of the started $m^{th}$ front-end VM. In this way, an association relationship between the $m^{th}$ front-end VM and the $n^{th}$ back-end GPU Domain is naturally formed. Based on the association relationship between the $m^{th}$ front-end VM and the $n^{th}$ back-end GPU Domain, communication information of the corresponding $n^{th}$ back-end GPU Domain is transferred to the $m^{th}$ front-end VM, and communication information of the corresponding $m^{th}$ front-end VM is transferred to the $n^{th}$ back-end GPU Domain, so that front-end and back-end service channels are established between the $m^{th}$ front-end VM and the $n^{th}$ back-end GPU Domain. Further, because there are front-end and back-end service channels between the $n^{th}$ back-end GPU Domain and the $m^{th}$ front-end VM, and the type of the operating system of the $n^{th}$ back-end GPU Domain is the same as the type of the operating system of the $m^{th}$ front-end VM, a GPU command transferred from the $m^{th}$ front-end VM may be directly executed on the $n^{th}$ back-end GPU Domain having the operating system of the same type, thereby avoiding a problem of conversion between different GPU command libraries, thereby further avoiding problems of an extra overhead, a delay, and stability that are caused by the conversion between the GPU command libraries, so that performance of a GPU virtualization system is ensured.

Embodiment 8

Figure 8:
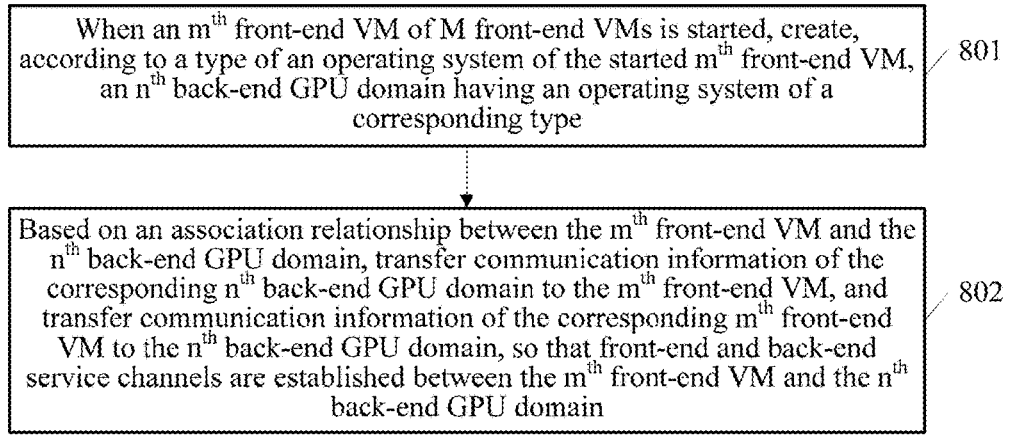
FIG. 8 is a schematic flowchart of still another method for managing a GPU Domain according to an embodiment of the present invention.

Referring to FIG. 8, FIG. 8 is a schematic flowchart of still another method for managing a GPU Domain according to an embodiment of the present invention. The method is executed by a physical host, which may be specifically a Host OS deployed on the physical host shown in FIG. 1. In this embodiment, an $m^{th}$ front-end VM and an $n^{th}$ back-end GPU Domain serving the $m^{th}$ front-end VM are used as an example for description. As shown in FIG. 8, the method in this embodiment of the present invention may include the following steps:

S801: When the $m^{th}$ front-end VM of the M front-end VMs is started, create, according to a type of an operating system of the started $m^{th}$ front-end VM, the $n^{th}$ back-end GPU Domain having an operating system of a corresponding type, where there is an association relationship between the $m^{th}$ front-end VM and the $n^{th}$ back-end GPU Domain.

S802: Based on the association relationship between the $m^{th}$ front-end VM and the $n^{th}$ back-end GPU Domain, transfer communication information of the corresponding $n^{th}$ back-end GPU Domain to the $m^{th}$ front-end VM, and transfer communication information of the corresponding $m^{th}$ front-end VM to the $n^{th}$ back-end GPU Domain, so that front-end and back-end service channels are established between the $m^{th}$ front-end VM and the $n^{th}$ back-end GPU Domain.

As can be seen above, by means of the method for managing a GPU Domain in this embodiment of the present invention, after an $m^{th}$ front-end VM on a physical host is started, an $n^{th}$ back-end GPU Domain having an operating system of a corresponding type is created according to a type of an operating system of the started $m^{th}$ front-end VM. In this way, an association relationship between the $m^{th}$ front-end VM and the $n^{th}$ back-end GPU Domain is naturally formed. Based on the association relationship between the $m^{th}$ front-end VM and the $n^{th}$ back-end GPU Domain, communication information of the corresponding $n^{th}$ back-end GPU Domain is transferred to the $m^{th}$ front-end VM, and communication information of the corresponding $m^{th}$ front-end VM is transferred to the $n^{th}$ back-end GPU Domain, so that front-end and back-end service channels are established between the $m^{th}$ front-end VM and the $n^{th}$ back-end GPU Domain. Further, because there are front-end and back-end service channels between the $n^{th}$ back-end GPU Domain and the $m^{th}$ front-end VM, and the type of the operating system of the $n^{th}$ back-end GPU Domain is the same as the type of the operating system of the $m^{th}$ front-end VM, a GPU command transferred from the $m^{th}$ front-end VM may be directly executed on the $n^{th}$ back-end GPU Domain having the operating system of the same type, thereby avoiding a problem of conversion between different GPU command libraries, thereby further avoiding problems of an extra overhead, a delay, and stability that are caused by the conversion between the GPU command libraries, so that performance of a GPU virtualization system is ensured.

Main functions of a GPU are graphics rendering, image processing, and video playback acceleration. Therefore, a main object of GPU virtualization is to provide the main functions of the GPU in a virtual machine, so that GPU applications such as graphics rendering, image processing, and video playback can be efficiently supported. In addition, a GPU may also be used as a computing processor and process a computing task like a CPU. For example, a general-purpose graphics processing unit (General purpose GPU, GPGPU) is suitable for parallel computing.

To help to better understand and implement the foregoing solutions of this embodiment of the present invention, the following describes in detail the methods in the embodiments of the present invention with reference to application scenarios.

Embodiment 9: Application Scenario of a Desktop Cloud

Figure 9:
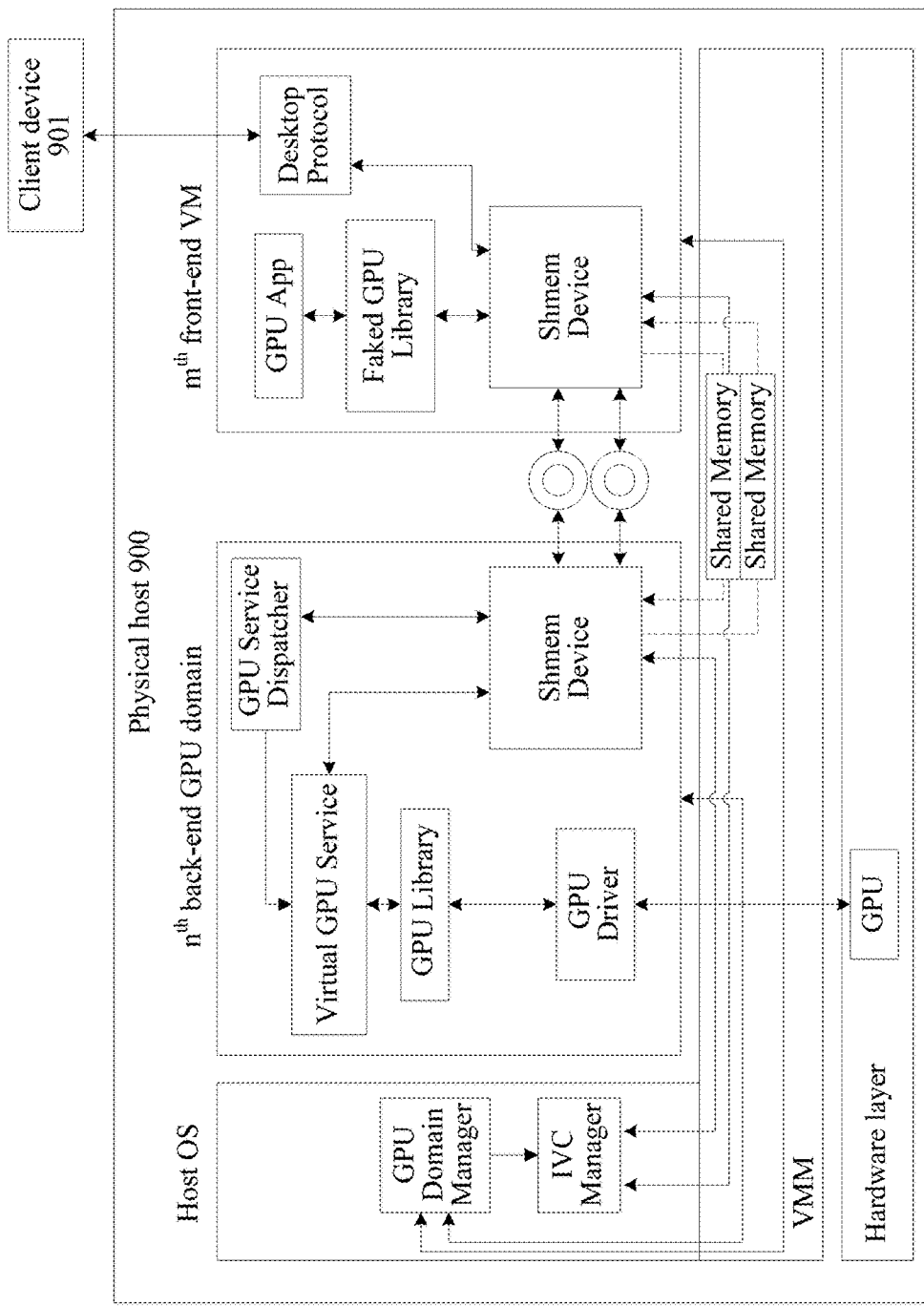
FIG. 9 is a schematic architectural diagram of a desktop cloud system according to an embodiment of the present invention.

FIG. 9 is a schematic architectural diagram of a desktop cloud system according to an embodiment of the present invention. As shown in FIG. 9, the desktop cloud system includes a client device 901 and a physical host 900, where a user is connected to and accesses the physical host 900 of a data center through the client device 901 (for example, a PC, a tablet computer, or an intelligent terminal) by using a desktop protocol. An $m^{th}$ front-end VM, an $n^{th}$ back-end GPU Domain, and a Host OS are deployed on the physical host 900.

Another method for implementing GPU virtualization in this embodiment of the present invention is applied to the desktop cloud system shown in FIG. 9, and the method specifically includes the following steps.

Procedure for creating a virtual machine and procedure for establishing front-end and back-end service channels between a front-end virtual machine and a back-end GPU Domain:

(1) A GPU Domain management device (that is, a GPU Domain Manager) creates one or more back-end GPU Domains according to a configured GPU Domain creation policy, and records information about each back-end GPU Domain, for example, a type of an operating system, and a quantity of corresponding physical GPUs.

The GPU Domain Manager is configured to create and manage a GPU Domain. After a virtualization system is installed and deployed, a system manager configures the GPU Domain creation policy, which includes an operating system of a GPU Domain, a quantity of GPU Domains, a quantity of GPUs that are pass-through to the GPU Domain, and the like.

(2) A connection is established between a shared memory device (that is, shmem device) on each GPU Domain and an inter-virtual machine communication device (that is, an IVC manager). The IVC Manager records a shared memory device identifier of the shmem device. The connection herein is, for example, a UNIX domain socket (that is, UNIX Domain Socket) connection.

(3) After the front-end virtual machine is started, the GPU Domain Manager selects, according to a type of an operating system of the front-end virtual machine and a load status of a GPU Domain, one back-end GPU Domain from the created one or more back-end GPU Domains to serve the front-end virtual machine, and notifies the IVC Manager (note: IVC is Inter-VM Communication) of association information between the front-end virtual machine and the back-end GPU Domain serving the front-end virtual machine.

A load of a back-end GPU Domain is considered to keep a load balance, and the type of the operating system of the front-end virtual machine is considered to select a back-end GPU Domain having an operating system of a same type. In this embodiment, it may also be that only a type of an operating system of the front-end virtual machine is considered to select a corresponding back-end GPU Domain.

(4) A connection is established between the IVC Manager and a shmem device of the front-end virtual machine. The IVC Manager selects, according to the association information between the front-end virtual machine and the back-end GPU Domain, one shmem device on a corresponding back-end GPU Domain to be associated with the shmem device of the front-end virtual machine, and shared shmem device identifiers of the shmem devices of the back-end GPU Domain and the front-end virtual machine are transferred to each other.

The connection herein is, for example, a UNIX domain socket connection.

(5) The shmem device of the front-end virtual machine records the shared device identifier of the shmem device on the corresponding back-end GPU Domain, and the shmem device on the back-end GPU Domain records the shared device identifier of the shmem device of the corresponding front-end virtual machine.

(6) After a driver of the shmem device of the front-end virtual machine (hereinafter, the driver of the shmem device is referred to as a Shmem Driver, which is indicated by Shmem Driver in the figure) is loaded, it is found that the shmem device on the corresponding back-end GPU Domain has been associated, and binding of event channels (that is, event channels) between the shmem device on the front-end virtual machine and the shmem device on the back-end GPU Domain is initiated, so that the shmem device on the front-end virtual machine and the shmem device on the back-end GPU Domain can communicate with each other by using the event channels.

Procedure for Processing Data:

(1) The user opens a graphics application (that is, GPU App) on the $m^{th}$ front-end VM by using the client device 901, where a Faked GPU library is loaded in the graphics application.

(2) A simulated GPU command library (that is, a Faked GPU Library) on the $m^{th}$ front-end VM invokes a Shmem Driver to send, to a Shmem Driver on the $n^{th}$ back-end GPU Domain through the bound event channels between the $m^{th}$ front-end VM and the $n^{th}$ back-end GPU Domain, an interruption notification indicating that the graphics application is started, and the Shmem Driver on the $n^{th}$ back-end GPU Domain transfers, to a GPU Service Dispatcher on the $n^{th}$ back-end GPU Domain, the interruption notification indicating that the graphics application is started.

It should be noted that a shared memory (that is, shared memory) is controlled and operated (for example, mapping and read/write) by a Shmem Driver, and the Faked GPU library invokes a Shmem Driver interface to receive and transmit data.

(3) After receiving the interruption notification indicating that the graphics application is started, the GPU Service Dispatcher creates one Virtual GPU Service, and returns connection information of the Virtual GPU Service to the Faked GPU Library.

Specifically, the GPU Service Dispatcher invokes the Shmem Driver to send the connection information of the Virtual GPU Service to the Shmem Driver on the $m^{th}$ front-end VM through the bound event channels between the $m^{th}$ front-end VM and the $n^{th}$ back-end GPU Domain, and the Shmem Driver on the $m^{th}$ front-end VM transfers the connection information of the Virtual GPU Service to the Faked GPU Library on the $m^{th}$ front-end VM.

(4) Based on the connection information of the Virtual GPU Service, a connection of a shared memory (that is, shared Memory) is established between the Faked GPU Library and the Virtual GPU Service.

(5) In a process that a graphics application program on the $m^{th}$ front-end VM runs, the Faked GPU Library intercepts a GPU command invoked by the graphics application program, and optionally, also an invoked parameter, where the intercepted GPU command and the invoked parameter are packed into a data packet.

(6) The Faked GPU Library determines whether the data packet needs to be compressed, and if the data packet needs to be compressed, compresses the data packet.

Details are as follows:

--- p: Data packet size
δ: Compression ratio
c1: Compression rate
c2: Decompression rate
s: Transmission speed
x %: Adjustment ratio Estimated compression time: $t1 = \frac{p}{c1}$ Estimated decompression time: $t2 = \frac{p}{c2 \times \delta}$ Estimated compressed-data transmission time: $t3 = \frac{p}{s \times \delta}$ Estimated non-compression direct-transmission time: $t4 = \frac{p}{s}$ If $t1 + t2 + t3 \leq t4 \times x\%$, compress the data packet, or otherwise, skip compression

--- x % is a variable that can be used to adjust, according to a corresponding condition, a compression policy. To minimize a delay, x % should be set to 100%. To control bandwidth, a delay can be properly increased; therefore, x % can be greater than 100%, and is, for example, 110%.

It should be noted that in this embodiment, a compression ratio, a compression rate, a decompression rate, a transmission speed, and an adjustment ratio are set in a configure file, or it may be configured that compression can be skipped. Different configurations may be performed in different cases.

(7) After compression of the data packet is completed, the Faked GPU Library invokes the Shmem Driver interface to apply for a memory block in the shared memory, writes the data packet to the memory block obtained through application, and invokes a data sending interface of the Shmem Driver to send data.

(8) The Shmem Driver on the $m^{th}$ front-end VM writes, by using an input/output structure (for example, an IO Ring), first auxiliary information to the memory block obtained through application, and sends the interruption notification to the corresponding Shmem Driver on the $n^{th}$ back-end GPU Domain through the event channels.

The first auxiliary information herein includes an offset address, a length, and the like of the data packet in the shared memory.

(9) After receiving the interruption notification, the Shmem Driver on the $n^{th}$ back-end GPU Domain acquires the first auxiliary information from the memory, wakes up received data invoking of the Virtual GPU Service, and returns the first auxiliary information to the Virtual GPU Service.

(10) The Virtual GPU Service invokes the Shmem Driver to read the data packet from the shared memory according to the first auxiliary information. For example, the Virtual GPU Service reads, starting from an offset address A1 of the shared memory, data of a length L1, and after the reading is complete, invokes an interface to notify the Shmem Driver that the reading of the data is complete. A specific procedure is as follows:

(10a) The Shmem Driver generates a feedback message indicating that the reading is complete, writes, by using an input/output structure (for example, an IO Ring), the feedback message to the memory block obtained through application, and sends the interruption notification to the Shmem Driver on the $m^{th}$ front-end virtual machine.

(10b) After receiving the interruption notification, the Shmem Driver on the $m^{th}$ front-end virtual machine reads the feedback message from the memory block, and after it is determined that data has been read, releases the memory block that has been occupied by the data read by the other party.

(11) The Virtual GPU Service determines whether the data packet has been compressed, if the data packet has been compressed, decompresses the data packet, to obtain the decompressed data packet, and parses the decompressed data packet to obtain the GPU command, and optionally, also the invoked parameter.

(12) The Virtual GPU Service delivers the GPU command to a GPU library; the GPU library further invokes a GPU Driver to deliver the GPU command, and eventually a GPU completes processing of the GPU command.

If the GPU command does not have a return value, this command is complete.

If this GPU command has a return value:

(13a) The Virtual GPU Service invokes the Shmem Driver interface to apply for a memory block, writes processing result data (that is, the return value) to the memory block obtained through application, and invokes the data sending interface of the Shmem Driver to send data.

(14a) The Shmem Driver writes, by using an input/output structure (for example, an IO Ring), second auxiliary information to the memory block obtained through application, and sends the interruption notification to the corresponding Shmem Driver on the $m^{th}$ front-end virtual machine through the event channels.

The second auxiliary information herein includes an offset address, a length, and the like of the processing result data (that is, the return value) in the shared memory.

(15a) After receiving the interruption notification, the Shmem Driver on the $m^{th}$ front-end virtual machine reads the second auxiliary information from the memory block, wakes up received data invoking of the Faked GPU Library, and returns the second auxiliary information to the Faked GPU Library.

(16a) The Faked GPU Library invokes the Shmem Driver to read the processing result data (that is, the return value) from the shared memory according to the second auxiliary information, and after the reading is complete, invokes an interface to notify the Shmem Driver that the reading of the data is complete. A subsequent procedure is similar to 10a and 10b, only in a reverse order, and details are not described herein again.

(17a) The Faked GPU Library determines whether the processing result data (that is, the return value) has been compressed, and if the processing result data has been compressed, performs decompression processing on the processing result data (that is, the return value).

(18a) The Faked GPU Library returns the processing result data (that is, the return value) to a GPU application program.

If one frame of image is further generated after the GPU command in step (12) is executed, the method in this embodiment further includes:

(13b) The Virtual GPU Service on the $n^{th}$ back-end GPU Domain captures an image.

(14b) The Virtual GPU Service on the $n^{th}$ back-end GPU Domain performs image compression on the captured image.

(15b) After compression of the image is complete, the Virtual GPU Service invokes the Shmem Driver interface to apply for a memory block in the shared memory, writes data of the compressed image to the memory block obtained through application, and invokes the data sending interface of the Shmem Driver to send data.

(16b) The Shmem Driver on the $n^{th}$ back-end GPU Domain writes, by using an input/output structure (for example, an IO Ring), third auxiliary information to the memory block obtained through application, and sends the interruption notification to the corresponding Shmem Driver on the $m^{th}$ front-end VM through the event channels.

The third auxiliary information herein includes an offset address, a length, and the like of the data of the compressed image in the shared memory.

(17b) After receiving the interruption notification, the Shmem Driver on the $m^{th}$ front-end VM acquires the third auxiliary information from the memory block, wakes up received data invoking of a desktop protocol (that is, Desktop Protocol), and returns the third auxiliary information to the Desktop Protocol.

(18b) The Desktop Protocol invokes the Shmem Driver to read the data of the compressed image from the shared memory according to the third auxiliary information, and after the reading is complete, invokes an interface to notify the Shmem Driver that the reading of the data is complete. For a specific procedure, refer to (10a) and (10b), only in a reverse order, and details are not described herein again.

(19b) The Desktop Protocol finally transfers the data to the client device 901 for display.

It should be noted that, in step (5) of this embodiment, the Faked GPU Library in a user mode intercepts invoking of a GPU command. It should be noted that it may also be that a virtual GPU driver (that is, a Virtual GPU Driver) in a kernel mode intercepts invoking of a GPU command. In this embodiment, in a case in which a Faked GPU Library in a user mode intercepts invoking of a GPU command, after mapping from a shared memory (in a kernel mode) to an address of the Faked GPU Library in a user mode is performed, the Faked GPU Library can then directly perform reading and writing on the shared memory. In a case in which a Virtual GPU Driver in a kernel mode intercepts invoking of a GPU command, because the Virtual GPU Driver is in a kernel mode, the Virtual GPU Driver can directly perform reading and writing on the shared memory without performing mapping.

Moreover, in this embodiment, in a case in which a Faked GPU Library in a user mode intercepts invoking of a GPU command, if multiple GPU applications exist, the Shmem Driver needs to interact with multiple Faked GPU Libraries loaded by the multiple GPU applications, where the Shmem Driver on the $m^{th}$ front-end virtual machine saves an association relationship between a Faked GPU Library and a Virtual GPU Service. In a case in which a Virtual GPU Driver in a kernel mode intercepts invoking of a GPU command, only one Virtual GPU Driver is needed on the $m^{th}$ front-end virtual machine. Invoking of commands of multiple GPU application programs at an upper layer reaches the Virtual GPU Driver, and the Shmem Driver only needs to interact with one Virtual GPU Driver, where the Virtual GPU Driver on the $m^{th}$ front-end virtual machine saves or maintains an association relationship between each GPU application program and a Virtual GPU Service.

Moreover, it should be noted that, steps (13a) to (18a) and steps (13b) to (19b) are two parallel cases. Because some GPU commands have return values, and some GPU commands do not have return values, in a case in which there is a return value, the $n^{th}$ back-end GPU Domain returns the return value to the $m^{th}$ front-end VM in time. In a case in which one frame of image is generated after a GPU command is executed, the $n^{th}$ back-end GPU Domain captures the image in time, and transfers the image to the $m^{th}$ front-end VM, to further transfer the image to the client device in the desktop cloud system for display.

As can be seen above, in the method provided in this embodiment of the present invention, there are a shared memory and bound event channels between an $n^{th}$ back-end GPU Domain and an $m^{th}$ front-end VM, the $m^{th}$ front-end VM transfers a to-be-transferred GPU command to the $n^{th}$ back-end GPU Domain by using the shared memory between the $m^{th}$ front-end VM and the $n^{th}$ back-end GPU Domain and through the bound event channels between the $m^{th}$ front-end VM and the $n^{th}$ back-end GPU Domain, and the $n^{th}$ back-end GPU Domain processes the GPU command by using one or more GPUs in a physical host, to obtain corresponding processing result data. Because there are a shared memory and bound event channels between the $n^{th}$ back-end GPU Domain and the $m^{th}$ front-end VM, and a type of an operating system of the $n^{th}$ back-end GPU Domain is the same as a type of an operating system of the $m^{th}$ front-end VM, a GPU command transferred from the $m^{th}$ front-end VM may be directly executed on the $n^{th}$ back-end GPU Domain having an operating system of a same type, thereby avoiding a problem of conversion between different GPU command libraries, thereby further avoiding problems of an extra overhead, a delay, and stability that are caused by the conversion between the GPU command libraries, so that performance of a GPU virtualization system is ensured.

Moreover, in a GPU virtualization architecture based on a GPU Domain, a GPU command and processing result data are transmitted by using a shared memory between an $m^{th}$ front-end virtual machine and an $n^{th}$ back-end GPU Domain, to achieve efficient transmission of a GPU command and data, thereby improving transmission efficiency and improving an effect of GPU virtualization.

Embodiment 10: Application Scenario of a Desktop Cloud

Application scenarios in this embodiment and Embodiment 9 are same, and a main difference lies in that: In Embodiment 9, a GPU command and data are transmitted by using a shared memory between an $m^{th}$ front-end VM and an $n^{th}$ back-end GPU Domain, and in this embodiment, a GPU command and data are transmitted by using a network.

Figure 10:
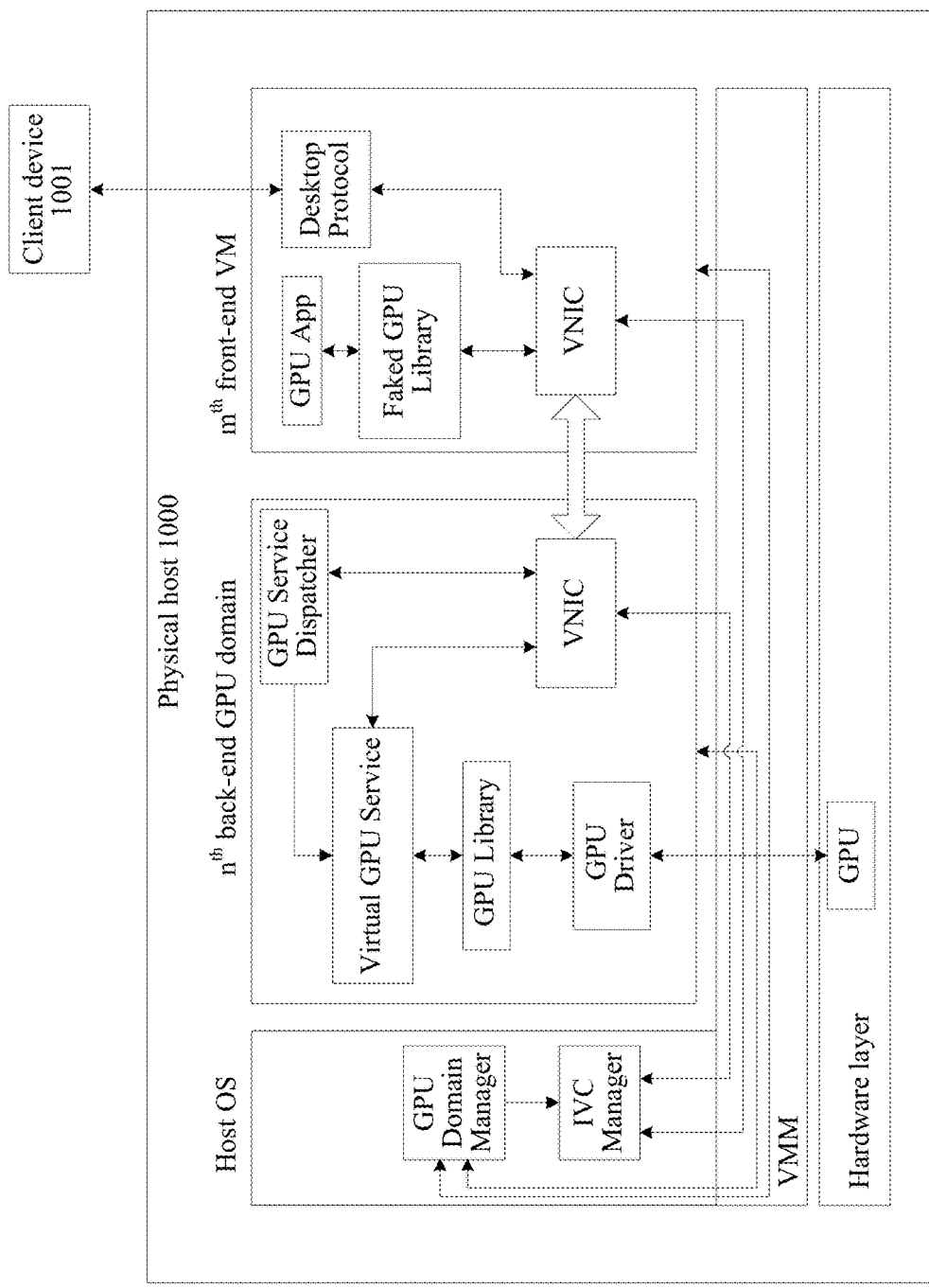
FIG. 10 is a schematic architectural diagram of another desktop cloud system according to an embodiment of the present invention.

FIG. 10 is a schematic architectural diagram of another desktop cloud system according to an embodiment of the present invention. As shown in FIG. 10, the desktop cloud system includes a client device 1001 and a physical host 1000, where a user is connected to and accesses the physical host 1000 of a data center through the client device 1001 (for example, a PC, a tablet computer, or an intelligent terminal) by using a desktop protocol. An $m^{th}$ front-end VM, an $n^{th}$ back-end GPU Domain, and a Host OS are deployed on the physical host 1000.

Another method for implementing GPU virtualization in this embodiment of the present invention is applied to the desktop cloud system shown in FIG. 10. The method specifically includes the following steps.

Procedure for creating a virtual machine and procedure for establishing front-end and back-end service channels between a front-end virtual machine and a back-end GPU Domain:

(1) A GPU Domain Manager creates one or more back-end GPU Domains according to a configured GPU Domain creation policy, and records information about each back-end GPU Domain, for example, a type of an operating system and a quantity of corresponding physical GPUs.

(2) After a front-end virtual machine is started, the GPU Domain Manager selects, according to the type of the operating system of the front-end virtual machine and load statuses of the back-end GPU Domains, one back-end GPU Domain from the created one or more back-end GPU Domains to serve the front-end virtual machine, and notifies an IVC Manager (note: IVC is Inter-VM Communication) of association information between the front-end virtual machine and the back-end GPU Domain serving the front-end virtual machine.

(3) After being started, the $m^{th}$ front-end virtual machine requests, from the IVC Manager, an IP and a Port number of a GPU Service Dispatcher on an $n^{th}$ back-end GPU Domain that provides a service to the $m^{th}$ front-end virtual machine.

The $m^{th}$ front-end virtual machine may request, from the IVC Manager by using a configuration management library (that is, xenstore), the IP and the Port number of the GPU Service Dispatcher on the $n^{th}$ back-end GPU Domain that provides a service to the $m^{th}$ front-end virtual machine.

(4) The IVC Manager reads, from xenstore according to the association information between the front-end virtual machine and the back-end GPU Domain, the IP and the Port number of the GPU Service Dispatcher on the $n^{th}$ back-end GPU Domain and an IP and a Port number of a Faked GPU Library on the $m^{th}$ front-end VM, transfers the IP and the Port number of the corresponding GPU Service Dispatcher to the $m^{th}$ front-end VM, and transfers the IP and the Port number of the corresponding Faked GPU Library to the $n^{th}$ back-end GPU Domain, so that a network connection is established between the $m^{th}$ front-end VM and the $n^{th}$ back-end GPU Domain, and the $m^{th}$ front-end VM and the $n^{th}$ back-end GPU Domain can communicate with each other by using the network connection.

The association information between the front-end virtual machine and the back-end GPU Domain includes association information between the $m^{th}$ front-end virtual machine and the $n^{th}$ back-end GPU Domain.

Procedure for Processing Data:

(1) The user turns on a graphics application (that is, GPU App) on the $m^{th}$ front-end VM by using the client device 1001, where a Faked GPU library is loaded on the graphics application.

(2) A Faked GPU Library on the $m^{th}$ front-end VM and a GPU Service Dispatcher on the $n^{th}$ back-end GPU Domain establish a TCP connection by using respective virtual network interface cards (that is, VNIC).

(3) The Faked GPU Library on the $m^{th}$ front-end VM sends, over the TCP connection and based on the IP addresses and the Port numbers that are acquired in the foregoing step (4), a graphics application start message to the GPU Service Dispatcher on the $n^{th}$ back-end GPU Domain, and sends an IP address and a port Port number of a Desktop Protocol to the GPU Service Dispatcher on the $n^{th}$ back-end GPU Domain.

(4) The GPU Service Dispatcher on the $n^{th}$ back-end GPU Domain receives the graphics application start message, creates one Virtual GPU Service, returns an IP address and a Port number of the Virtual GPU Service to the Faked GPU Library over the TCP connection, transfers the received IP address and the received Port number of the Desktop Protocol to the Virtual GPU Service, and establishes a network connection (for example, a TCP connection) between the Virtual GPU Service on the $n^{th}$ back-end GPU Domain and the Desktop Protocol on the $m^{th}$ front-end VM based on the IP address and the Port number of the Virtual GPU Service and the IP address and the Port number of the Desktop Protocol.

(5) A network connection (for example, a TCP connection) is established between the Faked GPU Library on the $m^{th}$ front-end VM and the Virtual GPU Service on the $n^{th}$ back-end GPU Domain based on the IP and the Port number of the Faked GPU Library and the IP and the Port number of the Virtual GPU Service.

As shown in FIG. 10, that is, the network connection is a network connection between the VNIC on the $m^{th}$ front-end VM and the VNIC on the $n^{th}$ back-end GPU Domain.

(6) In a process that a graphics application program on the $m^{th}$ front-end VM runs, the Faked GPU Library intercepts a GPU command invoked by the graphics application program, and optionally, also an invoked parameter, where the intercepted GPU command and the invoked parameter are packed into a data packet.

(7) The Faked GPU Library determines whether the data packet needs to be compressed, and if the data packet needs to be compressed, compresses the data packet.

(8) After compression of the data packet is complete, the Faked GPU Library sends, over a network connection between the $m^{th}$ front-end VM and the $n^{th}$ back-end GPU Domain, the data packet to the Virtual GPU Service corresponding to the foregoing IP address and the foregoing Port number.

(9) After receiving the data packet, the Virtual GPU Service determines whether the data packet has been compressed, if the data packet has been compressed, decompresses the data packet, to obtain the decompressed data packet, and parses the decompressed data packet to obtain the GPU command, and optionally, also the invoked parameter.

(10) The Virtual GPU Service delivers the GPU command to a GPU library, so that the GPU library invokes a GPU Driver to deliver the GPU command, and eventually a GPU completes processing of the GPU command.

If the GPU command does not have a return value, this command is complete.

If this GPU command has a return value:

(11a) The Virtual GPU Service sends, over the network connection between the $m^{th}$ front-end VM and the $n^{th}$ back-end GPU Domain, processing result data (that is, the return value) to the Faked GPU Library corresponding to the foregoing IP address and the foregoing port.

(12a) After receiving the processing result data (that is, the return value), the Faked GPU Library determines whether the processing result data (that is, the return value) has been compressed, and if the processing result data has been compressed, performs decompression processing on the processing result data (that is, the return value).

(13a) The Faked GPU Library returns the processing result data (that is, the return value) to a GPU application program.

If one frame of image is further generated after the GPU command in step (10) is executed, the method in this embodiment further includes:

(11b) The Virtual GPU Service on the $n^{th}$ back-end GPU Domain captures an image.

(12b) The Virtual GPU Service on the $n^{th}$ back-end GPU Domain performs image compression on the captured image.

(13b) After compression of the image is complete, the Virtual GPU Service on the $n^{th}$ back-end GPU Domain sends data of the compressed image to the Desktop Protocol on the $m^{th}$ front-end VM over the network connection between the Virtual GPU Service and the Desktop Protocol on the $m^{th}$ front-end VM.

(14b) After receiving the data of the image, the Desktop Protocol finally transfers the data to the client device 1001 for display.

It should be noted that, steps (11a) to (13a) and steps (11b) to (14b) are two parallel cases. Because some GPU commands have return values, and some GPU commands do not have return values, in a case in which there is a return value, the $n^{th}$ back-end GPU Domain returns the return value to the $m^{th}$ front-end VM in time. In a case in which one frame of image is generated after a GPU command is executed, the $n^{th}$ back-end GPU Domain captures the image in time, and transfers the image to the $m^{th}$ front-end VM, to further transfer the image to the client device in the desktop cloud system for display.

As can be seen above, in the method provided in this embodiment of the present invention, there is a network connection between an $n^{th}$ back-end GPU Domain and an $m^{th}$ front-end VM, the $m^{th}$ front-end VM transfers a to-be-transferred GPU command to the $n^{th}$ back-end GPU Domain over the network connection between the $m^{th}$ front-end VM and the $n^{th}$ back-end GPU Domain, and the $n^{th}$ back-end GPU Domain processes the GPU command by using one or more GPUs of at least one GPU, to obtain corresponding processing result data. Because there is a network connection between the $n^{th}$ back-end GPU Domain and the $m^{th}$ front-end VM, and a type of an operating system of the $n^{th}$ back-end GPU Domain is the same as a type of an operating system of the $m^{th}$ front-end VM, a GPU command transferred from the $m^{th}$ front-end VM may be directly executed on the $n^{th}$ back-end GPU Domain having an operating system of a same type, thereby avoiding a problem of conversion between different GPU command libraries, thereby further avoiding problems of an extra overhead, a delay, and stability that are caused by the conversion between the GPU command libraries, so that performance of a GPU virtualization system is ensured.

Moreover, in a GPU virtualization architecture based on a GPU Domain, a GPU command and processing result data are transmitted over a network connection between an $m^{th}$ front-end VM and an $n^{th}$ back-end GPU Domain, to achieve efficient transmission of a GPU command and data, thereby improving transmission efficiency and improving an effect of GPU virtualization.

Embodiment 11: Application Scenario of General Purpose Computing

Figure 11:
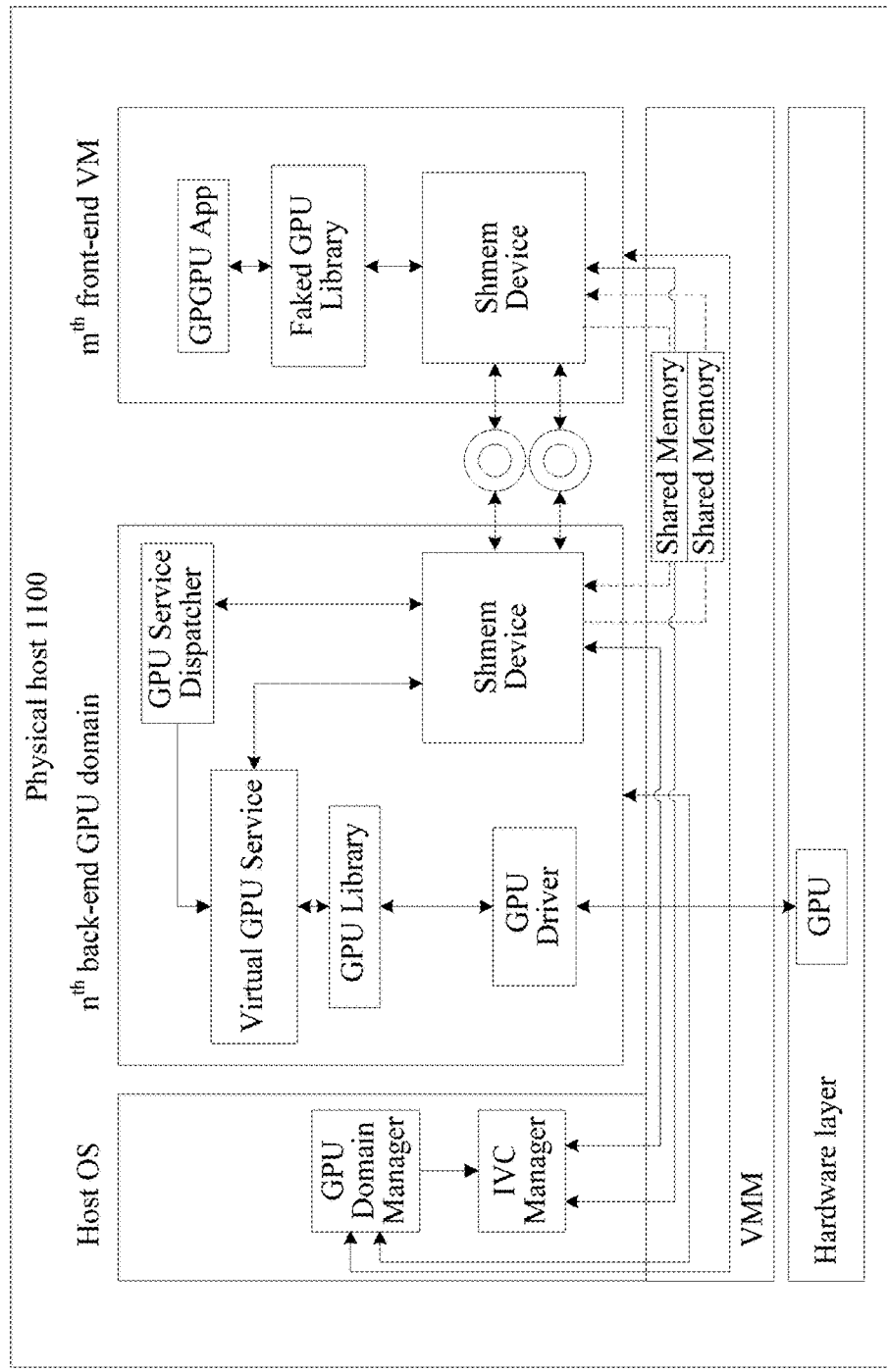
FIG. 11 is a schematic architectural diagram of another physical host according to an embodiment of the present invention.

FIG. 11 is a schematic architectural diagram of another physical host 1100 according to an embodiment of the present invention. A main difference between FIG. 11 and FIG. 9 lies in that: a GPU application on an $m^{th}$ front-end VM is a GPGPU (General purpose GPU, general-purpose graphics processing unit) application. In other words, the GPGPU is used as a computing processor, and processes a computing task like a CPU.

In an application scenario of a GPGPU, for a procedure for creating a virtual machine and a procedure for data processing, refer to the description of the embodiment shown in FIG. 9, and details are not described herein again. A difference lies in that: In this embodiment, because a GPGPU is used as a computing processor, image rendering, capturing, compression, and image returning are not involved. A Virtual GPU Service on an $n^{th}$ back-end GPU Domain is configured to process a GPU command transferred from an $m^{th}$ front-end virtual machine and return processing result data (that is, a computing result) after the GPU command is executed.

To help to better understand and implement the foregoing methods in the embodiments of the present invention, the following further provides a related apparatus and a cluster system configured to implement the foregoing methods.

Embodiment 12

Figure 12:
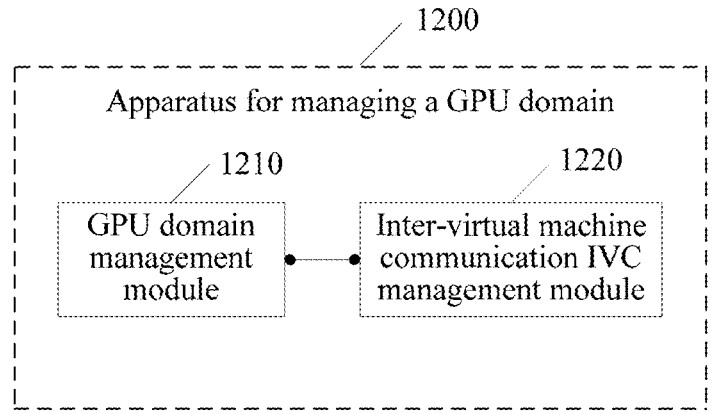
FIG. 12 is a schematic structural diagram of an apparatus for managing a GPU Domain according to an embodiment of the present invention.

Referring to FIG. 12, an embodiment of the present invention provides an apparatus 1200 for managing a GPU Domain, where the apparatus 1200 may include:

a GPU Domain management module 1210, configured to: when an $m^{th}$ front-end VM is started, determine, according to a type of an operating system of the started $m^{th}$ front-end VM, an $n^{th}$ back-end GPU Domain having an operating system of a corresponding type, where there is an association relationship between the $m^{th}$ front-end VM and the $n^{th}$ back-end GPU Domain; and an inter-virtual machine communication IVC management module 1220, configured to: based on the association relationship between the $m^{th}$ front-end VM and the $n^{th}$ back-end GPU Domain, transfer communication information of the corresponding $n^{th}$ back-end GPU Domain to the $m^{th}$ front-end VM, and transfer communication information of the corresponding $m^{th}$ front-end VM to the $n^{th}$ back-end GPU Domain, so that front-end and back-end service channels are established between the $m^{th}$ front-end VM and the $n^{th}$ back-end GPU Domain.

If the communication information of the $m^{th}$ front-end VM transferred to the $n^{th}$ back-end GPU Domain and the communication information of the $n^{th}$ back-end GPU Domain transferred to the $m^{th}$ front-end VM are shared memory device identifiers, correspondingly, the front-end and back-end service channels established between the $m^{th}$ front-end VM and the $n^{th}$ back-end GPU Domain are bound event channels between the $m^{th}$ front-end VM and the $n^{th}$ back-end GPU Domain;

if the communication information of the $m^{th}$ front-end VM transferred to the $n^{th}$ back-end GPU Domain and the communication information of the $n^{th}$ back-end GPU Domain transferred to the $m^{th}$ front-end VM are network address information, for example, an IP address and a port number, correspondingly, the front-end and back-end service channels established between the $m^{th}$ front-end VM and the $n^{th}$ back-end GPU Domain are a network connection between the $m^{th}$ front-end VM and the $n^{th}$ back-end GPU Domain.

It should be noted that in this embodiment of the present invention, the inter-virtual machine communication IVC management module 1220 is further configured to manage or record association relationships between M front-end VMs and N back-end GPU Domains, where the association relationships between the M front-end VMs and the N back-end GPU Domains include the association relationship between the $m^{th}$ front-end VM and the $n^{th}$ back-end GPU Domain. Moreover, when the $m^{th}$ front-end VM exits, the inter-virtual machine communication IVC management module 1220 is further configured to delete the association relationship between the $m^{th}$ front-end VM and the $n^{th}$ back-end GPU Domain.

It may be understood that the apparatus 1200 for managing a GPU Domain in this embodiment may be, for example, a Host OS deployed in a physical host in the foregoing method embodiments, and may specifically correspond to the GPU Domain Manager in FIG. 9 to FIG. 11. Functions of various function modules of the apparatus 1200 for managing a GPU Domain may be specifically implemented according to the methods in the foregoing method embodiments, and for a specific implementation process of the functions, refer to related description of the foregoing method embodiments, and details are not described herein again.

As can be seen above, in the apparatus for managing a GPU Domain in this embodiment of the present invention, after an $m^{th}$ front-end VM on a physical host is started, an $n^{th}$ back-end GPU Domain serving the $m^{th}$ front-end VM is determined according to a type of an operating system of the started $m^{th}$ front-end VM. In this way, an association relationship between the $m^{th}$ front-end VM and the $n^{th}$ back-end GPU Domain is naturally formed. Based on the association relationship between the $m^{th}$ front-end VM and the $n^{th}$ back-end GPU Domain, communication information of the corresponding $n^{th}$ back-end GPU Domain is transferred to the $m^{th}$ front-end VM, and communication information of the corresponding $m^{th}$ front-end VM is transferred to the $n^{th}$ back-end GPU Domain, so that front-end and back-end service channels are established between the $m^{th}$ front-end VM and the $n^{th}$ back-end GPU Domain. Further, because there are front-end and back-end service channels between the $n^{th}$ back-end GPU Domain and the $m^{th}$ front-end VM, and the type of the operating system of the $n^{th}$ back-end GPU Domain is the same as the type of the operating system of the $m^{th}$ front-end VM, a GPU command transferred from the $m^{th}$ front-end VM may be directly executed on the $n^{th}$ back-end GPU Domain having the operating system of the same type, thereby avoiding a problem of conversion between different GPU command libraries, thereby further avoiding problems of an extra overhead, a delay, and stability that are caused by the conversion between the GPU command libraries, so that performance of a GPU virtualization system is ensured.

Embodiment 13

Figure 13:
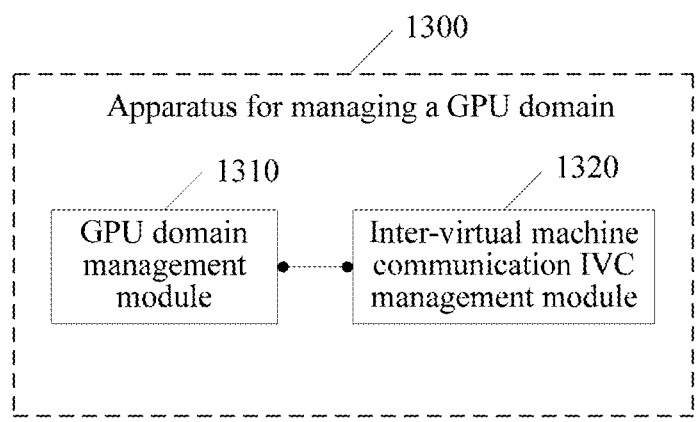
FIG. 13 is a schematic structural diagram of another apparatus for managing a GPU Domain according to an embodiment of the present invention.

Referring to FIG. 13, this embodiment of the present invention provides another apparatus 1300 for managing a GPU Domain, where the apparatus 1300 may include:

a GPU Domain management module 1310, configured to create N back-end GPU Domains according to a configured GPU Domain creation policy, where the N back-end GPU Domains have operating systems of multiple types, and the GPU Domain creation policy includes one or more of the following: a quantity of GPU Domains, a quantity of GPUs that are pass-through to the GPU Domain, and types of operating systems of the GPU Domains; and when an $m^{th}$ front-end VM of the M front-end VMs is started, an $n^{th}$ back-end GPU Domain having an operating system of a corresponding type is selected from the created N back-end GPU Domains according to a type of an operating system of the started $m^{th}$ front-end VM, where there is an association relationship between the $m^{th}$ front-end VM and the $n^{th}$ back-end GPU Domain; and an inter-virtual machine communication IVC management module 1320, configured to: based on the association relationship between the $m^{th}$ front-end VM and the $n^{th}$ back-end GPU Domain, transfer communication information of the corresponding $n^{th}$ back-end GPU Domain to the $m^{th}$ front-end VM, and transfer communication information of the corresponding $m^{th}$ front-end VM to the $n^{th}$ back-end GPU Domain, so that front-end and back-end service channels are established between the $m^{th}$ front-end VM and the $n^{th}$ back-end GPU Domain.

In an implementation manner, if the communication information of the $m^{th}$ front-end VM transferred to the $n^{th}$ back-end GPU Domain and the communication information of the $n^{th}$ back-end GPU Domain transferred to the $m^{th}$ front-end VM are shared memory device identifiers, correspondingly, the inter-virtual machine communication IVC management module 1320 is specifically configured to: based on the association relationship between the $m^{th}$ front-end VM and the $n^{th}$ back-end GPU Domain, transfer the shared memory device identifier of the corresponding $n^{th}$ back-end GPU Domain to the $m^{th}$ front-end VM, and transfer the shared memory device identifier of the corresponding $m^{th}$ front-end VM to the $n^{th}$ back-end GPU Domain, so that event channels between the $m^{th}$ front-end VM and the $n^{th}$ back-end GPU Domain are bound based on the shared memory device identifier of the $n^{th}$ back-end GPU Domain and the shared memory device identifier of the $m^{th}$ front-end VM.

In another implementation manner, if the communication information of the $m^{th}$ front-end VM transferred to the $n^{th}$ back-end GPU Domain and the communication information of the $n^{th}$ back-end GPU Domain transferred to the $m^{th}$ front-end VM are network address information (for example, an IP address and a port number), correspondingly, the inter-virtual machine communication IVC management module 1320 is specifically configured to: based on the association relationship between the $m^{th}$ front-end VM and the $n^{th}$ back-end GPU Domain, transfer the network address information of the corresponding $n^{th}$ back-end GPU Domain to the $m^{th}$ front-end VM, and transfer the network address information of the corresponding $m^{th}$ front-end VM to the $n^{th}$ back-end GPU Domain, so that a network connection is established between the $m^{th}$ front-end VM and the $n^{th}$ back-end GPU Domain based on the network address information of the $n^{th}$ back-end GPU Domain and the network address information of the $m^{th}$ front-end VM.

As can be seen above, by means of the method for managing a GPU Domain in this embodiment of the present invention, after an $m^{th}$ front-end VM on a physical host is started, an $n^{th}$ back-end GPU Domain having an operating system of a corresponding type is selected from N created back-end GPU Domains according to a type of an operating system of the started $m^{th}$ front-end VM. In this way, an association relationship between the $m^{th}$ front-end VM and the $n^{th}$ back-end GPU Domain is naturally formed. Based on the association relationship between the $m^{th}$ front-end VM and the $n^{th}$ back-end GPU Domain, communication information of the corresponding $n^{th}$ back-end GPU Domain is transferred to the $m^{th}$ front-end VM, and communication information of the corresponding $m^{th}$ front-end VM is transferred to the $n^{th}$ back-end GPU Domain, so that front-end and back-end service channels are established between the $m^{th}$ front-end VM and the $n^{th}$ back-end GPU Domain. Further, because there are front-end and back-end service channels between the $n^{th}$ back-end GPU Domain and the $m^{th}$ front-end VM, and the type of the operating system of the $n^{th}$ back-end GPU Domain is the same as the type of the operating system of the $m^{th}$ front-end VM, a GPU command transferred from the $m^{th}$ front-end VM may be directly executed on the $n^{th}$ back-end GPU Domain having the operating system of the same type, thereby avoiding a problem of conversion between different GPU command libraries, thereby further avoiding problems of an extra overhead, a delay, and stability that are caused by the conversion between the GPU command libraries, so that performance of a GPU virtualization system is ensured.

Embodiment 14

Figure 14:
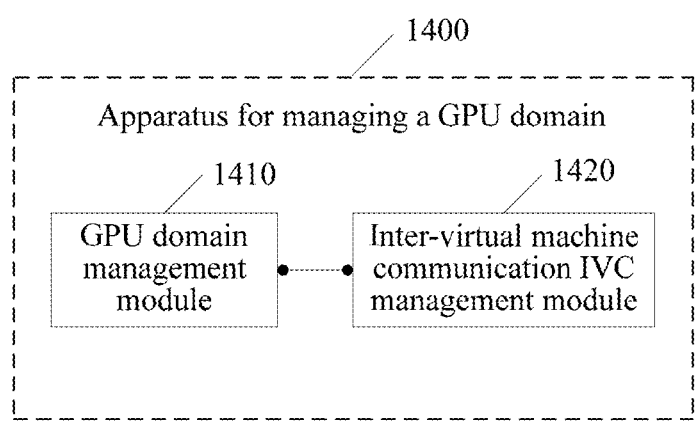
FIG. 14 is a schematic structural diagram of still another apparatus for managing a GPU Domain according to an embodiment of the present invention.

Referring to FIG. 14, this embodiment of the present invention provides still another apparatus 1400 for managing a GPU Domain, and the apparatus 1400 may include:

a GPU Domain management module 1410, configured to: when an $m^{th}$ front-end VM of the M front-end VMs is started, create, according to a type of an operating system of the started $m^{th}$ front-end VM, an $n^{th}$ back-end GPU Domain having an operating system of a corresponding type, where there is an association relationship between the $m^{th}$ front-end VM and the $n^{th}$ back-end GPU Domain; and an inter-virtual machine communication IVC management module 1420, configured to: based on the association relationship between the $m^{th}$ front-end VM and the $n^{th}$ back-end GPU Domain, transfer communication information of the corresponding $n^{th}$ back-end GPU Domain to the $m^{th}$ front-end VM, and transfer communication information of the corresponding $m^{th}$ front-end VM to the $n^{th}$ back-end GPU Domain, so that front-end and back-end service channels are established between the $m^{th}$ front-end VM and the $n^{th}$ back-end GPU Domain.

In an implementation manner, if the separately transferred communication information of the $m^{th}$ front-end VM and the $n^{th}$ back-end GPU Domain is a shared memory device identifier, correspondingly, the inter-virtual machine communication IVC management module 1420 is specifically configured to: based on the association relationship between the $m^{th}$ front-end VM and the $n^{th}$ back-end GPU Domain, transfer the shared memory device identifier of the corresponding $n^{th}$ back-end GPU Domain to the $m^{th}$ front-end VM, and transfer the shared memory device identifier of the corresponding $m^{th}$ front-end VM to the $n^{th}$ back-end GPU Domain, so that event channels between the $m^{th}$ front-end VM and the $n^{th}$ back-end GPU Domain are bound based on the shared memory device identifier of the $n^{th}$ back-end GPU Domain and the shared memory device identifier of the $m^{th}$ front-end VM.

In another implementation manner, if the communication information of the $m^{th}$ front-end VM transferred to the $n^{th}$ back-end GPU Domain and the communication information of the $n^{th}$ back-end GPU Domain transferred to the $m^{th}$ front-end VM are network address information (for example, an IP address and a port number), correspondingly, the inter-virtual machine communication IVC management module 1420 is specifically configured to: based on the association relationship between the $m^{th}$ front-end VM and the $n^{th}$ back-end GPU Domain, transfer the network address information of the corresponding $n^{th}$ back-end GPU Domain to the $m^{th}$ front-end VM, and transfer the network address information of the corresponding $m^{th}$ front-end VM to the $n^{th}$ back-end GPU Domain, so that a network connection is established between the $m^{th}$ front-end VM and the $n^{th}$ back-end GPU Domain based on the network address information of the $n^{th}$ back-end GPU Domain and the network address information of the $m^{th}$ front-end VM.

As can be seen above, by means of the method for managing a GPU Domain in this embodiment of the present invention, after an $m^{th}$ front-end VM on a physical host is started, an $n^{th}$ back-end GPU Domain having an operating system of a corresponding type is created according to a type of an operating system of the started $m^{th}$ front-end VM. In this way, an association relationship between the $m^{th}$ front-end VM and the $n^{th}$ back-end GPU Domain is naturally formed. Based on the association relationship between the $m^{th}$ front-end VM and the $n^{th}$ back-end GPU Domain, communication information of the corresponding $n^{th}$ back-end GPU Domain is transferred to the $m^{th}$ front-end VM, and communication information of the corresponding $m^{th}$ front-end VM is transferred to the $n^{th}$ back-end GPU Domain, so that front-end and back-end service channels are established between the $m^{th}$ front-end VM and the $n^{th}$ back-end GPU Domain. Further, because there are front-end and back-end service channels between the $n^{th}$ back-end GPU Domain and the $m^{th}$ front-end VM, and the type of the operating system of the $n^{th}$ back-end GPU Domain is the same as the type of the operating system of the $m^{th}$ front-end VM, a GPU command transferred from the $m^{th}$ front-end VM may be directly executed on the $n^{th}$ back-end GPU Domain having the operating system of the same type, thereby avoiding a problem of conversion between different GPU command libraries, thereby further avoiding problems of an extra overhead, a delay, and stability that are caused by the conversion between the GPU command libraries, so that performance of a GPU virtualization system is ensured.

Embodiment 15

Figure 15:
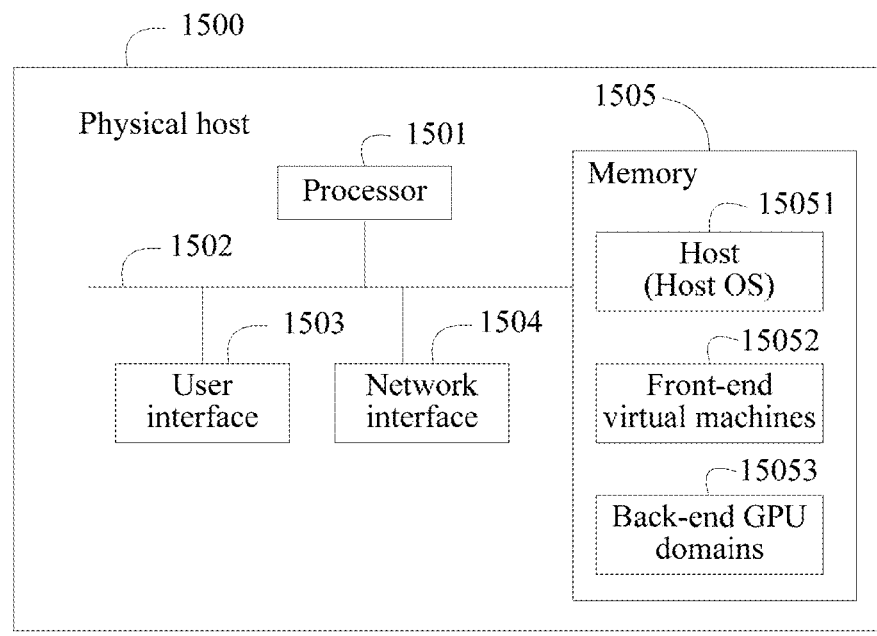
FIG. 15 is a schematic structural diagram of a physical host according to an embodiment of the present invention.

Referring to FIG. 15, this embodiment of the present invention further provides a physical host. The physical host 1500 includes: a processor 1501, a memory 1505, and a communications bus 1502. The communications bus 1502 is configured to implement connection and communication between these components. The physical host 1500 optionally includes a network interface 1504 or another user interface 1503, where the processor 1501 may include a central processing unit CPU and a graphics processing unit GPU. There may be one or more CPUs and GPUs.

The memory 1505 may include a read-only memory and a random access memory, and provides an instruction and data to the processor 1501. A part of the memory 1505 may further include a non-volatile random access memory (NVRAM), or a non-volatile memory (non-volatile memory), such as at least one disk memory. Another part of the memory 1505 may be further used as a shared memory between a front-end virtual machine and a corresponding back-end GPU Domain.

The memory 1505 stores the following elements, executable modules or data structures, or a subset thereof, or an extended set thereof:

an operation instruction, which includes various operation instructions used to implement various operations; and an operating system, which includes various system programs used to implement various basic services and process hardware-based tasks.

In this embodiment, the memory 1505 at least stores an operation instruction or code used to implement a host 15051 (including a Host OS), M front-end virtual machines 15052, and N back-end GPU Domains 15053, and the operation instruction or code in the memory 1505 further define that: there are corresponding front-end and back-end service channels between the N back-end GPU Domains and the M front-end VMs, where there are front-end and back-end service channels between an $n^{th}$ back-end GPU Domain of the N back-end GPU Domains and an $m^{th}$ front-end VM of the M front-end VMs, N is a positive integer greater than or equal to 1, M is a positive integer greater than or equal to 1, M is greater than or equal to N, n is a positive integer is less than or equal to N, and m is a positive integer is less than or equal to M. A type of an operating system of the $n^{th}$ back-end GPU Domain is the same as a type of an operating system of the $m^{th}$ front-end VM.

In this embodiment of the present invention, the central processing unit in the processor 1501 is configured to execute following operations by invoking the operation instruction stored in the memory 1505:

transferring a GPU command to be transferred by the $m^{th}$ front-end VM, to the $n^{th}$ back-end GPU Domain based on the front-end and back-end service channels between the $n^{th}$ back-end GPU Domain of the N back-end GPU Domains and the $m^{th}$ front-end VM of the M front-end VMs; and processing, by using a GPU, the GPU command transferred to the $n^{th}$ back-end GPU Domain, to obtain corresponding processing result data.

If the GPU command has a return value or has to-be-returned data (for example, to-be-returned image data or to-be-returned computing result data), the central processing unit in the processor 1501 is further configured to execute the following operation by invoking the operation instruction stored in the memory 1505:

transferring the corresponding processing result data from the $n^{th}$ back-end GPU Domain to the $m^{th}$ front-end VM based on the front-end and back-end service channels between the $n^{th}$ back-end GPU Domain of the N back-end GPU Domains and the $m^{th}$ front-end VM of the M front-end VMs.

It should be noted that before an operation stage (that is, a stage of processing a GPU command and data) of the physical host, the central processing unit in the processor 1501 is further configured to execute the following operation by invoking the operation instruction stored in the memory 1505: establishing the front-end and back-end service channels between the N back-end GPU Domains and the M front-end VMs, where the front-end and back-end service channels between the N back-end GPU Domains and the M front-end VMs include the front-end and back-end service channels between the $n^{th}$ back-end GPU Domain of the N back-end GPU Domains and the $m^{th}$ front-end VM of the M front-end VMs.

In the aspect of establishing the front-end and back-end service channels between the N back-end GPU Domains and the M front-end VMs, the central processing unit in the processor 1501 is specifically configured to: when the $m^{th}$ front-end VM of the M front-end VMs is started, determine, according to the type of the operating system of the started $m^{th}$ front-end VM, the $n^{th}$ back-end GPU Domain having the operating system of the corresponding type, where there is an association relationship between the $m^{th}$ front-end VM and the $n^{th}$ back-end GPU Domain; and based on the association relationship between the $m^{th}$ front-end VM and the $n^{th}$ back-end GPU Domain, transfer communication information of the corresponding $n^{th}$ back-end GPU Domain to the $m^{th}$ front-end VM, and transfer communication information of the corresponding $m^{th}$ front-end VM to the $n^{th}$ back-end GPU Domain, so that the front-end and back-end service channels are established between the $m^{th}$ front-end VM and the $n^{th}$ back-end GPU Domain.

In a more specific implementation manner, in the aspect of establishing the front-end and back-end service channels between the N back-end GPU Domains and the M front-end VMs, the central processing unit in the processor 1501 is specifically configured to create the N back-end GPU Domains according to a configured GPU Domain creation policy, where the N back-end GPU Domains have operating systems of multiple types, and the GPU Domain creation policy includes one or more of the following: a quantity of GPU Domains, a quantity of GPUs that are pass-through to the GPU Domain, and types of operating systems of the GPU Domains; when the $m^{th}$ front-end VM of the M front-end VMs is started, select, from the created N back-end GPU Domains according to the type of the operating system of the started $m^{th}$ front-end VM, the $n^{th}$ back-end GPU Domain having the operating system of the corresponding type, where there is the association relationship between the $m^{th}$ front-end VM and the $n^{th}$ back-end GPU Domain; and based on the association relationship between the $m^{th}$ front-end VM and the $n^{th}$ back-end GPU Domain, transfer the communication information of the corresponding $n^{th}$ back-end GPU Domain to the $m^{th}$ front-end VM, and transfer the communication information of the corresponding $m^{th}$ front-end VM to the $n^{th}$ back-end GPU Domain, so that the front-end and back-end service channels are established between the $m^{th}$ front-end VM and the $n^{th}$ back-end GPU Domain.

In another more specific implementation manner, in the aspect of establishing the front-end and back-end service channels between the N back-end GPU Domains and the M front-end VMs, the central processing unit in the processor 1501 is specifically configured to: when the $m^{th}$ front-end VM of the M front-end VMs is started, create, according to the type of the operating system of the started $m^{th}$ front-end VM, the $n^{th}$ back-end GPU Domain having the operating system of the corresponding type, where there is the association relationship between the $m^{th}$ front-end VM and the $n^{th}$ back-end GPU Domain; and based on the association relationship between the $m^{th}$ front-end VM and the $n^{th}$ back-end GPU Domain, transfer the communication information of the corresponding $n^{th}$ back-end GPU Domain to the $m^{th}$ front-end VM, and transfer the communication information of the corresponding $m^{th}$ front-end VM to the $n^{th}$ back-end GPU Domain, so that the front-end and back-end service channels are established between the $m^{th}$ front-end VM and the $n^{th}$ back-end GPU Domain.

It should be noted that the central processing unit in the processor 1501 is further configured to manage or record the association relationship between the $m^{th}$ front-end VM and the $n^{th}$ back-end GPU Domain; and when the $m^{th}$ front-end VM exits, delete the association relationship between the $m^{th}$ front-end VM and the $n^{th}$ back-end GPU Domain.

(1) If the foregoing communication information is a shared memory device identifier, in the aspect of establishing the front-end and back-end service channels between the $m^{th}$ front-end VM and the $n^{th}$ back-end GPU Domain, the central processing unit in the processor 1501 is specifically configured to bind event channels between the $m^{th}$ front-end VM and the $n^{th}$ back-end GPU Domain based on the shared memory device identifier of the $m^{th}$ front-end VM and the shared memory device identifier of the $n^{th}$ back-end GPU Domain.

Correspondingly, in the aspect of transferring the GPU command to be transferred by the $m^{th}$ front-end VM, to the $n^{th}$ back-end GPU Domain based on the front-end and back-end service channels between the $n^{th}$ back-end GPU Domain of N back-end GPU Domains and the $m^{th}$ front-end VM of M front-end VMs, and processing, by using the GPU, the GPU command transferred to the $n^{th}$ back-end GPU Domain, to obtain the corresponding processing result data, the central processing unit in the processor 1501 is specifically configured to write the GPU command to be transferred by the $m^{th}$ front-end VM, to a shared memory between the $m^{th}$ front-end VM and the $n^{th}$ back-end GPU Domain; send an $m^{th}$ front-end event notification to the $n^{th}$ back-end GPU Domain through the bound event channels between the $m^{th}$ front-end VM and the $n^{th}$ back-end GPU Domain, where the $m^{th}$ front-end event notification is used to represent location information, of the to-be-transferred GPU command, in the shared memory; read, from a corresponding address space of the shared memory between the $m^{th}$ front-end VM and the $n^{th}$ back-end GPU Domain according to the $m^{th}$ front-end event notification received by the $n^{th}$ back-end GPU Domain, the GPU command transferred to the $n^{th}$ back-end GPU Domain; and process the read GPU command by using one or more GPUs that are pass-through to the $n^{th}$ back-end GPU Domain, to obtain the corresponding processing result data.

Further, the central processing unit in the processor 1501 is further configured to execute the following operations by invoking the operation instruction stored in the memory 1505:

sending an $n^{th}$ back-end event notification to the $m^{th}$ front-end VM through the bound event channels between the $m^{th}$ front-end VM and the $n^{th}$ back-end GPU Domain, where the $n^{th}$ back-end event notification is used to represent that the $n^{th}$ back-end GPU Domain has read data; and releasing, according to the $n^{th}$ back-end event notification received by the $m^{th}$ front-end VM, a memory space that has been occupied by data read by the $n^{th}$ back-end GPU Domain.

In the aspect of transferring the corresponding processing result data from the $n^{th}$ back-end GPU Domain to the $m^{th}$ front-end VM based on the front-end and back-end service channels between the $n^{th}$ back-end GPU Domain of the N back-end GPU Domains and the $m^{th}$ front-end VM of the M front-end VMs, the central processing unit in the processor 1501 is specifically configured to write the processing result data to be transferred by the $n^{th}$ back-end GPU Domain, to the shared memory between the $m^{th}$ front-end VM and the $n^{th}$ back-end GPU Domain; send an $n^{th}$ back-end event notification to the $m^{th}$ front-end VM through the bound event channels between the $m^{th}$ front-end VM and the $n^{th}$ back-end GPU Domain, the $n^{th}$ back-end event notification is used to represent location information, of the processing result data to be transferred by the $n^{th}$ back-end GPU Domain, in the shared memory; and read the processing result data from the corresponding address space of the shared memory between the $m^{th}$ front-end VM and the $n^{th}$ back-end GPU Domain according to the $n^{th}$ back-end event notification received by the $m^{th}$ front-end VM.

Further, the central processing unit in the processor 1501 is further configured to execute the following operations by invoking the operation instruction stored in the memory 1505: sending the $m^{th}$ front-end event notification to the $n^{th}$ back-end GPU Domain through the bound event channels between the $m^{th}$ front-end VM and the $n^{th}$ back-end GPU Domain, where the $m^{th}$ front-end event notification is used to represent that the $m^{th}$ front-end VM has read data; and releasing, according to the $m^{th}$ front-end event notification received by the $n^{th}$ back-end GPU Domain, a memory space that has been occupied by data read by the $m^{th}$ front-end VM.

In an exemplary implementation manner, the shared memory between the $m^{th}$ front-end VM and the $n^{th}$ back-end GPU Domain includes: a front-end-to-back-end transmission shared memory and a back-end-to-front-end transmission shared memory, where the $m^{th}$ front-end VM has read and write permissions for the front-end-to-back-end transmission shared memory, and the $n^{th}$ back-end GPU Domain has a read-only permission for the front-end-to-back-end transmission shared memory, and in the aspect of transferring the GPU command to be transferred by the $m^{th}$ front-end VM, to the $n^{th}$ back-end GPU Domain based on the front-end and back-end service channels between the $n^{th}$ back-end GPU Domain of N back-end GPU Domains and the $m^{th}$ front-end VM of M front-end VMs, and processing, by using the GPU, the GPU command transferred to the $n^{th}$ back-end GPU Domain, to obtain the corresponding processing result data, the central processing unit in the processor 1501 is specifically configured to write the GPU command to be transferred by the $m^{th}$ front-end VM, to the front-end-to-back-end transmission shared memory; send the $m^{th}$ front-end event notification to the $n^{th}$ back-end GPU Domain through the bound event channels between the $m^{th}$ front-end VM and the $n^{th}$ back-end GPU Domain, where the $m^{th}$ front-end event notification is used to represent location information, of the to-be-transferred GPU command, in the front-end-to-back-end transmission shared memory; read, from a corresponding address space of the front-end-to-back-end transmission shared memory according to the $m^{th}$ front-end event notification received by the $n^{th}$ back-end GPU Domain, the GPU command transferred to the $n^{th}$ back-end GPU Domain; and process the read GPU command by using one or more GPUs that are pass-through to the $n^{th}$ back-end GPU Domain, to obtain the corresponding processing result data, where the $m^{th}$ front-end VM has read and write permissions for the front-end-to-back-end transmission shared memory, and the $n^{th}$ back-end GPU Domain has a read-only permission for the front-end-to-back-end transmission shared memory; and or, in an exemplary implementation manner, the shared memory between the $m^{th}$ front-end VM and the $n^{th}$ back-end GPU Domain includes: a front-end-to-back-end transmission shared memory and a back-end-to-front-end transmission shared memory, where the $n^{th}$ back-end GPU Domain has read and write permissions for the back-end-to-front-end transmission shared memory, and the $m^{th}$ front-end VM has a read-only permission for the back-end-to-front-end transmission shared memory, and in the aspect of transferring the corresponding processing result data from the $n^{th}$ back-end GPU Domain to the $m^{th}$ front-end VM based on the front-end and back-end service channels between the $n^{th}$ back-end GPU Domain of the N back-end GPU Domains and the $m^{th}$ front-end VM of the M front-end VMs, the central processing unit in the processor 1501 is specifically configured to write the processing result data to be transferred by the $n^{th}$ back-end GPU Domain, to the back-end-to-front-end transmission shared memory; send an $n^{th}$ back-end event notification to the $m^{th}$ front-end VM through the bound event channels between the $m^{th}$ front-end VM and the $n^{th}$ back-end GPU Domain, where the $n^{th}$ back-end event notification is used to represent location information, of the processing result data to be transferred by the $n^{th}$ back-end GPU Domain, in the back-end-to-front-end transmission shared memory; and read the processing result data from a corresponding address space of the back-end-to-front-end transmission shared memory according to the $n^{th}$ back-end event notification received by the $m^{th}$ front-end VM, where the $n^{th}$ back-end GPU Domain has read and write permissions for the back-end-to-front-end transmission shared memory, and the $m^{th}$ front-end VM has a read-only permission for the back-end-to-front-end transmission shared memory.

(2) If the foregoing communication information is network address information, in the aspect of establishing the front-end and back-end service channels between the $m^{th}$ front-end VM and the $n^{th}$ back-end GPU Domain, the central processing unit in the processor 1501 is specifically configured to establish a network connection between the $m^{th}$ front-end VM and the $n^{th}$ back-end GPU Domain based on the network address information of the $m^{th}$ front-end VM and the network address information of the $n^{th}$ back-end GPU Domain.

Correspondingly, in the aspect of transferring the GPU command to be transferred by the $m^{th}$ front-end VM, to the $n^{th}$ back-end GPU Domain based on the front-end and back-end service channels between the $n^{th}$ back-end GPU Domain of N back-end GPU Domains and the $m^{th}$ front-end VM of M front-end VMs, and processing, by using the GPU, the GPU command transferred to the $n^{th}$ back-end GPU Domain, to obtain the corresponding processing result data, the central processing unit in the processor 1501 is specifically configured to send the GPU command to be transferred by the $m^{th}$ front-end VM, to the $n^{th}$ back-end GPU Domain over the network connection between the $m^{th}$ front-end VM and the $n^{th}$ back-end GPU Domain; and process, by using the GPU, the GPU command received by the $n^{th}$ back-end GPU Domain, to obtain the corresponding processing result data.

Correspondingly, in the aspect of transferring the corresponding processing result data from the $n^{th}$ back-end GPU Domain to the $m^{th}$ front-end VM based on the front-end and back-end service channels between the $n^{th}$ back-end GPU Domain of the N back-end GPU Domains and the $m^{th}$ front-end VM of the M front-end VMs, the central processing unit in the processor 1501 is specifically configured to send the processing result data to be transferred by the $n^{th}$ back-end GPU Domain, to the $m^{th}$ front-end VM over the network connection between the $m^{th}$ front-end VM and the $n^{th}$ back-end GPU Domain.

(3) Control is performed by using a compression policy: In an exemplary implementation manner, in the aspect of transferring the GPU command to be transferred by the $m^{th}$ front-end VM, to the $n^{th}$ back-end GPU Domain based on the front-end and back-end service channels between the $n^{th}$ back-end GPU Domain of N back-end GPU Domains and the $m^{th}$ front-end VM of M front-end VMs, and processing, by using the GPU, the GPU command transferred to the $n^{th}$ back-end GPU Domain, to obtain the corresponding processing result data, the central processing unit in the processor 1501 is specifically configured to determine, according to an estimated compression time, an estimated decompression time, an estimated compressed-data transmission time, and an estimated non-compression direct-transmission time that are of the GPU command to be transferred by the $m^{th}$ front-end VM, to compress the GPU command, and after the GPU command to be transferred by the $m^{th}$ front-end VM is compressed, transfer the compressed GPU command to the $n^{th}$ back-end GPU Domain based on the front-end and back-end service channels between the $n^{th}$ back-end GPU Domain of the N back-end GPU Domains and the $m^{th}$ front-end VM of the M front-end VMs; and after it is determined that the GPU command transferred to the $n^{th}$ back-end GPU Domain has been compressed, decompress the GPU command transferred to the $n^{th}$ back-end GPU Domain, and process the decompressed GPU command by using one or more GPUs that are pass-through to the $n^{th}$ back-end GPU Domain, to obtain the corresponding processing result data.

Correspondingly, in the aspect of transferring the corresponding processing result data from the $n^{th}$ back-end GPU Domain to the $m^{th}$ front-end VM based on the front-end and back-end service channels between the $n^{th}$ back-end GPU Domain of the N back-end GPU Domains and the $m^{th}$ front-end VM of the M front-end VMs, the central processing unit in the processor 1501 is specifically configured to determine, according to an estimated compression time, an estimated decompression time, an estimated compressed-data transmission time, and an estimated non-compression direct-transmission time that are of the processing result data to be transferred by the $n^{th}$ back-end GPU Domain, to compress the processing result data; and compress the processing result data to be transferred by the $n^{th}$ back-end GPU Domain, and transfer the compressed processing result data to the $m^{th}$ front-end VM.

The front-end and back-end service channels between the $n^{th}$ back-end GPU Domain and the $m^{th}$ front-end VM may be corresponding bound event channels between the $m^{th}$ front-end VM and the $n^{th}$ back-end GPU Domain, or, the front-end and back-end service channels between the $n^{th}$ back-end GPU Domain and the $m^{th}$ front-end VM may be the corresponding network connection between the $m^{th}$ front-end VM and the $n^{th}$ back-end GPU Domain, include; however, this embodiment is not limited thereto.

In a specific implementation manner, in the aspect of determining, according to the estimated compression time, the estimated decompression time, the estimated compressed-data transmission time, and the estimated non-compression direct-transmission time that are of the to-be-transferred GPU command or the processing result data, to compress the GPU command or the processing result data, the central processing unit in the processor 1501 is specifically configured to:

when a sum of the estimated compression time, the estimated decompression time, and the estimated compressed-data transmission time of the to-be-transferred GPU command is less than or equal to the estimated non-compression direct-transmission time, determine to compress the to-be-transferred GPU command; or, when a sum of the estimated compression time, the estimated decompression time, and the estimated compressed-data transmission time that are of the to-be-transferred GPU command is less than or equal to a sum of the estimated non-compression direct-transmission time of to-be-transferred GPU command and an adjustment value, determine to compress the to-be-transferred GPU command; or, when a sum of the estimated compression time, the estimated decompression time, and the estimated compressed-data transmission time of the to-be-transferred processing result data is less than or equal to the estimated non-compression direct-transmission time of the to-be-transferred processing result data, determine to compress the to-be-transferred processing result data; or, when a sum of the estimated compression time, the estimated decompression time, and the estimated compressed-data transmission time of the to-be-transferred processing result data is less than or equal to a sum of the estimated non-compression direct-transmission time of the to-be-transferred processing result data and an adjustment value, determine to compress the to-be-transferred processing result data.

It may be understood that, for implementation details of the physical host in this embodiment, refer to related description of the foregoing apparatus and method embodiments, and details are not described herein again.

In conclusion, in the physical host provided in this embodiment of the present invention, there are front-end and back-end service channels between an $n^{th}$ back-end GPU Domain of the N back-end GPU Domains and an $m^{th}$ front-end VM of the M front-end VMs. Based on the front-end and back-end service channels between the $n^{th}$ back-end GPU Domain and the $m^{th}$ front-end VM, a GPU command to be transferred by the $m^{th}$ front-end VM is transferred to the $n^{th}$ back-end GPU Domain; and the GPU command transferred to the $n^{th}$ back-end GPU Domain is processed by using one or more GPUs in the physical host, to obtain corresponding processing result data. It can be seen that in this embodiment of the present invention, the N dedicated back-end GPU Domains are introduced to provide a GPU virtualization capability and service to the M front-end VMs. On the premise that the N back-end GPU Domains provide the GPU virtualization capability and service to the M front-end VMs, types of operating systems of the N back-end GPU Domains may be flexibly configured according to types of operating systems of the M front-end VMs. For example, one back-end GPU Domain may correspondingly serve one or more front-end VMs of a same type of OS, or back-end GPU Domains of different types of OSs may serve front-end VMs of different types of OSs. Because there are front-end and back-end service channels between the $n^{th}$ back-end GPU Domain of the N back-end GPU Domains and the $m^{th}$ front-end VM of the M front-end VMs, and a type of an operating system of the $n^{th}$ back-end GPU Domain is the same as a type of an operating system of the $m^{th}$ front-end VM, a GPU command transferred from the $m^{th}$ front-end VM may be directly executed on the $n^{th}$ back-end GPU Domain having an operating system of a same type, thereby avoiding a problem of conversion between different GPU command libraries, thereby further avoiding problems of an extra overhead, a delay, and stability that are caused by the conversion between the GPU command libraries, so that performance of a GPU virtualization system is ensured.

Moreover, in this embodiment of the present invention, because the N dedicated back-end GPU Domains are introduced to provide the GPU virtualization capability and service to the M front-end VMs, a case in which performance of a GPU virtualization system is affected and a density of virtual machines in a GPU virtualization scenario is limited because a host operating system Host OS easily becomes a bottleneck for performance of GPU virtualization in a process that the Host OS is responsible for GPU virtualization in the prior art is also avoided, thereby also ensuring the performance of the GPU virtualization system, and improving a density and expandability of GPU virtualization.

Moreover, in this embodiment of the present invention, a shared memory or a network connection between an $n^{th}$ back-end GPU Domain and an $m^{th}$ front-end VM is used, transmission delays of a GPU command and data are reduced, thereby improving transmission efficiency, so that an effect of GPU virtualization is improved.

Moreover, in this embodiment of the present invention, effective compression of a GPU command and data is achieved through control by using a compression policy, so that an amount of transmitted data is obviously reduced, thereby further improving transmission efficiency and improving an effect of GPU virtualization.

Embodiment 16

Figure 16:
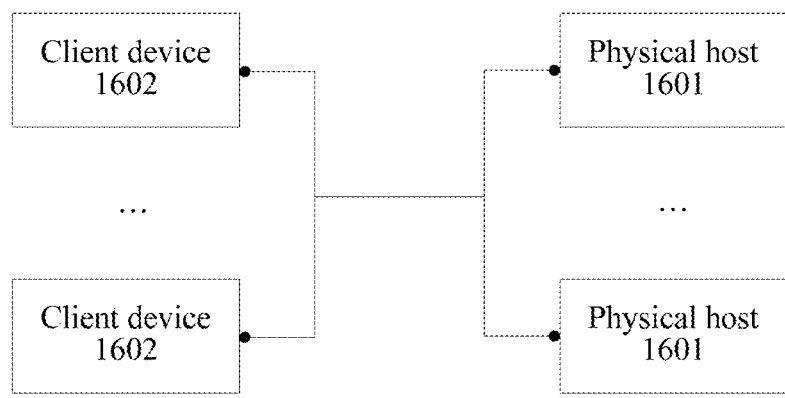
FIG. 16 is a schematic structural diagram of a cluster system according to an embodiment of the present invention.

Referring to FIG. 16, this embodiment of the present invention further provides a cluster system, which may include:

at least one physical host 1601.

Optionally, the cluster system in this embodiment of the present invention further includes at least one client device 1602 having a communicative connection with at least one front-end virtual machine on the at least one physical host 1601, where the client device 1602 is configured to display data transferred from the corresponding front-end virtual machine (for example, image data or computing result data).

It may be understood that for a function and/or a structure of the physical host in the cluster system in this embodiment, refer to related description of the foregoing apparatus and method embodiments, and details are not described herein again.

Moreover, it should be noted that, the physical host mentioned in the foregoing embodiment may also be referred to as a physical server or a computer node, and the client device mentioned in the foregoing embodiment may be a user terminal device such as a tablet computer or an intelligent terminal. Moreover, the $n^{th}$ back-end GPU Domain and the $m^{th}$ front-end VM are representatives introduced for ease of description of this embodiment of the present invention. It should be noted that the embodiments described above are all applicable to the N back-end GPU domains GPU domains and the M front-end virtual machines VMs on the physical host.

In conclusion, in the cluster system provided in this embodiment of the present invention, there are front-end and back-end service channels between an $n^{th}$ back-end GPU Domain of the N back-end GPU Domains and an $m^{th}$ front-end VM of the M front-end VMs in each physical host, the $m^{th}$ front-end VM transfers a to-be-transferred GPU command to the $n^{th}$ back-end GPU Domain based on the front-end and back-end service channels between the $n^{th}$ back-end GPU Domain and the $m^{th}$ front-end VM, and the $n^{th}$ back-end GPU Domain processes the GPU command by using one or more GPUs in the physical host, to obtain corresponding processing result data. It can be seen that in this embodiment of the present invention, the N dedicated back-end GPU Domains are introduced to provide a GPU virtualization capability and service to the M front-end VMs. On the premise that the N back-end GPU Domains provide the GPU virtualization capability and service to the M front-end VMs, types of operating systems of the N back-end GPU Domains may be flexibly configured according to types of operating systems of the M front-end VMs. For example, one back-end GPU Domain may correspondingly serve one or more front-end VMs of a same type of OS, or back-end GPU Domains of different types of OSs may serve front-end VMs of different types of OSs. Because there are front-end and back-end service channels between the $n^{th}$ back-end GPU Domain of the N back-end GPU Domains and the $m^{th}$ front-end VM of the M front-end VMs, and a type of an operating system of the $n^{th}$ back-end GPU Domain is the same as a type of an operating system of the $m^{th}$ front-end VM, a GPU command transferred from the $m^{th}$ front-end VM may be directly executed on the $n^{th}$ back-end GPU Domain having an operating system of a same type, thereby avoiding a problem of conversion between different GPU command libraries, thereby further avoiding problems of an extra overhead, a delay, and stability that are caused by the conversion between the GPU command libraries, so that performance of a GPU virtualization system is ensured.

Moreover, in this embodiment of the present invention, because the N dedicated back-end GPU Domains are introduced to provide the GPU virtualization capability and service to the M front-end VMs, a case in which performance of a GPU virtualization system is affected and a density of virtual machines in a GPU virtualization scenario is limited because a host operating system Host OS easily becomes a bottleneck for performance of GPU virtualization in a process that the Host OS is responsible for GPU virtualization in the prior art is also avoided, thereby also ensuring the performance of the GPU virtualization system, and improving a density and expandability of GPU virtualization.

Moreover, in this embodiment of the present invention, a shared memory or a network connection between an $n^{th}$ back-end GPU Domain and an $m^{th}$ front-end VM is used, transmission delays of a GPU command and data are reduced, thereby improving transmission efficiency, so that an effect of GPU virtualization is improved.

Moreover, in this embodiment of the present invention, effective compression of a GPU command and data is achieved through control by using a compression policy, so that an amount of transmitted data is obviously reduced, thereby further improving transmission efficiency and improving an effect of GPU virtualization.

Embodiment 17

Figure 17:
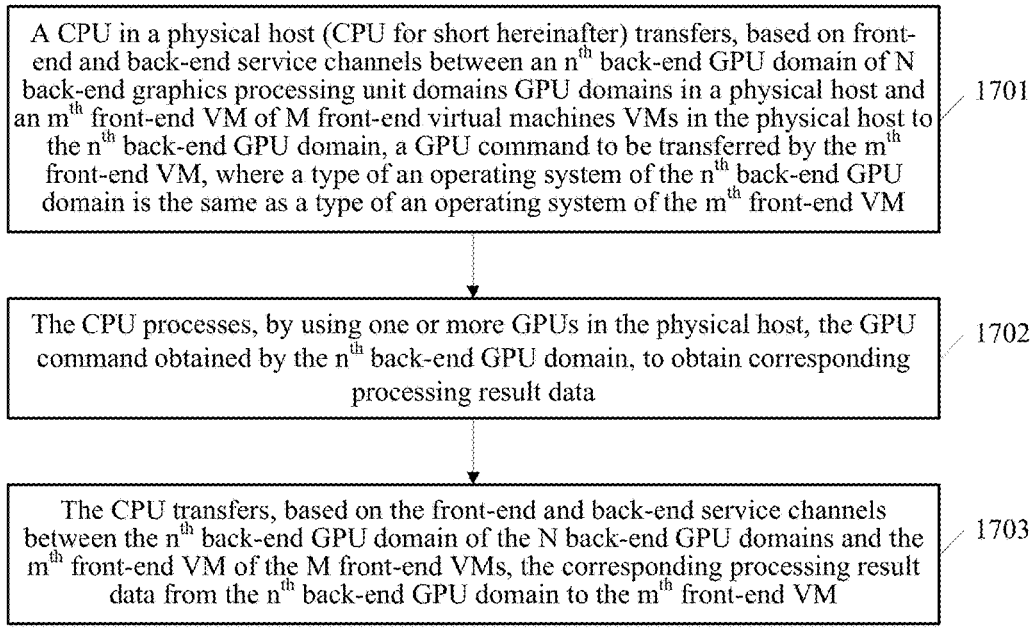
FIG. 17 is a schematic flowchart of a further method for implementing GPU virtualization according to an embodiment of the present invention.

Referring to FIG. 17, an embodiment of the present invention further provides a method for implementing graphics processing unit GPU virtualization. The method may be executed by a processor in a physical host, and especially, a central processing unit CPU in the physical host or another processor that can control software, in the physical host. In this embodiment, an example in which the method is executed by the CPU in the physical host is used for description. It should be noted that the CPU in the physical host can control and implement information transfer between a front-end VM and a back-end GPU Domain. The method may include:

S1701: The CPU in the physical host (CPU for short hereinafter) transfers a GPU command to be transferred by an $m^{th}$ front-end VM, to an $n^{th}$ back-end GPU Domain based on front-end and back-end service channels between the $n^{th}$ back-end GPU Domain of N back-end graphics processing unit domains GPU Domains in a physical host and the $m^{th}$ front-end VM of M front-end virtual machines VMs in the physical host, where a type of an operating system of the $n^{th}$ back-end GPU Domain is the same as a type of an operating system of the $m^{th}$ front-end VM, N is a positive integer greater than or equal to 1, M is a positive integer greater than or equal to 1, M is greater than or equal to N, n is a positive integer is less than or equal to N, and m is a positive integer is less than or equal to M.

S1702: The CPU processes, by using one or more GPUs in the physical host, the GPU command obtained by the $n^{th}$ back-end GPU Domain, to obtain corresponding processing result data.

If the GPU command has a return value or has to-be-returned data (for example, to-be-returned image data or to-be-returned computing result data), the method may further include:

S1703: The CPU transfers the corresponding processing result data from the $n^{th}$ back-end GPU Domain to the $m^{th}$ front-end VM based on the front-end and back-end service channels between the $n^{th}$ back-end GPU Domain of the N back-end GPU Domains and the $m^{th}$ front-end VM of the M front-end VMs.

The front-end and back-end service channels between the $n^{th}$ back-end GPU Domain of the N back-end GPU Domains and the $m^{th}$ front-end VM of the M front-end VMs may be established by using the following method:

determining, when the $m^{th}$ front-end VM of the M front-end VMs is started, according to the type of the operating system of the started $m^{th}$ front-end VM, the $n^{th}$ back-end GPU Domain having the operating system of the corresponding type, where there is an association relationship between the $m^{th}$ front-end VM and the $n^{th}$ back-end GPU Domain; and based on the association relationship between the $m^{th}$ front-end VM and the $n^{th}$ back-end GPU Domain, transferring communication information of the corresponding $n^{th}$ back-end GPU Domain to the $m^{th}$ front-end VM, and transferring communication information of the corresponding $m^{th}$ front-end VM to the $n^{th}$ back-end GPU Domain, so that the front-end and back-end service channels are established between the $m^{th}$ front-end VM and the $n^{th}$ back-end GPU Domain.

In a more specific implementation manner, the front-end and back-end service channels between the $n^{th}$ back-end GPU Domain of the N back-end GPU Domains and the $m^{th}$ front-end VM of the M front-end VMs may be established by using the following method:

creating the N back-end GPU Domains according to a configured GPU Domain creation policy, where the N back-end GPU Domains have operating systems of multiple types, and the GPU Domain creation policy includes one or more of the following: a quantity of GPU Domains, a quantity of GPUs that are pass-through to the GPU Domain, and types of operating systems of the GPU Domains;

selecting, when the $m^{th}$ front-end VM of the M front-end VMs is started, from the created N back-end GPU Domains according to the type of the operating system of the started $m^{th}$ front-end VM, the $n^{th}$ back-end GPU Domain having an operating system of a corresponding type, where there is the association relationship between the $m^{th}$ front-end VM and the $n^{th}$ back-end GPU Domain; and based on the association relationship between the $m^{th}$ front-end VM and the $n^{th}$ back-end GPU Domain, transferring the communication information of the corresponding $n^{th}$ back-end GPU Domain to the $m^{th}$ front-end VM, and transferring the communication information of the corresponding $m^{th}$ front-end VM to the $n^{th}$ back-end GPU Domain, so that the front-end and back-end service channels are established between the $m^{th}$ front-end VM and the $n^{th}$ back-end GPU Domain.

In another more specific implementation manner, the front-end and back-end service channels between the $n^{th}$ back-end GPU Domain of the N back-end GPU Domains and the $m^{th}$ front-end VM of the M front-end VMs may be established by using the following method:

when the $m^{th}$ front-end VM of the M front-end VMs is started, creating, according to the type of the operating system of the started $m^{th}$ front-end VM, the $n^{th}$ back-end GPU Domain having the operating system of the corresponding type, where there is the association relationship between the $m^{th}$ front-end VM and the $n^{th}$ back-end GPU Domain; and based on the association relationship between the $m^{th}$ front-end VM and the $n^{th}$ back-end GPU Domain, transferring the communication information of the corresponding $n^{th}$ back-end GPU Domain to the $m^{th}$ front-end VM, and transferring the communication information of the corresponding $m^{th}$ front-end VM to the $n^{th}$ back-end GPU Domain, so that the front-end and back-end service channels are established between the $m^{th}$ front-end VM and the $n^{th}$ back-end GPU Domain.

(1) If the foregoing communication information is a shared memory device identifier, the establishing the front-end and back-end service channels between the $m^{th}$ front-end VM and the $n^{th}$ back-end GPU Domain includes:

binding, by the CPU based on the shared memory device identifier of the $m^{th}$ front-end VM and the shared memory device identifier of the $n^{th}$ back-end GPU Domain, event channels between the $m^{th}$ front-end VM and the $n^{th}$ back-end GPU Domain.

Correspondingly, S1701 may include:

writing, by the CPU, a GPU command to be transferred by the $m^{th}$ front-end VM, to a shared memory between the $m^{th}$ front-end VM and the $n^{th}$ back-end GPU Domain; and sending, by the CPU, an $m^{th}$ front-end event notification of the $m^{th}$ front-end VM to the $n^{th}$ back-end GPU Domain through the bound event channels between the $m^{th}$ front-end VM and the $n^{th}$ back-end GPU Domain, where the $m^{th}$ front-end event notification is used to represent location information, of the to-be-transferred GPU command, in the shared memory; and correspondingly, S1702 may include:

reading, by the CPU, the GPU command from a corresponding address space of the shared memory between the $m^{th}$ front-end VM and the $n^{th}$ back-end GPU Domain according to the $m^{th}$ front-end event notification received by the $n^{th}$ back-end GPU Domain; and processing, by the CPU, the read GPU command by using one or more GPUs in the physical host that are pass-through to the $n^{th}$ back-end GPU Domain, to obtain the corresponding processing result data.

Further, the method further includes:

sending, by the CPU, an $n^{th}$ back-end event notification of the $n^{th}$ back-end GPU Domain to the $m^{th}$ front-end VM through the bound event channels between the $m^{th}$ front-end VM and the $n^{th}$ back-end GPU Domain, where the $n^{th}$ back-end event notification is used to represent that data reading is complete; and releasing, by the CPU according to the $n^{th}$ back-end event notification received by the $m^{th}$ front-end VM, a memory space that has been occupied by data read by the $n^{th}$ back-end GPU Domain.

If front-end channels correspond one-to-multiple to back-end service channels between the $n^{th}$ back-end GPU Domain of the N back-end GPU Domains and L front-end VMs of the M front-end VMs, the L front-end VMs have an operating system of a type same as that of an operating system of the $n^{th}$ back-end GPU Domain, and the L front-end VMs include the $m^{th}$ front-end VM, where L is a positive integer greater than 1 and less than or equal to M.

There are corresponding event channels between the $n^{th}$ back-end GPU Domain and each front-end VM of the L front-end VMs.

Correspondingly, S1703 may include:

writing, by the CPU, the processing result data to be transferred by the $n^{th}$ back-end GPU Domain, to the shared memory between the $m^{th}$ front-end VM and the $n^{th}$ back-end GPU Domain;

sending, by the CPU, an $n^{th}$ back-end event notification of the $n^{th}$ back-end GPU Domain to the $m^{th}$ front-end VM through the bound event channels between the $m^{th}$ front-end VM and the $n^{th}$ back-end GPU Domain, where the $n^{th}$ back-end event notification is used to represent location information, of the to-be-transferred processing result data, in the shared memory; and reading, by the CPU, the processing result data from the corresponding address space of the shared memory between the $m^{th}$ front-end VM and the $n^{th}$ back-end GPU Domain according to the $n^{th}$ back-end event notification received by the $m^{th}$ front-end VM.

Further, the method further includes:

sending, by the CPU, the $m^{th}$ front-end event notification of the $m^{th}$ front-end VM to the $n^{th}$ back-end GPU Domain through the bound event channels between the $m^{th}$ front-end VM and the $n^{th}$ back-end GPU Domain, where the $m^{th}$ front-end event notification is used to represent that data reading is complete; and releasing, by the CPU according to the $m^{th}$ front-end event notification received by the $n^{th}$ back-end GPU Domain, a memory space that has been occupied by data read by the $m^{th}$ front-end VM.

In an exemplary implementation manner, the shared memory between the $m^{th}$ front-end VM and the $n^{th}$ back-end GPU Domain includes: a front-end-to-back-end transmission shared memory and a back-end-to-front-end transmission shared memory, where the $m^{th}$ front-end VM has read and write permissions for the front-end-to-back-end transmission shared memory, and the $n^{th}$ back-end GPU Domain has a read-only permission for the front-end-to-back-end transmission shared memory, where the writing, by the CPU, a GPU command to be transferred by the $m^{th}$ front-end VM, to a shared memory between the $m^{th}$ front-end VM and the $n^{th}$ back-end GPU Domain includes: writing, by the CPU to the front-end-to-back-end transmission shared memory, the GPU command to be transferred by the $m^{th}$ front-end VM; and correspondingly, the reading, by the CPU, the GPU command from a corresponding address space of the shared memory according to the $m^{th}$ front-end event notification received by the $n^{th}$ back-end GPU Domain includes: reading, by the CPU, the GPU command from a corresponding address space of the front-end-to-back-end transmission shared memory according to the $m^{th}$ front-end event notification received by the $n^{th}$ back-end GPU Domain, where the $m^{th}$ front-end event notification is used to represent location information, of the to-be-transferred GPU command, in the front-end-to-back-end transmission shared memory;

or, in an exemplary implementation manner, the shared memory between the $m^{th}$ front-end VM and the $n^{th}$ back-end GPU Domain includes: a front-end-to-back-end transmission shared memory and a back-end-to-front-end transmission shared memory, where the $n^{th}$ back-end GPU Domain has read and write permissions for the back-end-to-front-end transmission shared memory, and the $m^{th}$ front-end VM has a read-only permission for the back-end-to-front-end transmission shared memory, the writing, by the CPU, the processing result data to be transferred by the $n^{th}$ back-end GPU Domain, to the shared memory between the $m^{th}$ front-end VM and the $n^{th}$ back-end GPU Domain includes: writing, by the CPU, the processing result data to be transferred by the $n^{th}$ back-end GPU Domain, to the back-end-to-front-end transmission shared memory; and correspondingly, the reading, by the CPU, the processing result data from the corresponding address space of the shared memory between the $m^{th}$ front-end VM and the $n^{th}$ back-end GPU Domain according to the $n^{th}$ back-end event notification received by the $m^{th}$ front-end VM includes: reading, by the CPU, the processing result data from a corresponding address space of the back-end-to-front-end transmission shared memory according to the $n^{th}$ back-end event notification received by the $m^{th}$ front-end VM, where the $n^{th}$ back-end event notification is used to represent location information, of the to-be-transferred processing result data, in the back-end-to-front-end transmission shared memory.

(2) If the foregoing communication information is network address information, the establishing the front-end and back-end service channels between the $m^{th}$ front-end VM and the $n^{th}$ back-end GPU Domain includes:

establishing, by the CPU based on the network address information of the $m^{th}$ front-end VM and the network address information of the $n^{th}$ back-end GPU Domain, a network connection between the $m^{th}$ front-end VM and the $n^{th}$ back-end GPU Domain.

Correspondingly, S1701 may include:

sending, by the CPU, the GPU command to be transferred by the $m^{th}$ front-end VM, to the $n^{th}$ back-end GPU Domain over the network connection between the $m^{th}$ front-end VM and the $n^{th}$ back-end GPU Domain.

Correspondingly, S1703 may include:

sending, by the CPU, the processing result data to be transferred by the $n^{th}$ back-end GPU Domain, to the $m^{th}$ front-end VM over the network connection between the $m^{th}$ front-end VM and the $n^{th}$ back-end GPU Domain.

(3) Control is performed by using a compression policy:

The method further includes: determining, by the CPU according to an estimated compression time, an estimated decompression time, an estimated compressed-data transmission time, and an estimated non-compression direct-transmission time that are of the GPU command, to compress the GPU command;

the transferring, by the CPU, a GPU command to be transferred by the $m^{th}$ front-end VM, to the $n^{th}$ back-end GPU Domain in S1701 includes: compressing, by the CPU, the GPU command to be transferred by the $m^{th}$ front-end VM, and transferring the compressed GPU command to the $n^{th}$ back-end GPU Domain;

the method further includes: determining, by the CPU, that the GPU command transferred to the $n^{th}$ back-end GPU Domain has been compressed;

correspondingly, S1702 may include: decompressing, by the CPU, the compressed GPU command transferred to the $n^{th}$ back-end GPU Domain, and processing the decompressed GPU command by using one or more GPUs in the physical host that are pass-through to the $n^{th}$ back-end GPU Domain, to obtain the corresponding processing result data; and if there is a return value or returned image data, the method further includes:

determining, by the CPU according to an estimated compression time, an estimated decompression time, an estimated compressed-data transmission time, and an estimated non-compression direct-transmission time that are of the processing result data, to compress the processing result data; and correspondingly, the transferring, by the CPU, the processing result data to be transferred by the $n^{th}$ back-end GPU Domain, to the $m^{th}$ front-end VM in S1703 includes: compressing, by the CPU, the processing result data to be transferred by the $n^{th}$ back-end GPU Domain, and transferring the compressed processing result data to the $m^{th}$ front-end VM.

In an implementation manner, the determining, by the CPU according to an estimated compression time, an estimated decompression time, an estimated compressed-data transmission time, and an estimated non-compression direct-transmission time that are of the GPU command, to compress the GPU command includes:

when a sum of the estimated compression time, the estimated decompression time, and the estimated compressed-data transmission time that are of the GPU command is less than or equal to the estimated non-compression direct-transmission time of the GPU command, determining, by the CPU, to compress the GPU command; or, when a sum of the estimated compression time, the estimated decompression time, and the estimated compressed-data transmission time that are of the GPU command is less than or equal to a sum of the estimated non-compression direct-transmission time of the GPU command and an adjustment value, determining, by the CPU, to compress the GPU command;

or, the determining, by the CPU according to an estimated compression time, an estimated decompression time, an estimated compressed-data transmission time, and an estimated non-compression direct-transmission time that are of the processing result data, to compress the processing result data includes:

when a sum of the estimated compression time, the estimated decompression time, and the estimated compressed-data transmission time that are of the processing result data is less than or equal to the estimated non-compression direct-transmission time of the processing result data, determining, by the CPU, to compress the processing result data; or, when a sum of the estimated compression time, the estimated decompression time, and the estimated compressed-data transmission time that are of the processing result data is less than or equal to a sum of the estimated non-compression direct-transmission time of the processing result data and an adjustment value, determining, by the CPU, to compress the processing result data.

In conclusion, in the method for implementing GPU virtualization provided in this embodiment of the present invention, there are front-end and back-end service channels between an $n^{th}$ back-end GPU Domain of the N back-end GPU Domains and an $m^{th}$ front-end VM of the M front-end VMs in each physical host, the $m^{th}$ front-end VM transfers a to-be-transferred GPU command to the $n^{th}$ back-end GPU Domain based on the front-end and back-end service channels between the $n^{th}$ back-end GPU Domain and the $m^{th}$ front-end VM, and the $n^{th}$ back-end GPU Domain processes the GPU command by using one or more GPUs in the physical host, to obtain corresponding processing result data. It can be seen that in this embodiment of the present invention, the N dedicated back-end GPU Domains are introduced to provide a GPU virtualization capability and service to the M front-end VMs. On the premise that the N back-end GPU Domains provide the GPU virtualization capability and service to the M front-end VMs, types of operating systems of the N back-end GPU Domains may be flexibly configured according to types of operating systems of the M front-end VMs. For example, one back-end GPU Domain may correspondingly serve one or more front-end VMs of a same type of OS, or back-end GPU Domains of different types of OSs may serve front-end VMs of different types of OSs. Because there are front-end and back-end service channels between the $n^{th}$ back-end GPU Domain of the N back-end GPU Domains and the $m^{th}$ front-end VM of the M front-end VMs, and a type of an operating system of the $n^{th}$ back-end GPU Domain is the same as a type of an operating system of the $m^{th}$ front-end VM, a GPU command transferred from the $m^{th}$ front-end VM may be directly executed on the $n^{th}$ back-end GPU Domain having an operating system of a same type, thereby avoiding a problem of conversion between different GPU command libraries, thereby further avoiding problems of an extra overhead, a delay, and stability that are caused by the conversion between the GPU command libraries, so that performance of a GPU virtualization system is ensured.

Moreover, in this embodiment of the present invention, because the N dedicated back-end GPU Domains are introduced to provide the GPU virtualization capability and service to the M front-end VMs, a case in which performance of a GPU virtualization system is affected and a density of virtual machines in a GPU virtualization scenario is limited because a host operating system Host OS easily becomes a bottleneck for performance of GPU virtualization in a process that the Host OS is responsible for GPU virtualization in the prior art is also avoided, thereby also ensuring the performance of the GPU virtualization system, and improving a density and expandability of GPU virtualization.

Moreover, in this embodiment of the present invention, a shared memory or a network connection between an $n^{th}$ back-end GPU Domain and an $m^{th}$ front-end VM is used, transmission delays of a GPU command and data are reduced, thereby improving transmission efficiency, so that an effect of GPU virtualization is improved.

Moreover, in this embodiment of the present invention, effective compression of a GPU command and data is achieved through control by using a compression policy, so that an amount of transmitted data is obviously reduced, thereby further improving transmission efficiency and improving an effect of GPU virtualization.

It should be noted that, expressions of first, second, and third used in the description of the foregoing embodiments do not mean to limit an order and are only used for ease of differentiation.

It should be noted that for brief description, the foregoing method embodiments are represented as a series of actions. However, a person skilled in the art should appreciate that the present invention is not limited to the described order of the actions, because according to the present invention, some steps may be performed in other orders or simultaneously. In addition, a person skilled in the art should also understand that all the embodiments described in this specification belong to exemplary embodiments, and the involved actions and modules are not necessarily mandatory to the present invention.

In the foregoing embodiments, the description of each embodiment has respective focuses. For a part that is not described in detail in an embodiment, refer to related descriptions in other embodiments.

A person of ordinary skill in the art may understand that all or some of the steps of the methods in the embodiments may be implemented by a program instructing related hardware (such as a processor connected to a memory). The program may be stored in a computer readable storage medium. The storage medium may include: a read-only memory, a random-access memory, a magnetic disk, or an optical disc.

The virtualization processing method and the related apparatus and the computer system provided in the embodiments of the present invention are described above in detail. Specific examples are used in this specification to describe the principle and implementation manners of the present invention. The foregoing embodiments are merely intended to help understand the method and idea of the present invention. In addition, with respect to the implementation manners and the application scope, modifications may be made by a person of ordinary skill in the art according to the idea of the present invention. Therefore, the specification shall not be construed as a limitation on the present invention.

What is claimed is:

1. A method for implementing graphics processing unit GPU virtualization, wherein the method is applied to a physical host, wherein the physical host comprises: a hardware layer comprising a GPU, a Host running on the hardware layer, and a host operating system, N back-end GPU Domains and M front-end virtual machines VMs that run on the Host, wherein N is a positive integer greater than or equal to 1, M is a positive integer greater than or equal to 1, M is greater than or equal to N, n is a positive integer that is less than or equal to N, m is a positive integer that is less than or equal to M, and the method comprises:

creating, by the Host OS, the N back-end GPU Domains according to a configured GPU Domain creation policy, wherein the N back-end GPU Domains have operating systems of multiple types, and the GPU Domain creation policy comprises one or more of the following: a quantity of GPU Domains, a quantity of GPUs that are pass-through to the GPU Domain, and types of operating systems of the GPU Domains;

selecting, when the $m^{th}$ front-end VM of the M front-end VMs is started, by the Host OS from the created N back-end GPU Domains according to the type of the operating system of the started $m^{th}$ front-end VM, the $n^{th}$ back-end GPU Domain having the operating system of the corresponding type, wherein there is an association relationship between the $m^{th}$ front-end VM and the $n^{th}$ back-end GPU Domain; and based on the association relationship between the $m^{th}$ front-end VM and the $n^{th}$ back-end GPU Domain, transferring, by the Host OS, communication information of the corresponding $n^{th}$ back-end GPU Domain to the $m^{th}$ front-end VM, and transferring communication information of the corresponding $m^{th}$ front-end VM to the $n^{th}$ back-end GPU Domain, so that the front-end and back-end service channels are established between the $m^{th}$ front-end VM and the $n^{th}$ back-end GPU Domain;

transferring, by an $m^{th}$ front-end VM, a to-be-transferred GPU command to an $n^{th}$ back-end GPU Domain based on front-end and back-end service channels between the $n^{th}$ back-end GPU Domain of the N back-end GPU Domains and the $m^{th}$ front-end VM of the M front-end VMs, wherein a type of an operating system of the $n^{th}$ back-end GPU Domain is the same as a type of an operating system of the $m^{th}$ front-end VM; and processing, by the $n^{th}$ back-end GPU Domain, the transferred GPU command by using one or more GPUs, to obtain corresponding processing result data.

2. The method according to claim 1, wherein the method further comprises:

transferring, by the $n^{th}$ back-end GPU Domain, the corresponding processing result data to the $m^{th}$ front-end VM based on the front-end and back-end service channels between the $n^{th}$ back-end GPU Domain of the N back-end GPU Domains and the ire front-end VM of the M front-end VMs.

3. The method according to claim 1, wherein if the communication information is a shared memory device identifier, the establishing the front-end and back-end service channels between the $m^{th}$ front-end VM and the $n^{th}$ back-end GPU Domain comprises:

binding event channels between the $m^{th}$ front-end VM and the $n^{th}$ back-end GPU Domain based on the shared memory device identifier of the $m^{th}$ front-end VM and the shared memory device identifier of the $n^{th}$ back-end GPU Domain.

4. The method according to claim 3, wherein the transferring, by an $m^{th}$ front-end VM, a to-be-transferred GPU command to an $n^{th}$ back-end GPU Domain based on front-end and back-end service channels between the $n^{th}$ back-end GPU Domain of the N back-end GPU Domains and the $m^{th}$ front-end VM of the M front-end VMs comprises:

writing, by the $m^{th}$ front-end VM, the to-be-transferred GPU command to a shared memory between the $m^{th}$ front-end VM and the $n^{th}$ back-end GPU Domain; and sending, by the $m^{th}$ front-end VM, an $m^{th}$ front-end event notification to the $n^{th}$ back-end GPU Domain through the bound event channels between the $m^{th}$ front-end VM and the $n^{th}$ back-end GPU Domain, wherein the $m^{th}$ front-end event notification is used to represent location information, of the to-be-transferred GPU command, in the shared memory; and the processing, by the $n^{th}$ back-end GPU Domain, the GPU command by using one or more GPUs, to obtain corresponding processing result data comprises:

reading, by the $n^{th}$ back-end GPU Domain, the GPU command from a corresponding address space of the shared memory between the $m^{th}$ front-end VM and the $n^{th}$ back-end GPU Domain according to the received $m^{th}$ front-end event notification; and processing, by the $n^{th}$ back-end GPU Domain, the read GPU command by using one or more GPUs that are pass-through to the $n^{th}$ back-end GPU Domain, to obtain the corresponding processing result data.

5. The method according to claim 4, wherein the method further comprises:

sending, by the $n^{th}$ back-end GPU Domain, an $n^{th}$ back-end event notification to the $m^{th}$ front-end VM through the bound event channels between the $m^{th}$ front-end VM and the $n^{th}$ back-end GPU Domain, wherein the $n^{th}$ back-end event notification is used to represent that data reading is complete; and releasing, by the $m^{th}$ front-end VM according to the received $n^{th}$ back-end event notification, a memory space that has been occupied by data read by the $n^{th}$ back-end GPU Domain.

6. The method according to claim 4, wherein the shared memory between the $m^{th}$ front-end VM and the $n^{th}$ back-end GPU Domain comprises: a front-end-to-back-end transmission shared memory and a back-end-to-front-end transmission shared memory, wherein the writing, by the $m^{th}$ front-end VM, the to-be-transferred GPU command to a shared memory between the $m^{th}$ front-end VM and the $n^{th}$ back-end GPU Domain comprises: writing, by the $m^{th}$ front-end VM, the to-be-transferred GPU command to the front-end-to-back-end transmission shared memory, wherein the $m^{th}$ front-end VM has read and write permissions for the front-end-to-back-end transmission shared memory, and the $n^{th}$ back-end GPU Domain has a read-only permission for the front-end-to-back-end transmission shared memory; and correspondingly, the reading, by the $n^{th}$ back-end GPU Domain, the GPU command from a corresponding address space of the shared memory according to the received $m^{th}$ front-end event notification comprises: reading, by the $n^{th}$ back-end GPU Domain, the GPU command from a corresponding address space of the front-end-to-back-end transmission shared memory according to the received $m^{th}$ front-end event notification, wherein the $m^{th}$ front-end event notification is used to represent location information, of the to-be-transferred GPU command, in the front-end-to-back-end transmission shared memory;

or, the writing, by the $n^{th}$ back-end GPU Domain, the to-be-transferred processing result data to the shared memory between the $m^{th}$ front-end VM and the $n^{th}$ back-end GPU Domain comprises: writing, by the $n^{th}$ back-end GPU Domain, the to-be-transferred processing result data to the back-end-to-front-end transmission shared memory, wherein the $n^{th}$ back-end GPU Domain has read and write permissions for the back-end-to-front-end transmission shared memory, and the $m^{th}$ front-end VM has a read-only permission for the back-end-to-front-end transmission shared memory; and correspondingly, the reading, by the $m^{th}$ front-end VM, the processing result data from the corresponding address space of the shared memory between the $m^{th}$ front-end VM and the $n^{th}$ back-end GPU Domain according to the received back-end event notification comprises: reading, by the $m^{th}$ front-end VM, the processing result data from a corresponding address space of the back-end-to-front-end transmission shared memory according to the received back-end event notification, wherein the $n^{th}$ back-end event notification is used to represent location information, of the to-be-transferred processing result data, in the back-end-to-front-end transmission shared memory.

7. The method according to claim 3, wherein the transferring, by the $n^{th}$ back-end GPU Domain, the corresponding processing result data to the $m^{th}$ front-end VM based on the front-end and back-end service channels between the $n^{th}$ back-end GPU Domain of the N back-end GPU Domains and the $m^{th}$ front-end VM of the M front-end VMs comprises:

writing, by the $n^{th}$ back-end GPU Domain, the to-be-transferred processing result data to the shared memory between the $m^{th}$ front-end VM and the $n^{th}$ back-end GPU Domain;

sending, by the $n^{th}$ back-end GPU Domain, an $n^{th}$ back-end event notification to the $m^{th}$ front-end VM through the bound event channels between the $m^{th}$ front-end VM and the $n^{th}$ back-end GPU Domain, wherein the $n^{th}$ back-end event notification is used to represent location information, of the to-be-transferred processing result data, in the shared memory; and reading, by the $m^{th}$ front-end VM, the processing result data from the corresponding address space of the shared memory between the $m^{th}$ front-end VM and the $n^{th}$ back-end GPU Domain according to the received back-end event notification.

8. The method according to claim 7, wherein the method further comprises:

sending, by the $m^{th}$ front-end VM, the $m^{th}$ front-end event notification to the $n^{th}$ back-end GPU Domain through the bound event channels between the $m^{th}$ front-end VM and the $n^{th}$ back-end GPU Domain, wherein the $m^{th}$ front-end event notification is used to represent that data reading is complete; and releasing, by the $n^{th}$ back-end GPU Domain according to the received $m^{th}$ front-end event notification, a memory space that has been occupied by data read by the $m^{th}$ front-end VM.

9. The method according to claim 1, wherein if the communication information is network address information, the establishing the front-end and back-end service channels between the $m^{th}$ front-end VM and the $n^{th}$ back-end GPU Domain comprises:

establishing a network connection between the $m^{th}$ front-end VM and the $n^{th}$ back-end GPU Domain based on the network address information of the $m^{th}$ front-end VM and the network address information of the $n^{th}$ back-end GPU Domain.

10. The method according to claim 9, wherein the transferring, by an $m^{th}$ front-end VM, a to-be-transferred GPU command to an $n^{th}$ back-end GPU Domain based on front-end and back-end service channels between the $n^{th}$ back-end GPU Domain of the N back-end GPU Domains and the $m^{th}$ front-end VM of the M front-end VMs comprises:

sending, by the $m^{th}$ front-end VM, the to-be-transferred GPU command to the $n^{th}$ back-end GPU Domain over the network connection between the $m^{th}$ front-end VM and the $n^{th}$ back-end GPU Domain.

11. The method according to claim 9, wherein the transferring, by the $n^{th}$ back-end GPU Domain, the corresponding processing result data to the $m^{th}$ front-end VM based on the front-end and back-end service channels between the $n^{th}$ back-end GPU Domain of the N back-end GPU Domains and the $m^{th}$ front-end VM of the M front-end VMs comprises:

sending, by the $n^{th}$ back-end GPU Domain, the to-be-transferred processing result data to the $m^{th}$ front-end VM over the network connection between the $m^{th}$ front-end VM and the $n^{th}$ back-end GPU Domain.

12. A method for implementing graphics processing unit GPU virtualization, wherein the method is applied to a physical host, wherein the physical host comprises: a hardware layer comprising a GPU, a Host running on the hardware layer, and a host operating system, N back-end GPU Domains and M front-end virtual machines VMs that run on the Host, N is a positive integer greater than or equal to 1, M is a positive integer greater than or equal to 1, M is greater than or equal to N, n is a positive integer that is less than or equal to N, m is a positive integer that is less than or equal to M, and the method comprises:

determining, according to an estimated compression time, an estimated decompression time, an estimated compressed-data transmission time, and an estimated non-compression direct-transmission time that are of the GPU command, to compress to-be-transferred GPU command;

compressing, by the $m^{th}$ front-end VM, the to-be-transferred GPU command, and transferring the compressed GPU command to the $n^{th}$ back-end GPU Domain;

determining, by the $n^{th}$ back-end GPU Domain, that the transferred GPU command has been compressed;

decompressing, by the $n^{th}$ back-end GPU Domain, the compressed GPU command, and processing the decompressed GPU command by using one or more GPUs that are pass-through to the $n^{th}$ back-end GPU Domain, to obtain the corresponding processing result data;

determining, according to an estimated compression time, an estimated decompression time, an estimated compressed-data transmission time, and an estimated non-compression direct-transmission time that are of the processing result data, to compress the processing result data; and compressing, by the $n^{th}$ back-end GPU Domain, the processing result data, and transferring the compressed processing result data to the $m^{th}$ front-end VM.

13. The method according to claim 12, wherein the determining, according to an estimated compression time, an estimated decompression time, an estimated compressed-data transmission time, and an estimated non-compression direct-transmission time that are of the GPU command or the processing result data, to compress the GPU command or the processing result data comprises:

when a sum of the estimated compression time, the estimated decompression time, and the estimated compressed-data transmission time that are of the GPU command is less than or equal to the estimated non-compression direct-transmission time of the GPU command, determining to compress the GPU command; or, when a sum of the estimated compression time, the estimated decompression time, and the estimated compressed-data transmission time that are of the GPU command is less than or equal to a sum of the estimated non-compression direct-transmission time of the GPU command and an adjustment value, determining to compress the GPU command; or, when a sum of the estimated compression time, the estimated decompression time, and the estimated compressed-data transmission time that are of the processing result data is less than or equal to the estimated non-compression direct-transmission time of the processing result data, determining to compress the processing result data; or, when a sum of the estimated compression time, the estimated decompression time, and the estimated compressed-data transmission time that are of the processing result data is less than or equal to a sum of the estimated non-compression direct-transmission time of the processing result data and an adjustment value, determining to compress the processing result data.

14. A physical host, wherein the physical host comprises: a hardware layer comprising a GPU, a Host running on the hardware layer, and Host OS, N back-end GPU Domains and M front-end virtual machines VMs that run on the Host, wherein there are corresponding front-end and back-end service channels between the N back-end GPU Domains and the M front-end VMs, N is a positive integer greater than or equal to 1, M is a positive integer greater than or equal to 1, M is greater than or equal to N, n is a positive integer that is less than or equal to N, and m is a positive integer that is less than or equal to M, wherein the Host OS is configured to, when the $m^{th}$ front-end VM of the M front-end VMs is started, determine, according to the type of the operating system of the started $m^{th}$ front-end VM, the $n^{th}$ back-end GPU Domain having an operating system of a corresponding type, wherein there is an association relationship between the $m^{th}$ front-end VM and the $n^{th}$ back-end GPU Domain: and based on the association relationship between the $m^{th}$ front-end VM and the $n^{th}$ back-end GPU Domain, transfer communication information of the corresponding $n^{th}$ back-end GPU Domain to the $m^{th}$ front-end VM, and transfer communication information of the corresponding $m^{th}$ front-end VM to the $n^{th}$ back-end GPU Domain, so that the front-end and back-end service channels are established between the $m^{th}$ front-end VM and the $n^{th}$ back-end GPU Domain;

the $m^{th}$ front-end VM is configured to initiate binding of event channels between the $m^{th}$ front-end VM and the $n^{th}$ back-end GPU Domain based on the shared memory device identifier of the $m^{th}$ front-end VM and the shared memory device identifier of the $n^{th}$ back-end GPU Domain if the communication information is a shared memory device identifier; or the $n^{th}$ back-end GPU Domain is configured to initiate binding of event channels between the $m^{th}$ front-end VM and the $n^{th}$ back-end GPU Domain based on the shared memory device identifier of the $m^{th}$ front-end VM and the shared memory device identifier of the $n^{th}$ back-end GPU Domain if the communication information is a shared memory device identifier;

the $m^{th}$ front-end VM is further configured to write the to-be-transferred GPU command to a shared memory between the $m^{th}$ front-end VM and the $n^{th}$ back-end GPU Domain; and send an $m^{th}$ front-end event notification to the $n^{th}$ back-end GPU Domain through the bound event channels between the $m^{th}$ front-end VM and the $n^{th}$ back-end GPU Domain, wherein the $m^{th}$ front-end event notification is used to represent location information, of the to-be-transferred GPU command, in the shared memory;

the $n^{th}$ back-end GPU Domain is further configured to read the GPU command from a corresponding address space of the shared memory between the $m^{th}$ front-end VM and the $n^{th}$ back-end GPU Domain according to the received $m^{th}$ front-end event notification; and process the read GPU command by using one or more GPUs that are pass-through to the $n^{th}$ back-end GPU Domain, to obtain the corresponding processing result data.

15. The physical host according to claim 14, wherein the $n^{th}$ back-end GPU Domain is further configured to transfer the corresponding processing result data to the $m^{th}$ front-end VM based on the front-end and back-end service channels between the $n^{th}$ back-end GPU Domain of the N back-end GPU Domains and the $m^{th}$ front-end VM of the M front-end VMs.

16. The physical host according to claim 14, wherein the Host OS is specifically configured to:

create the N back-end GPU Domains according to a configured GPU Domain creation policy, wherein the N back-end GPU Domains have operating systems of multiple types, and the GPU Domain creation policy comprises one or more of the following: a quantity of GPU Domains, a quantity of GPUs that are pass-through to the GPU Domain, and types of operating systems of the GPU Domains;

when the $m^{th}$ front-end VM of the M front-end VMs is started, select, from the N back-end GPU Domains according to the type of the operating system of the started $m^{th}$ front-end VM, the $n^{th}$ back-end GPU Domain having the operating system of the corresponding type, wherein there is the association relationship between the $m^{th}$ front-end VM and the $n^{th}$ back-end GPU Domain; and based on the association relationship between the $m^{th}$ front-end VM and the $n^{th}$ back-end GPU Domain, transfer the communication information of the corresponding $n^{th}$ back-end GPU Domain to the $m^{th}$ front-end VM, and transfer the communication information of the corresponding $m^{th}$ front-end VM to the $n^{th}$ back-end GPU Domain, so that the front-end and back-end service channels are established between the $m^{th}$ front-end VM and the $n^{th}$ back-end GPU Domain.

17. The physical host according to claim 14, wherein the Host OS is specifically configured to:

when the $m^{th}$ front-end VM of the M front-end VMs is started, create, by the Host OS according to the type of the operating system of the started $m^{th}$ front-end VM, the $n^{th}$ back-end GPU Domain having the operating system of the corresponding type, wherein there is the association relationship between the $m^{th}$ front-end VM and the $n^{th}$ back-end GPU Domain; and based on the association relationship between the $m^{th}$ front-end VM and the $n^{th}$ back-end GPU Domain, transfer the communication information of the corresponding $n^{th}$ back-end GPU Domain to the $m^{th}$ front-end VM, and transfer the communication information of the corresponding $m^{th}$ front-end VM to the $n^{th}$ back-end GPU Domain, so that the front-end and back-end service channels are established between the $m^{th}$ front-end VM and the $n^{th}$ back-end GPU Domain.

18. The physical host according to claim 14, wherein the $n^{th}$ back-end GPU Domain further is configured to send an $n^{th}$ back-end event notification to the $m^{th}$ front-end VM through the bound event channels between the $m^{th}$ front-end VM and the $n^{th}$ back-end GPU Domain, wherein the $n^{th}$ back-end event notification is used to represent that data reading is complete; and the $m^{th}$ front-end VM is further configured to release, according to the received $n^{th}$ back-end event notification, a memory space that has been occupied by data read by the $n^{th}$ back-end GPU Domain.

19. The physical host according to claim 14, wherein in the aspect of transferring the corresponding processing result data to the $m^{th}$ front-end VM based on the front-end and back-end service channels between the $n^{th}$ back-end GPU Domain of the N back-end GPU Domains and the $m^{th}$ front-end VM of the M front-end VMs, the $n^{th}$ back-end GPU Domain is specifically configured to write the to-be-transferred processing result data to a shared memory between the $m^{th}$ front-end VM and the $n^{th}$ back-end GPU Domain; and send an $n^{th}$ back-end event notification to the $m^{th}$ front-end VM through the bound event channels between the $m^{th}$ front-end VM and the $n^{th}$ back-end GPU Domain, wherein the $n^{th}$ back-end event notification is used to represent location information, of the to-be-transferred processing result data, in the shared memory between the $m^{th}$ front-end VM and the $n^{th}$ back-end GPU Domain; and the $m^{th}$ front-end VM is further configured to read the processing result data from a corresponding address space of the shared memory between the $m^{th}$ front-end VM and the $n^{th}$ back-end GPU Domain according to the received $n^{th}$ back-end event notification.

20. The physical host according to claim 19, wherein the $m^{th}$ front-end VM is further configured to send the $m^{th}$ front-end event notification to the $n^{th}$ back-end GPU Domain through the bound event channels between the $m^{th}$ front-end VM and the $n^{th}$ back-end GPU Domain, wherein the $m^{th}$ front-end event notification is used to represent that data reading is complete; and the $n^{th}$ back-end GPU Domain is further configured to release, according to the received $m^{th}$ front-end event notification, a memory space that has been occupied by data read by the $m^{th}$ front-end VM.

21. The physical host according to claim 14, wherein the shared memory between the $m^{th}$ front-end VM and the $n^{th}$ back-end GPU Domain comprises a front-end-to-back-end transmission shared memory and a back-end-to-front-end transmission shared memory, wherein in the aspect of writing, by the $m^{th}$ front-end VM, the to-be-transferred GPU command to the shared memory between the $m^{th}$ front-end VM and the $n^{th}$ back-end GPU Domain, the $m^{th}$ front-end VM is specifically configured to write the to-be-transferred GPU command to the front-end-to-back-end transmission shared memory, wherein the $m^{th}$ front-end VM has read and write permissions for the front-end-to-back-end transmission shared memory, and the $n^{th}$ back-end GPU Domain has a read-only permission for the front-end-to-back-end transmission shared memory; and correspondingly, in the aspect of reading the GPU command from the corresponding address space of the shared memory between the $m^{th}$ front-end VM and the $n^{th}$ back-end GPU Domain according to the received $m^{th}$ front-end event notification, the $n^{th}$ back-end GPU Domain is specifically configured to read the GPU command from a corresponding address space of the front-end-to-back-end transmission shared memory according to the received $m^{th}$ front-end event notification, wherein the $m^{th}$ front-end event notification is used to represent location information, of the to-be-transferred GPU command, in the front-end-to-back-end transmission shared memory;

or, in the aspect of writing the to-be-transferred processing result data to the shared memory between the $m^{th}$ front-end VM and the $n^{th}$ back-end GPU Domain, the $n^{th}$ back-end GPU Domain is specifically configured to write the to-be-transferred processing result data to the back-end-to-front-end transmission shared memory, wherein the $n^{th}$ back-end GPU Domain has read and write permissions for the back-end-to-front-end transmission shared memory, and the $m^{th}$ front-end VM has a read-only permission for the back-end-to-front-end transmission shared memory; and correspondingly, in the aspect of reading the processing result data from the corresponding address space of the shared memory between the $m^{th}$ front-end VM and the $n^{th}$ back-end GPU Domain according to the received $n^{th}$ back-end event notification, the $m^{th}$ front-end VM is specifically configured to read the processing result data from a corresponding address space of the back-end-to-front-end transmission shared memory according to the received $n^{th}$ back-end event notification, wherein the $n^{th}$ back-end event notification is used to represent location information, of the to-be-transferred processing result data, in the back-end-to-front-end transmission shared memory.

22. A physical host, wherein the physical host comprises: a hardware layer comprising a GPU, a Host running on the hardware layer, and Host OS, N back-end GPU Domains and M front-end virtual machines VMs that run on the Host, wherein there are corresponding front-end and back-end service channels between the N back-end GPU Domains and the M front-end VMs, N is a positive integer greater than or equal to 1, M is a positive integer greater than or equal to 1, M is greater than or equal to N, n is a positive integer that is less than or equal to N, and m is a positive integer that is less than or equal to M, wherein the $m^{th}$ front-end VM is further configured to determine, according to an estimated compression time, an estimated decompression time, an estimated compressed-data transmission time, and an estimated non-compression direct-transmission time that are of the GPU command, to compress the GPU command; andcompress the to-be-transferred GPU command, and transfer the compressed GPU command to the $n^{th}$ back-end GPU Domain;

the $n^{th}$ back-end GPU Domain is configured to determine that the transferred GPU command has been compressed; and decompress the compressed GPU command, and process the decompressed GPU command by using one or more GPUs that are pass-through to the $n^{th}$ back-end GPU Domain, to obtain the corresponding processing result data.

the $n^{th}$ back-end GPU Domain is further configured to determine, according to an estimated compression time, an estimated decompression time, an estimated compressed-data transmission time, and an estimated non-compression direct-transmission time that are of the processing result data, to compress the processing result data; and compress the processing result data, and transfer the compressed processing result data to the $m^{th}$ front-end VM.

23. The physical host according to claim 22, wherein in the aspect of determining, according to the estimated compression time, the estimated decompression time, the estimated compressed-data transmission time, and the estimated non-compression direct-transmission time that are of the GPU command, to compress the GPU command, the $m^{th}$ front-end VM is specifically configured to: when a sum of the estimated compression time, the estimated decompression time, and the estimated compressed-data transmission time that are of the GPU command is less than or equal to the estimated non-compression direct-transmission time of the GPU command, determine to compress the GPU command; or, when a sum of the estimated compression time, the estimated decompression time, and the estimated compressed-data transmission time that are of the GPU command is less than or equal to a sum of the estimated non-compression direct-transmission time of the GPU command and an adjustment value, determine to compress the GPU command;

or, in the aspect of determining, according to the estimated compression time, the estimated decompression time, the estimated compressed-data transmission time, and t estimated non-compression direct-transmission time that are of the processing result data, to compress the processing result data, the $n^{th}$ back-end GPU Domain is specifically configured to: when a sum of the estimated compression time, the estimated decompression time, and the estimated compressed-data transmission time that are of the processing result data is less than or equal to the estimated non-compression direct-transmission time of the processing result data, determine to compress the processing result data; or, when a sum of the estimated compression time, the estimated decompression time, and the estimated compressed-data transmission time that are of the processing result data is less than or equal to a sum of the estimated non-compression direct-transmission time of the processing result data and an adjustment value, determine to compress the processing result data.

24. A method for implementing graphics processing unit GPU virtualization, wherein the method comprises:
transferring a GPU command to be transferred by an $m^{th}$ front-end VM, to an $n^{th}$ back-end GPU Domain based on front-end and back-end service channels between the $n^{th}$ back-end GPU Domain of N back-end graphics processing unit domains GPU Domains in a physical host and the $m^{th}$ front-end VM of M front-end virtual machines VMs in the physical host, wherein a type of an operating system of the $n^{th}$ back-end GPU Domain is the same as a type of an operating system of the $m^{th}$ front-end VM, N is a positive integer greater than or equal to 1, M is a positive integer greater than or equal to 1, M is greater than or equal to N, n is a positive integer that is less than or equal to N, and m is a positive integer that is less than or equal to M; and
processing, by using one or more GPUs in the physical host, the GPU command obtained by the $n^{th}$ back-end GPU Domain, to obtain corresponding processing result data;
wherein the front-end and back-end service channels between the $n^{th}$ back-end GPU Domain of the N back-end GPU Domains and the $m^{th}$ front-end VM of the M front-end VMs are established by using a following method:
determining, when the $m^{th}$ front-end VM of the M front-end VMs is started, according to the type of the operating system of the started $m^{th}$ front-end VM, the $n^{th}$ back-end GPU Domain having an operating system of a corresponding type, wherein there is an association relationship between the $m^{th}$ front-end VM and the $n^{th}$ back-end GPU Domain; and
based on the association relationship between the $m^{th}$ front-end VM and the $n^{th}$ back-end GPU Domain, transferring communication information of the corresponding $n^{th}$ back-end GPU Domain to the $m^{th}$ front-end VM, and transferring communication information of the corresponding $m^{th}$ front-end VM to the $n^{th}$ back-end GPU Domain, so that the front-end and back-end service channels are established between the $m^{th}$ front-end VM and the $n^{th}$ back-end GPU Domain;
wherein if the communication information is a shared memory device identifier, the establishing the front-end and back-end service channels between the $m^{th}$ front-end VM and the $n^{th}$ back-end GPU Domain comprises:
binding event channels between the $m^{th}$ front-end VM and the $n^{th}$ back-end GPU Domain based on the shared memory device identifier of the $m^{th}$ front-end VM and the shared memory device identifier of the $n^{th}$ back-end GPU Domain;
wherein the transferring a GPU command to be transferred by an $m^{th}$ front-end VM, to an $n^{th}$ back-end GPU Domain based on front-end and back-end service channels between the $n^{th}$ back-end GPU Domain of N back-end GPU Domains and the $m^{th}$ front-end VM of M front-end VMs comprises:
writing, to a shared memory between the $m^{th}$ front-end VM and the $n^{th}$ back-end GPU Domain, the GPU command to be transferred by the $m^{th}$ front-end VM; and
sending an $m^{th}$ front-end event notification of the $m^{th}$ front-end VM to the $n^{th}$ back-end GPU Domain through the bound event channels between the $m^{th}$ front-end VM and the $n^{th}$ back-end GPU Domain, wherein the $m^{th}$ front-end event notification is used to represent location information, of the to-be-transferred GPU command, in the shared memory; and
the processing, by using one or more GPUs in the physical host, the GPU command obtained by the $n^{th}$ back-end GPU Domain, to obtain corresponding processing result data comprises:
reading the GPU command from a corresponding address space of the shared memory between the $m^{th}$ front-end VM and the $n^{th}$ back-end GPU Domain according to the $m^{th}$ front-end event notification received by the $n^{th}$ back-end GPU Domain; and
processing the read GPU command by using one or more GPUs in the physical host that are pass-through to the $n^{th}$ back-end GPU Domain, to obtain the corresponding processing result data.

25. The method according to claim 24, wherein the method further comprises:
transferring the corresponding processing result data from the $n^{th}$ back-end GPU Domain to the $m^{th}$ front-end VM based on the front-end and back-end service channels between the $n^{th}$ back-end GPU Domain of the N back-end GPU Domains and the $m^{th}$ front-end VM of the M front-end VMs.

26. The method according to claim 24, wherein the method further comprises:
sending an $n^{th}$ back-end event notification of the $n^{th}$ back-end GPU Domain to the $m^{th}$ front-end VM through the bound event channels between the $m^{th}$ front-end VM and the $n^{th}$ back-end GPU Domain, wherein the $n^{th}$ back-end event notification is used to represent that data reading is complete; and
releasing, according to the $n^{th}$ back-end event notification received by the $m^{th}$ front-end VM, a memory space that has been occupied by data read by the $n^{th}$ back-end GPU Domain.

27. The method according to claim 24, wherein the transferring the corresponding processing result data from the $n^{th}$ back-end GPU Domain to the $m^{th}$ front-end VM based on the front-end and back-end service channels between the $n^{th}$ back-end GPU Domain of the N back-end GPU Domains and the $m^{th}$ front-end VM of the M front-end VMs comprises:
writing, to a shared memory between the $m^{th}$ front-end VM and the $n^{th}$ back-end GPU Domain, the processing result data to be transferred by the $n^{th}$ back-end GPU Domain;
sending an $n^{th}$ back-end event notification of the $n^{th}$ back-end GPU Domain to the $m^{th}$ front-end VM through the bound event channels between the $m^{th}$ front-end VM and the $n^{th}$ back-end GPU Domain, wherein the $n^{th}$ back-end event notification is used to represent location information, of the to-be-transferred processing result data, in the shared memory; and
reading the processing result data from the corresponding address space of the shared memory between the $m^{th}$ front-end VM and the $n^{th}$ back-end GPU Domain according to the $n^{th}$ back-end event notification received by the $m^{th}$ front-end VM.

28. The method according to claim 27, wherein the method further comprises:
sending the $m^{th}$ front-end event notification of the $m^{th}$ front-end VM to the $n^{th}$ back-end GPU Domain through the bound event channels between the $m^{th}$ front-end VM and the $n^{th}$ back-end GPU Domain, wherein the m$^{th}$ front-end event notification is used to represent that data reading is complete; and releasing, according to the m$^{th}$ front-end event notification received by the n$^{th}$ back-end GPU Domain, a memory space that has been occupied by data read by the m$^{th}$ front-end VM.

29. The method according to claim 24, wherein the shared memory between the m$^{th}$ front-end VM and the n$^{th}$ back-end GPU Domain comprises: a front-end-to-back-end transmission shared memory and a back-end-to-front-end transmission shared memory, the writing, to a shared memory between the m$^{th}$ front-end VM and the n$^{th}$ back-end GPU Domain, the GPU command to be transferred by the m$^{th}$ front-end VM comprises: writing, to the front-end-to-back-end transmission shared memory, the GPU command to be transferred by the m$^{th}$ front-end VM, wherein the m$^{th}$ front-end VM has read and write permissions for the front-end-to-back-end transmission shared memory, and the n$^{th}$ back-end GPU Domain has a read-only permission for the front-end-to-back-end transmission shared memory; and correspondingly, the reading the GPU command from a corresponding address space of the shared memory according to the m$^{th}$ front-end event notification received by the n$^{th}$ back-end GPU Domain comprises: read the GPU command from a corresponding address space of the front-end-to-back-end transmission shared memory according to the m$^{th}$ front-end event notification received by the n$^{th}$ back-end GPU Domain, wherein the m$^{th}$ front-end event notification is used to represent location information, of the to-be-transferred GPU command, in the front-end-to-back-end transmission shared memory;

or, the writing, to a shared memory between the m$^{th}$ front-end VM and the n$^{th}$ back-end GPU Domain, the processing result data to be transferred by the n$^{th}$ back-end GPU Domain comprises: writing, to the back-end-to-front-end transmission shared memory, the processing result data to be transferred by the n$^{th}$ back-end GPU Domain, wherein the n$^{th}$ back-end GPU Domain has read and write permissions for the back-end-to-front-end transmission shared memory, and the m$^{th}$ front-end VM has a read-only permission for the back-end-to-front-end transmission shared memory; and correspondingly, the reading the processing result data from the corresponding address space of the shared memory between the m$^{th}$ front-end VM and the n$^{th}$ back-end GPU Domain according to the n$^{th}$ back-end event notification received by the m$^{th}$ front-end VM comprises: reading the processing result data from a corresponding address space of the back-end-to-front-end transmission shared memory according to the n$^{th}$ back-end event notification received by the m$^{th}$ front-end VM, wherein the n$^{th}$ back-end event notification is used to represent location information, of the to-be-transferred processing result data, in the back-end-to-front-end transmission shared memory.

30. A method for implementing graphics processing unit GPU virtualization, wherein the method comprises:

transferring a GPU command to be transferred by an m$^{th}$ front-end VM, to an n$^{th}$ back-end GPU Domain based on front-end and back-end service channels between the n$^{th}$ back-end GPU Domain of N back-end graphics processing unit domains GPU Domains in a physical host and the m$^{th}$ front-end VM of M front-end virtual machines VMs in the physical host, wherein a type of an operating system of the n$^{th}$ back-end GPU Domain is the same as a type of an operating system of the m$^{th}$ front-end VM, N is a positive integer greater than or equal to 1, M is a positive integer greater than or equal to 1, M is greater than or equal to N, n is a positive integer that is less than or equal to N, and m is a positive integer that is less than or equal to M; and processing, by using one or more GPUs in the physical host, the GPU command obtained by the n$^{th}$ back-end GPU Domain, to obtain corresponding processing result data;

wherein the method further comprises: determining, according to an estimated compression time, an estimated decompression time, an estimated compressed-data transmission time, and an estimated non-compression direct-transmission time that are of the GPU command, to compress the GPU command;

the transferring a GPU command to be transferred by an m$^{th}$ front-end VM, to an n$^{th}$ back-end GPU Domain comprises: compressing the GPU command to be transferred by the m$^{th}$ front-end VM, and transferring the compressed GPU command to the n$^{th}$ back-end GPU Domain;

the method further comprises: determining that the GPU command transferred to the n$^{th}$ back-end GPU Domain has been compressed; and the processing, by using one or more GPUs in the physical host, the GPU command transferred to the n$^{th}$ back-end GPU Domain, to obtain the corresponding processing result data comprises: decompressing the compressed GPU command transferred to the n$^{th}$ back-end GPU Domain, and processing the decompressed GPU command by using one or more GPUs in the physical host that are pass-through to the n$^{th}$ back-end GPU Domain, to obtain the corresponding processing result data;

determining, according to an estimated compression time, an estimated decompression time, an estimated compressed-data transmission time, and an estimated non-compression direct-transmission time that are of the processing result data, to compress the processing result data; and the transferring the processing result data to be transferred by the n$^{th}$ back-end GPU Domain, to the m$^{th}$ front-end VM comprises: compressing the processing result data to be transferred by the n$^{th}$ back-end GPU Domain, and transferring the compressed processing result data to the m$^{th}$ front-end VM.

* * * * *